United States Patent [19]

Miller et al.

[11] Patent Number: 4,882,475

[45] Date of Patent: Nov. 21, 1989

[54] SYNTHESIZED SPEECH-FACILITATED PRODUCT PREPARATION AND/OR DELIVERY SYSTEM AND METHOD

[75] Inventors: Phillip Miller, Cedar Rapids; Richard P. Shindley, Marion; Kristi T. Feltz, Iowa City; George E. Hanson; Jonathan R. White, both of Cedar Rapids, all of Iowa

[73] Assignee: PAR Microsystems, Inc., New Hartford, N.Y.

[21] Appl. No.: 80,573

[22] Filed: Jul. 31, 1987

Related U.S. Application Data

[63] Continuation-in-part of Ser. No. 925,268, Oct. 31, 1986, abandoned.

[51] Int. Cl.[4] ............................................. G06F 15/24
[52] U.S. Cl. .................................... 235/383; 364/401; 235/380; 235/384
[58] Field of Search ............... 235/385, 383, 384, 380; 364/401, 403, 404; 186/38, 39

[56] References Cited

U.S. PATENT DOCUMENTS

| | | | |
|---|---|---|---|
| 4,141,078 | 2/1979 | Bridges | 235/385 X |
| 4,340,810 | 7/1982 | Glass | 235/383 X |
| 4,392,119 | 7/1983 | Price | 364/401 X |
| 4,415,065 | 11/1983 | Sandstedt | 235/383 X |
| 4,529,871 | 7/1985 | Davidson | 235/383 |
| 4,550,246 | 10/1985 | Markman | 235/385 |
| 4,604,696 | 8/1986 | Suganuma | 364/401 |
| 4,672,553 | 6/1987 | Goldberg | 235/383 X |
| 4,706,288 | 11/1987 | Hashimoto | 381/51 |

OTHER PUBLICATIONS

JDR Microdevices advertisement, *Byte* magazine Fall 1985.

Primary Examiner—Jerry Smith
Assistant Examiner—Steven G. Kibby
Attorney, Agent, or Firm—Charles S. McGuire

[57] ABSTRACT

In the case of a pizza home delivery system, customer addresses and mapping information may be auomatically retrieved and displayed based on customer telephone number, and order data including an assigned order number may be imprinted on a label to be attached to each pizza container. Preferably, the system produces the order number in the form of a bar code on an adhesively backed label. Each driver may check out order for delivery by inserting his coded identification key at a bar code reader station and having the bar code labels scanned into the system, so that each order is assigned to a particular driver in a reliable and accurate manner. A voice synthesizer unit at the station can then remind the driver that the order includes beverages or more than one pizza container, and can advise the driver when the sum of the cash payments he has received for his deliveries exceeds a certain amount, making it advisable to deposit some of the accumulated cash before the next delivery. The system is modular and readily expanded to a multi-store system with a centralized telephone order entry station.

52 Claims, 52 Drawing Sheets

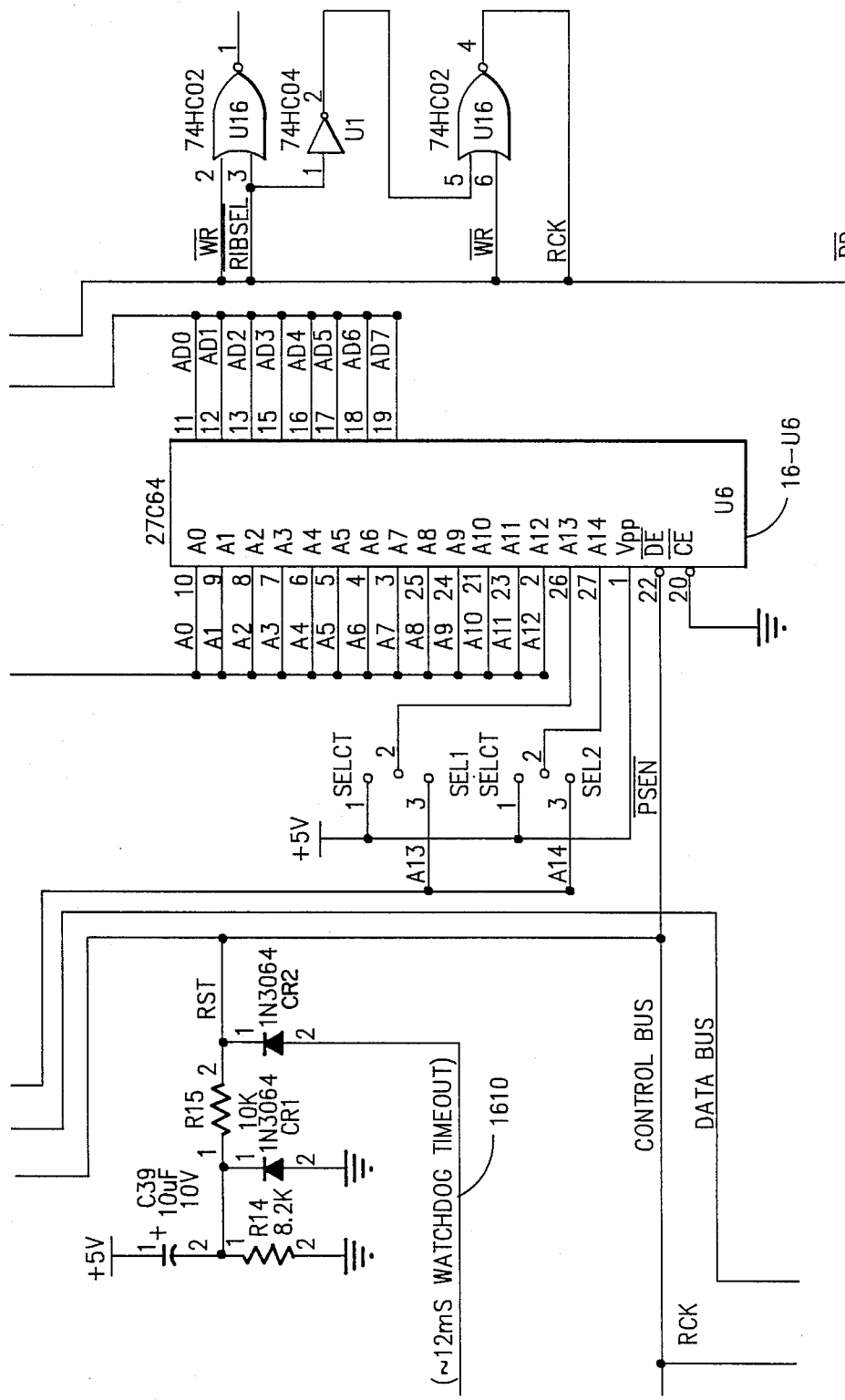

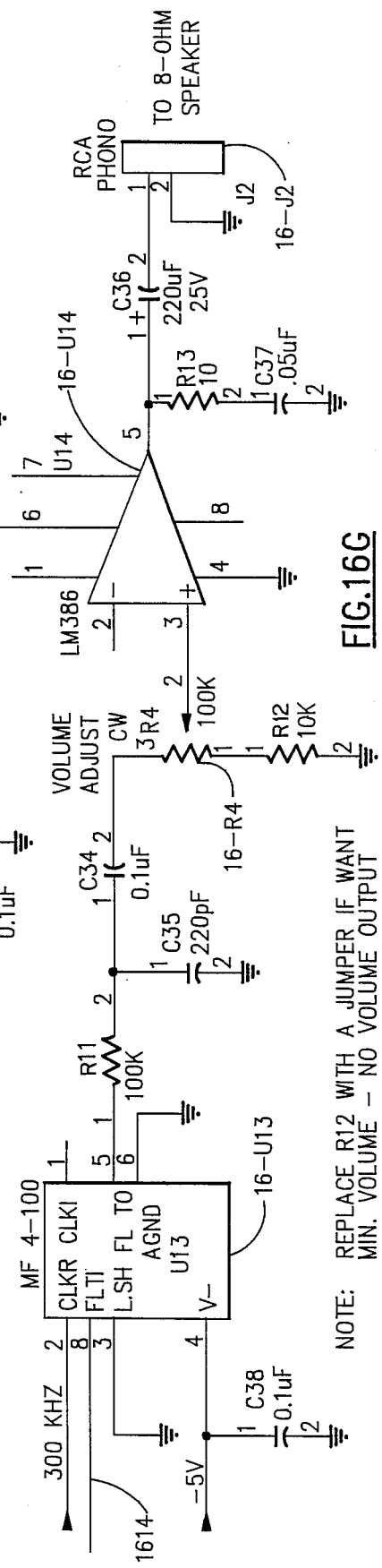
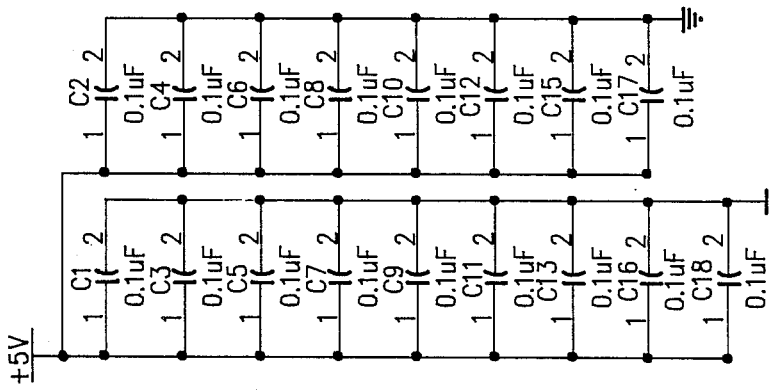
FIG.16H
FIG.16G

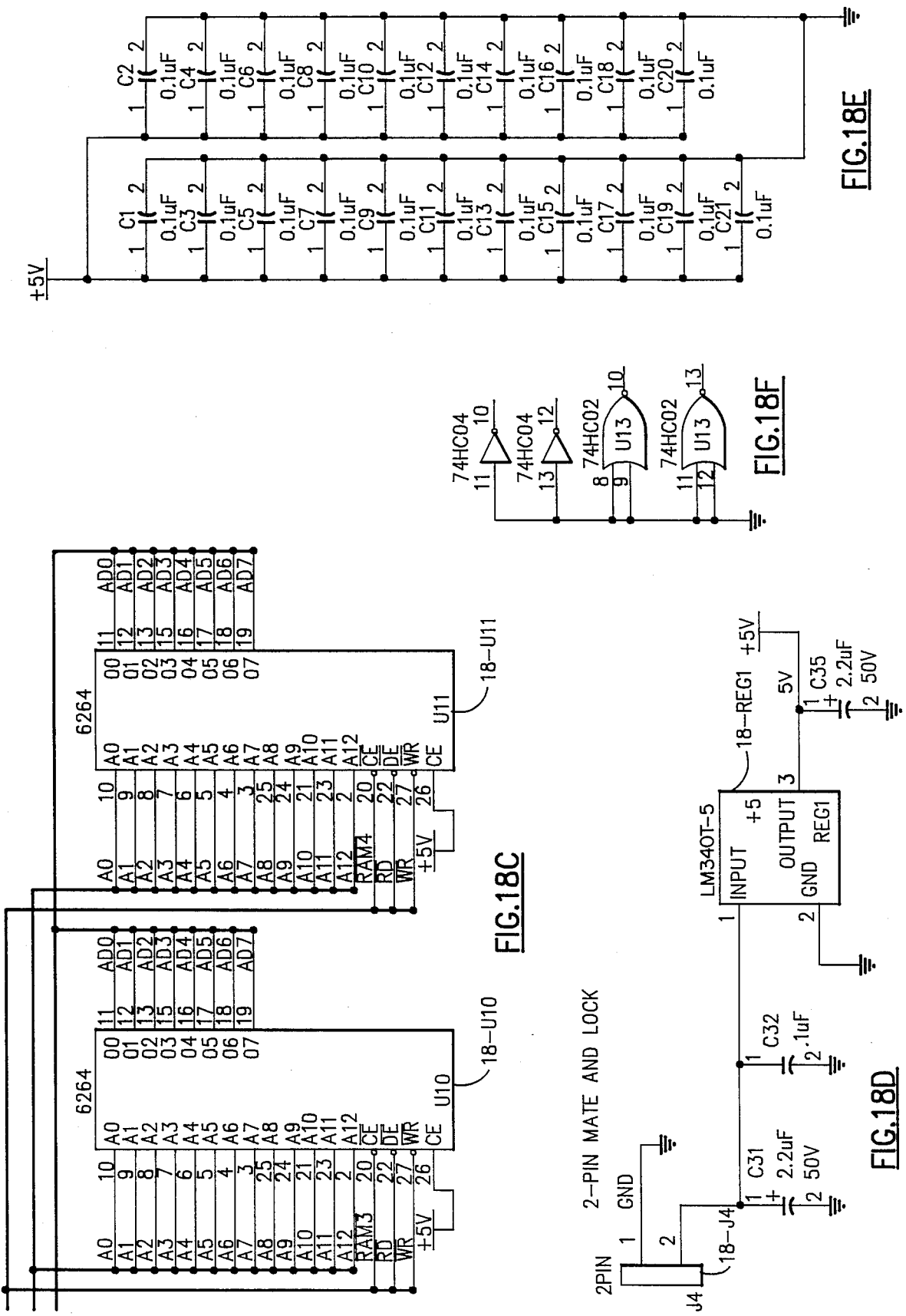

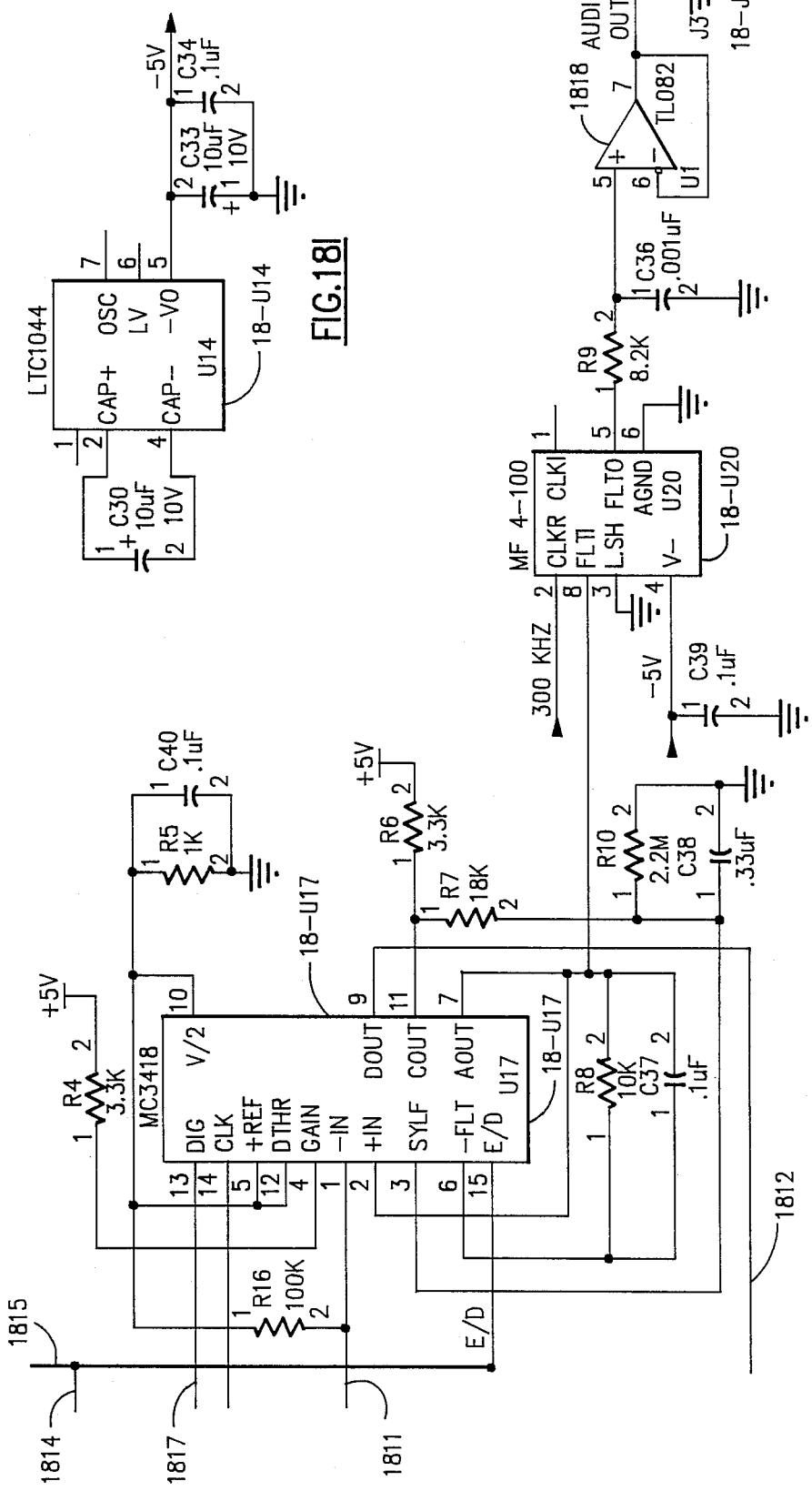

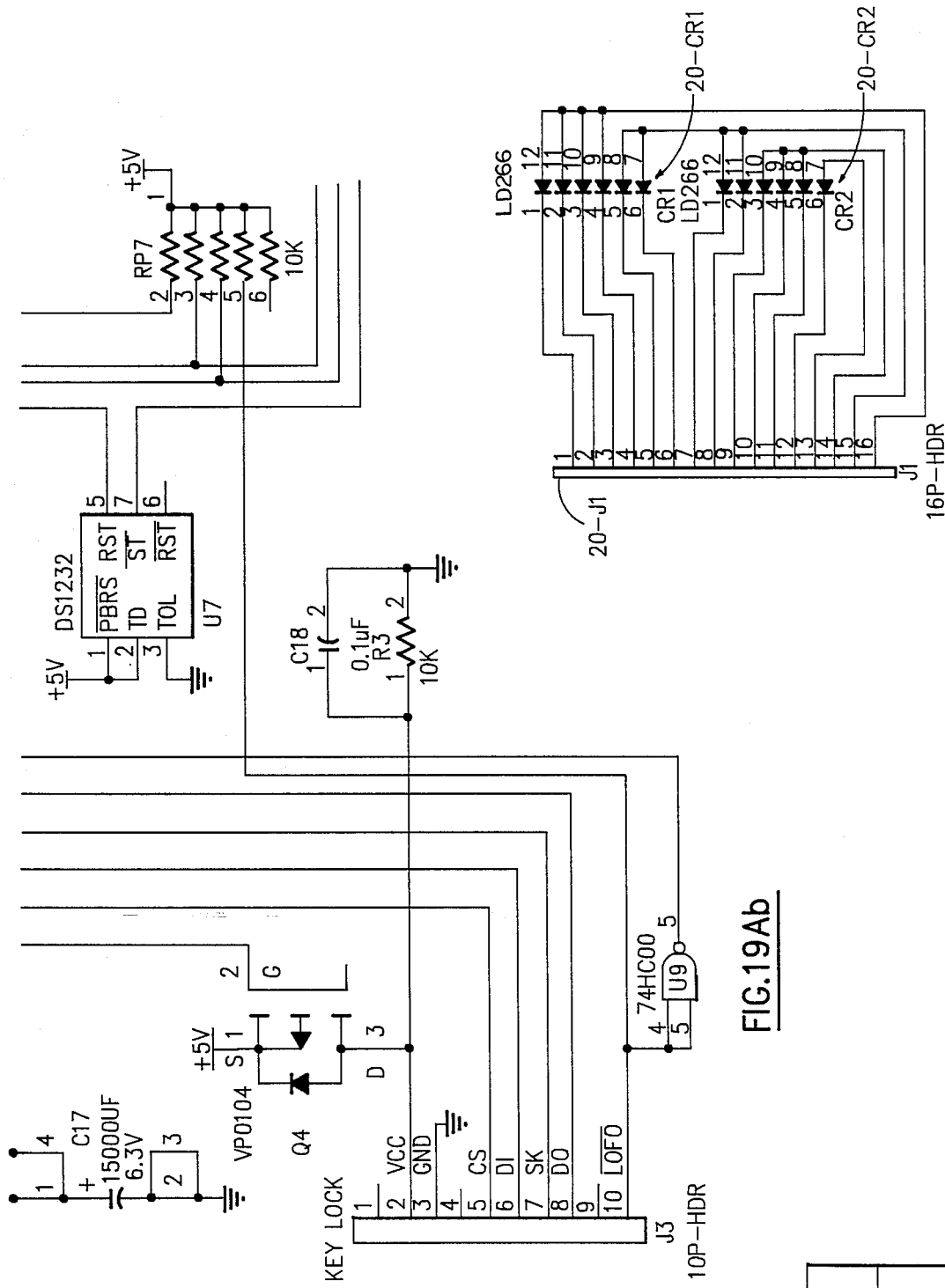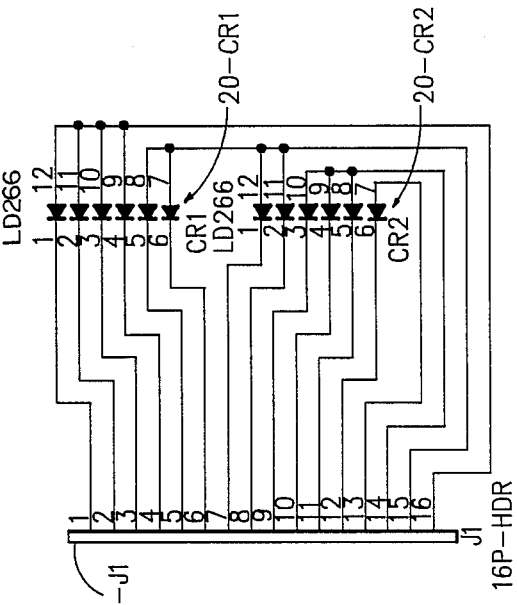
FIG.20
FIG.19Ab
FIG.19A

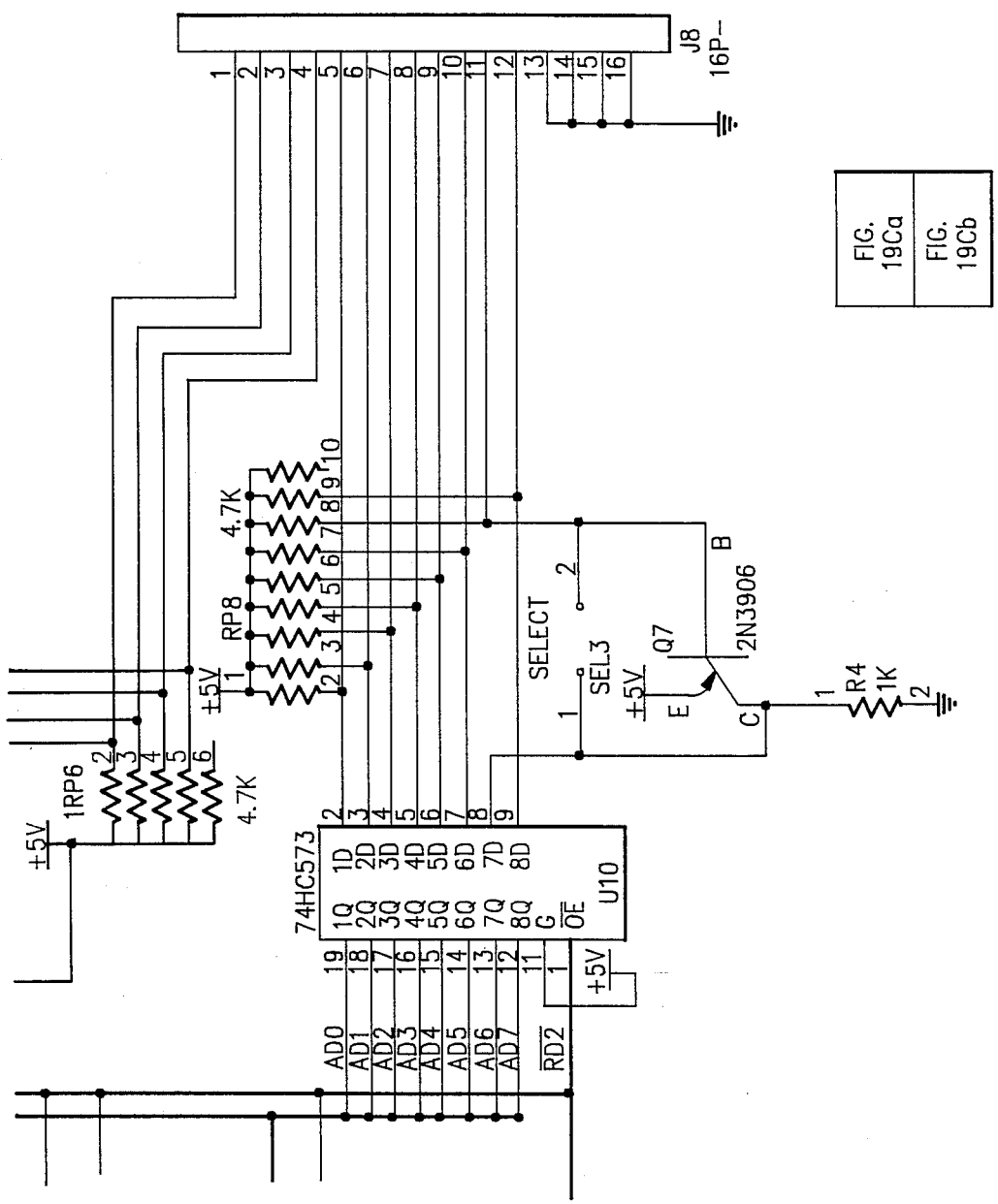

NOTES:
1. CONNECT CHASSIS GROUND VIA STANDOFF AT MOUNTING HOLE NEAREST J1.

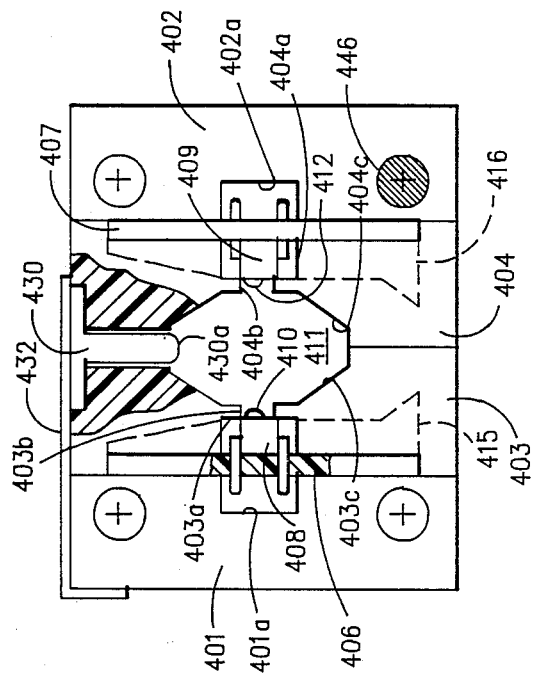
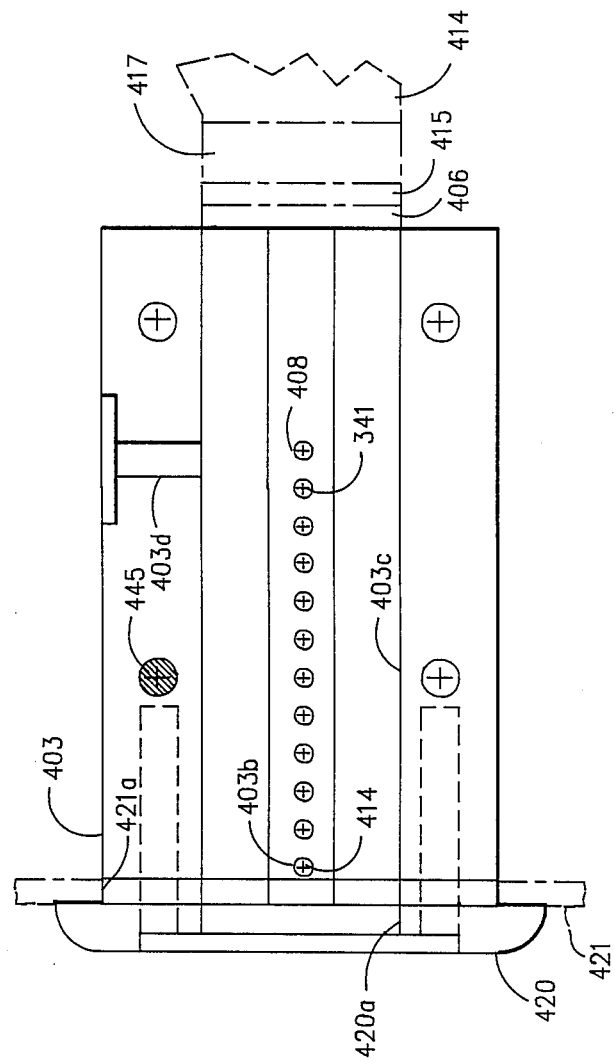
FIG.24
FIG.25

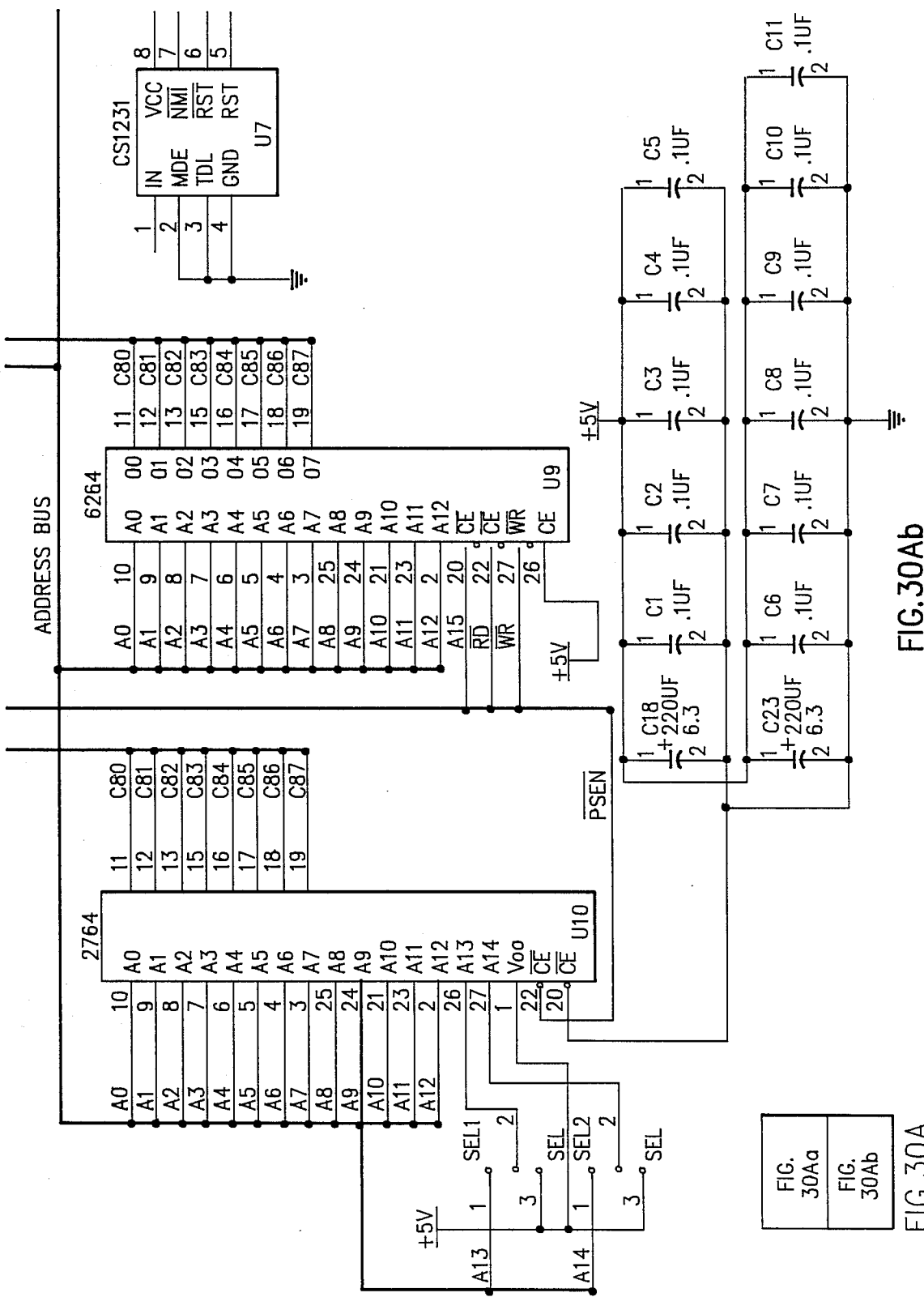

SYNTHESIZED SPEECH-FACILITATED PRODUCT PREPARATION AND/OR DELIVERY SYSTEM AND METHOD

This is a continuation-in-part of application Ser. No. 925268, filed Oct. 31, 1986, now abandoned.

BACKGROUND OF THE INVENTION

In the food service field, there is a growing trend toward making meal or snack purchases more convenient by providing delivery to the customer's home. In present systems for the home delivery of pizza, one procedure is to prepare a handwritten order indicating the type of pizza and desired toppings, and beverages, the customer's name and address, and the cost of purchase. Such an order form is then utilized by a delivery person to identify a given order and to locate the customer's home. Any illegibility or ambiguity in the hand entered data can greatly delay delivery and lead to customer dissatisfaction. Also, it has been found that the manual system may be subverted with resulting difficulties in reconciling the amount of cash turned in by each driver for a given working period with the amounts expected based on a manual processing of the order forms ostensibly assigned to each driver. Such a reconciliation may become very time consuming for a manager as a larger number of drivers work each shift.

Any effort to improve such food delivery operations should be of maximum simplicity and modularity, and ideally should be adaptable to existing operations with only modest changes in the work routine of each employee. The modularity of the system should permit the accommodation of progressively greater volume and an increase in the number of stores in a system without radical changes in the nature of the equipment and in the order processing procedure, while yet yielding enhanced efficiency and economies of scale.

SUMMARY OF THE INVENTION

It is therefore an object of the present invention to provide a food delivery data system and method affording increased accuracy in the order entry process while essentially achieving the foregoing goals of simplicity, modularity and adaptability.

Another object of the invention is to facilitate identification of a package containing a given order.

A further object is to enhance the ease and reliability with which a given order is assigned to a given delivery person.

It is also an object of the invention to ensure that orders are handled promptly and that personnel are conveniently alerted to delays in the processing of an order even where the volume of orders is extremely heavy.

Yet a further object is to facilitate delivery of food purchases over a wide area even where delivery persons are not particularly familiar with the customer neighborhoods.

Still another object is to provide an order delivery system and method which prevents mix-ups involving the identity of the delivery person responsible for each order, thus greatly simplifying and expediting the process of reconciliation of sales with cash returned by each driver.

A feature of the invention resides in the provision of a food order entry system keyed to customer telephone numbers so that repeat orders for a given address are readily identified and more quickly and reliably processed.

A further feature enables the printing of order entry data onto a delivery slip which is readily applied to the order package and which can be mechanically read for example at a driver check-out station.

Another feature relates to a driver check-out station which reliably determines driver identity and accurately associates such identity with a given food order ready for delivery.

Still another feature resides in a speech editing and delivery system for generating high quality speech messages which have been found in actual practice to measurably increase productivity and efficiency while sustaining a sense of assurance that orders will be completed in a timely and accurate manner without excessive stress, and enhancing the worker's feelings of achievement and unity with fellow workers.

Other objects, features and advantages of the present invention will be apparent from the following detailed disclosure taken in connection with the accompanying drawings, and from the relationships and individual features of the respective claims appended hereto.

BRIEF DESCRIPTION OF THE DRAWINGS

FIG. 15B being a continuation of FIG. 15A to the right, FIG. 15C being a continuation of FIG. 15B to the right, FIG. 15D being a continuation of FIG. 15C upwardly and to the right, FIG. 15E being a continuation of FIG. 15A in a downward direction, FIG. 15F being a continuation of FIG. 15B in a downward direction, FIG. 15G being a continuation of FIG. 15C in a downward direction and a continuation of FIG. 15F to the right, FIG. 15H being a continuation of FIG. 15F to the right, FIG. 15I (on sheet 15 of the drawings) being a continuation of FIG. 15G to the right, and FIG. 15J (on sheet 16 of the drawings) showing power input circuitry for FIGS. 15A through 15I.

FIGS. 16A through 16H show exemplary circuitry for the voice modules of FIGS. 14A and 14B, FIG. 16C being a continuation to the right of FIGS. 16A and 16B, FIG. 16D being a continuation to the right of FIG. 16C, FIG. 16E being a continuation in a downward direction of FIGS. 16B and 16C, and FIG. 16G being a continuation to the right of FIG. 16E;

FIGS. 18A through 18I illustrate an exemplary speech editor circuit for generating speech data for the speech generator of FIGS. 16A et seq., FIG. 18B being a continuation of FIG. 18A to the right, FIG. 18C being a continuation of FIG. 18B to the right, FIG. 18G being a continuation of FIGS. 18A and 18B in a downward direction, FIG. 18H being a continuation of FIG. 18B in a downward direction, and being a continuation of FIG. 18G to the right;

FIG. 20 shows a series of infrared emitting diodes which may be utilized in conjunction with the circuitry of FIGS. 19A through 19F in the scanner box of FIG. 14A.

FIG. 24 is a diagrammatic view illustrating a key receptacle for association with the scanner box of FIG. 14A and for receiving the key configuration of FIGS. 21, 22 and 23;

FIG. 25 is a diagrammatic longitudinal sectional view showing one-half of the key receptacle of FIG. 24 associated with a faceplate for mounting of the key receptacle in a wall of the scanner box;

DETAILED DESCRIPTION

FIGS. 1 through 6 illustrate various order processing stations in a system for delivering freshly prepared food such as pizza to the homes of individual customers. In a preferred conception, FIG. 1 may be taken as illustrating the conversion of an existing order entry station to one for practicing an initial type of embodiment in accordance with the present invention.

Figure 2:
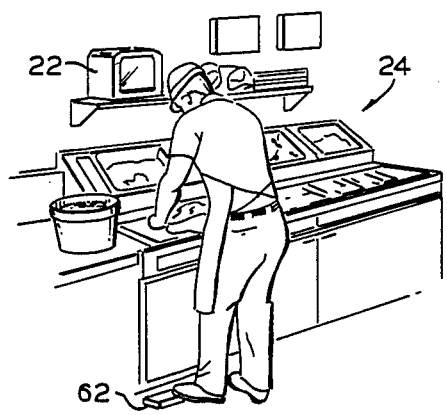
FIG. 2 is a diagrammatic illustration of a cook station which may be suitably coupled with the station of FIG. 1.

In a manual type of order station where the product is to be delivered to the customer's home, an employee 10 receives a phone order for the product e.g., via a telephone set 11, and manually fills out an order slip with the customer's address and particulars concerning the order. The handwritten order slip may then be manually transported to a cook station such as indicated in FIG. 2. If as an option the customer may pick up an order and pay for it in cash, the order entry station may also have a point of sale terminal 12 with a cash drawer 14. In a busy period of the day, additional employees may answer further telephones such as indicated at 16 through 18, (the point of sale terminal being located at a different work station for example).

Figure 10:
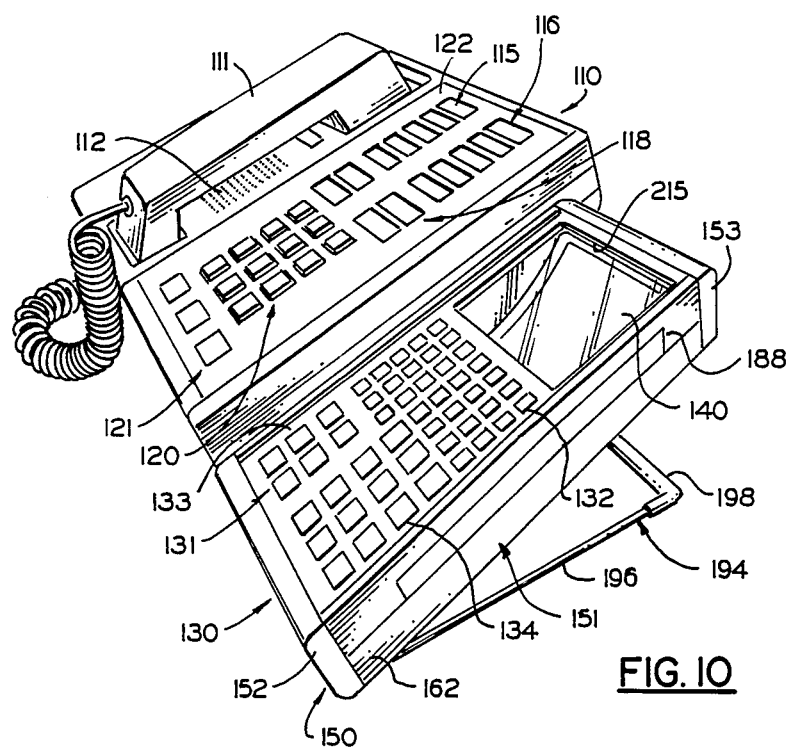
FIGS. 10, 11, 12, and 13A through 13E illustrate a preferred form of microterminal for use at an order entry station such as shown in FIG. 1.
Figure 11:
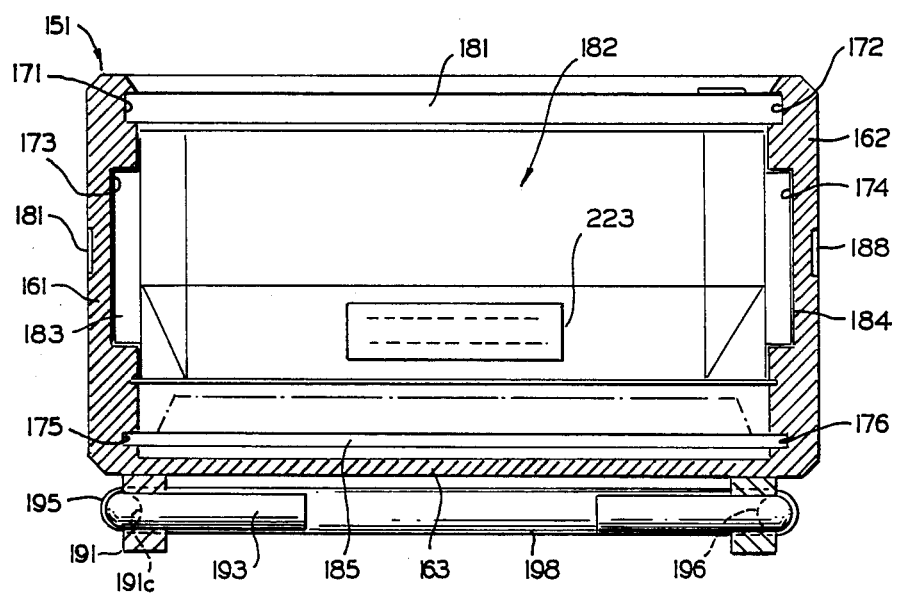
Figure 12:
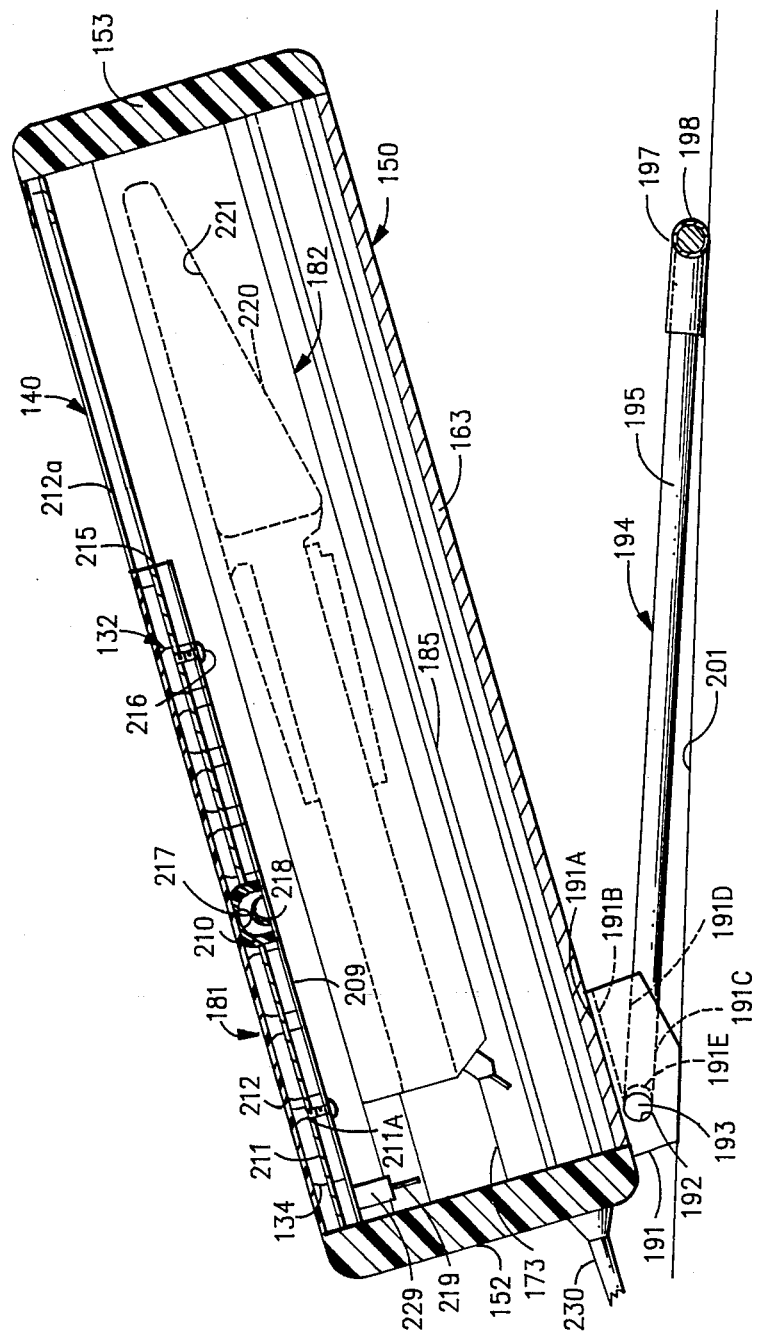

In a preferred embodiment according to the present invention, the conventional point of sale terminal 12 is replaced by one or more microterminals, preferably with a microterminal associated at the right-hand side of a telephone set for a right-hand operator, and at the left side for a left-handed person. (A preferred microterminal configuration is shown in FIGS. 10, 11, and 12). The or each microterminal is then coupled via data transmission means such as indicated at 20 in FIG. 1 to stations such as that indicated in FIG. 2, each provided with suitable remote data presentation means such as a printer, or a monitor 22 as actually shown at cook station 24 in FIG. 2.

Figure 6:
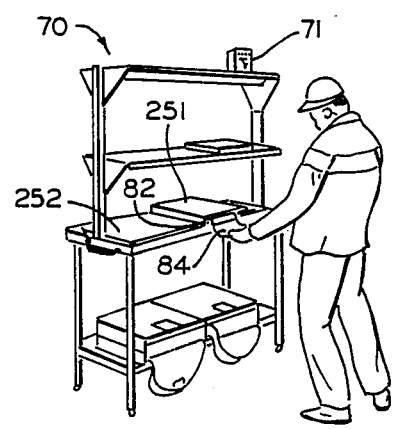
FIG. 6 is a diagrammatic illustration of a driver check-out station where respective drivers identify individual orders which are assigned to them for delivery.

In an embodiment which avoids the need for employees to enter customer addresses via the microterminal keyboard, the order entry employee may key-in only the customer's telephone number and order. If it is a repeat customer, for example, the customer's address may have been stored in the system by a specially trained person based on an earlier hand-entered order. In this case, the system will automatically display the stored address at the microterminal screen in response to entry of the customer telephone number, and this address may be verified during the taking of the current telephone order. (For the case of a new customer or a new address, the address may be transmitted by the customer with the use of a push button telephone set directly to the system and be orally verified based on its on-line display at the microterminal, or the customer's voice statement of the address may be digitally recorded directly by the system e.g. for transcription by the delivery person at a check-out station such as shown in FIG. 6.)

Figure 7:
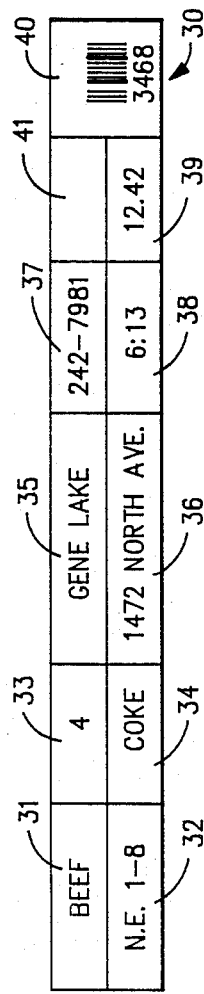
FIG. 7 illustrates an exemplary bar code label as prepared at the order entry station of FIG. 1.

Entry of an order for home delivery on the microterminal of FIGS. 10, 11, and 12 may produce a printed bar code label 30 such as indicated in FIG. 7. The bar code label 30 may have zones 31-40 for receiving order data. A bar code at zone 40 may represent an order number (such as 3465) assigned to the order by the system. In an initial implementation, an individual bar code label may be printed out by a bar code printer 42 at the order entry station for each order, and then other data may be entered by hand directly on the label. In a more advanced implementation, some or all of the data may be machine printed on the label at the respective zones 31-39 by the system. For example, the telephone number is preferably entered on the microterminal in even an initial implementation of the system, and would be readily machine printed at zone 37. The order data at 31, 33 and 34 is also coded into the system and readily machine printed. In a manual system the customer may be asked to describe his location, or an experienced person may enter geographical data other than address at zone 32 (e.g. a directional indication "N.E." northeast, and/or a grid indication "I-8" representing a sector defined in orthogonal coordinates with letters A, B, C, ..., I, J, K, ... designating geographical regions along one axis and with numerals 1, 2, 3, ..., 8, 9, 10 ... identifying geographical regions by means of the other axis.) The system may include a real time clock and enter the time of the order at 38. The total cost may be entered at 39. For a cash payment, region 41 may indicate if payment is to be made by a larger denomination bill (e.g. a twenty dollar bill). If payment is by credit, space 41 may indicate system approval for the amount of the order.

Figure 3:
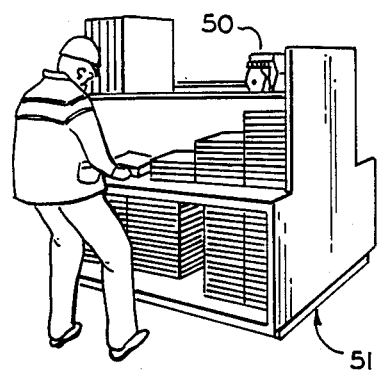
FIG. 3 is a diagrammatic illustration of a box make-up station which may also be coupled with the station of FIG. 1.

In a later phase of implementation of the system, all of the data for zones 32 and 35, 36 and 37 may be stored in the system for prior customers so that a complete label may be readily printed out at a bar code printer 50 at a remote station such as shown in FIG. 3, e.g. a box makeup station for the case of a pizza home delivery system. In an intermediate phase, label segments may be printed out on a web type backing strip at printer 42, FIG. 1, and may be periodically picked up by an employee from the station of FIG. 3, for example.

Figure 4:
FIG. 4 is a diagrammatic illustration of a baking station, for example for carrying out the baking of pizzas prepared at the station of FIG. 2, and which station may be coupled with the system of FIGS. 1 through 3 and may, for example, include a voice synthesis means for assisting in the baking process.
Figure 5:
FIG. 5 illustrates a boxing station which may assemble the components prepared at the stations of FIGS. 3 and 4, for example placing each pizza as prepared at the station of FIG. 4 in a box having a corresponding label affixed thereto from the station of FIG. 3.

For new customers, the order entry employees may themselves enter a new address into the system via the microterminal keyboard. The system may be programmed to automatically enter desired further geographical data e.g. at zone 32, FIG. 7. In some cases, a special computerized system (e.g. a speech recognition system) may be assigned by the order entry employees to take address information from the customer (if acceptable to the customer), the order entry employee then returning to the telephone line to confirm the address as entered into the system. As an alternative, actual voice instructions from the customer could be digitally recorded and transmitted to a hand held data unit of the particular delivery person assigned to deliver the order. Such instructions could then be stored for future recall in the case of a repeat order from the same phone number. The recorded instructions could be replayed to the customer during receipt of a new order, for confirmation. Under certain circumstances, the customer telephone number could be transmitted to a driver's data unit by the data transmission system and could be available to effect automatic dialing of the customer from the delivery vehicle when desirable. For faster service, stations such as shown in FIGS. 3, 4 and 5 could be located in a delivery vehicle, the data transmission means such as 20 providing a radio coupling to a readout means such as printer 50. Such a system could be programmed to determine when a delivery vehicle should return to a central location e.g. as represented at FIG. 2, and the optimum sequence for beginning the baking of each order, and the actual delivery sequence for given orders.

Figure 1:
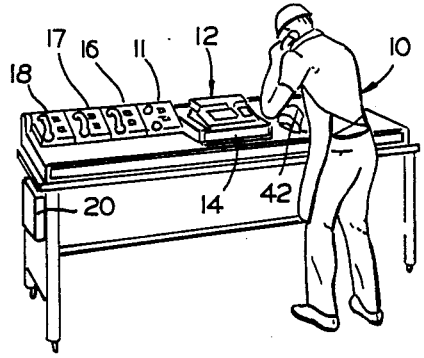
FIG. 1 is a somewhat diagrammatic illustration of an order entry station which may be adapted to an initial embodiment in accordance with the present invention.

As an example of an embodiment involving a larger operation, the order entry station of FIG. 1 may be centralized with a single telephone number serving a wide geographical area such as a city and suburbs. The geographical zones could then be numerically designated as at 60 in FIG. 8, ("370-005" e.g. representing a store number five of an owner or manager designated by number 370), each order being transmitted to a particular bake shop location such as represented at FIGS. 2 through 6 of a geographically dispersed group of such shop locations, or some of all of the orders being transmitted to mobile vehicles containing equipment such as indicated in FIGS. 2 through 6.

Referring to a cook station such as shown in FIG. 2, each order from the station of FIG. 1 may be stored in the system ready for display at readout means such as monitor 22, FIG. 2. When the cook completes a given order shown on monitor 22, the switch means or "bump bar" such as 62 is actuated e.g. by foot for signalling the system to display the next order; or a voice actuated switch may shift the display to the next order in response to a spoken command.

Figure 8:
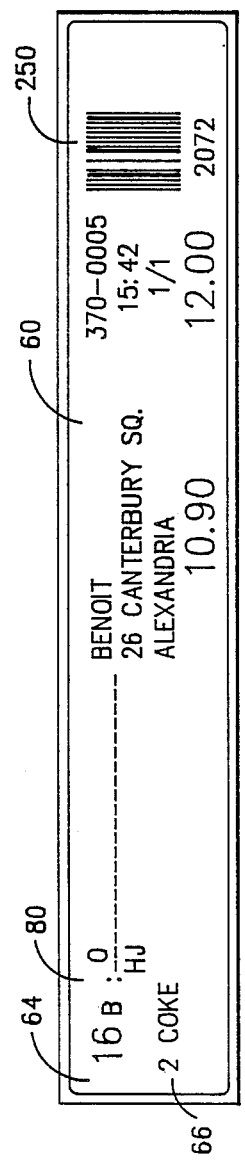
FIG. 8 may illustrate an alternative bar code label which may be printed out at a remote station such as that of FIG. 3.

As shown at 64 in FIG. 8, the order may be displayed in an abbreviated format (e.g. "16" signifying a sixteen-inch diameter pizza, "B" signifying a "beef" type of pizza "O" calling for "everything" on one-half of the pizza, and "H" and "J" indicating only ham and bacon toppings on the other half).

Where an order includes beverages at a region such as 66, FIG. 8 (or at zones 33, 34, FIG. 7), this part of the order can be filled by the delivery person who may be reminded in this respect at a check-out station 70, FIG. 6, e.g. via a voice synthesizer unit 71.

Such voice synthesizer units may be located at other stations as may be desired as a more elaborate system becomes justified, for example to warn when a particular order has not reached the check-out station 70 within a pre-programmed time interval from the time of entry of the order. One or more voice synthesizers such as that at 71 may periodically state the number of minutes a given overdue order has been in the shop.

The label segment of FIG. 7 or FIG. 8 may be adhesively backed so as to be strippable from a backing strip or web such as indicated at 80, FIG. 8. Each label segment is then applied to a suitable size box at a station such as indicated in FIG. 3.

The driver check-out station 70 may include an instant bar code reader e.g. at a fixed location 82 for reading the bar code representing the order identification number (e.g. number 2072, FIG. 8). With the order identified the driver may receive a voice reminder from unit 71 as to beverages to accompany the order, the amount of change required, and any digitally recorded message recorded during order entry.

In practice, it has been found important to identify the driver who takes each other for delivery. In a preferred system, the driver has a key secured to an expansion cord holder on his belt, and each key is of a unique coded configuration. As a further precaution, it is preferred that the driver enter a confirming personal identification code on a keyboard 84. Entry of the correct personal identification code may trigger a flash of the instant bar code reader at 82, and also confirm that the particular driver is on duty. Instead of a key, the driver may insert (and thereby couple with the system) a personal hand held data unit with the driver's personal identification number encoded therein, e.g. an intelligent card type unit fitting in a shirt pocket. Concerning a shirt pocket size intelligent data terminal unit with built-in bar code scanning and communications capabilities, see Dennis Alan Durbin, Raymond C. Lo, Gary A. Welsch and Steven J. Kelly application for patent "Intelligent Information Card Terminal System," U.S. Ser. No. 897,547 filed Aug. 15, 1986. Upon the driver entering the corresponding number at keyboard 84, the system could read the bar code label at 82 and load the driver's data unit with customer telephone number and any relevant digitally coded speech instructions such as delivery instructions, including customer address and directions to reach the address, and preferences such as delivery to a back door or the like. A slip similar to that shown in FIG. 9 may be printed in the delivery vehicle based on data in the driver data unit so as to be handed to the customer to show the amount due. Further customer location information may be input by the driver e.g. as a speech input to the hand held driver data unit at the time of delivery, for later uploading into the system e.g. when the driver deposits its cash at the store. Such cash deposits may be entered into the store data system so that the system keeps track of cash accumulations by each driver and can advise each driver during check out via speech synthesizer unit 71 when a further deposit of accumulated cash is advisable.

Under some circumstances, the labels may include embedded magnetic material which will trigger an alarm when removed from the store, the check-out station 70 including means to electrically modify the state of the magnetic material when the order it assigned to a driver in the approved manner.

A preferred microterminal for the systems, as described herein, is described in an application for patent of George E. Hanson entitled "TELEPHONE ORDER ENTRY SYSTEM AND TERMINAL THEREFOR", U.S. Ser. No. 049,778 filed May 12, 1987. For the sake of further identification, it is noted that FIGS. 10, 11, 12 and 13A through 13E hereof correspond to FIGS. 1, 2, 3 and 4A through 4E of said application in the name of George E. Hanson. A description from said application is as follows:

Description of FIGS. 10, 11, 12 and 13A–13E

FIG. 10 illustrates a conventional telephone console 110 which may, for example, be a commercially available "Merlin" telephone including a hand set 111 and a speaker phone 112. A group of consoles such as 110 may be used to selectively answer calls on a group of incoming telephone lines, the respective lines being selectable by means of selector keys arranged in groups as indicated at 115 and 116 at FIG. 10. Various control keys are arranged in a group at 118 for effecting "hold", "transfer" and other functions. A conventional set of dialing keys is indicated at 120 and other control keys are indicated at 121. It will be observed that the front panel 122 of the console is disposed at a convenient angle, for example about twenty-two degrees to a horizontal support surface such as a table surface having a number of such consoles thereon.

Adjacent each telephone console 110, there is arranged an order entry terminal 130 constructed in accordance with the present invention and preferably mounted so that its keyboard 131 lies in a plane disposed at an acute angle to the supporting surface corresponding to the angle of front panel 122. By way of example, keyboard 131 preferably includes a complete set of alphabetical characters, together with various symbol characters at an upper region 132, includes a set of control keys at a left-hand region 133 and a set of numeric keys at a region 134. Preferably a cathode ray tube display is located beneath a viewing lens 140 so as to provide for a display of a number of lines of characters.

In a preferred embodiment, terminal housing 150 is formed of a U-shaped body part 151 with respective end caps 152 and 153. In a particularly preferred embodiment as shown in FIG. 11, the body part 151 is formed of an aluminum extrusion providing integral side walls 161 and 162 and a bottom wall 163. The side walls 161 and 162 are configured so as to provide opposing pairs of guide channels 171, 172; 173, 174; and 175, 176. A keyboard assembly diagrammatically indicated at 181 is slidably supported at its marginal regions in channels 171 and 172, while a display module indicated at 182 is slidably supported by means of guide bars 183 and 184 which fit into the respective channels 173 and 174. A terminal management controller board 185 is slidably supported in the channels 175, 176. Name plates identifying the manufacturer of the terminal may be provided at 187 and 188 at shallow external grooves in the sidewalls 161 and 162. In assembly of the terminal, the respective subassemblies 181, 182 and 185 are engaged in the respective sets of cooperating channels and moved there along into the desired positions, whereupon the endcaps 152 and 153 may be applied so as to retain the parts in a desired fixed relationship.

Further preferred features of the illustrated embodiment are shown in FIG. 12 which is a somewhat diagrammatic longitudinal sectional view. As seen in FIG. 12, mounting blocks such as 191 are secured to the bottom wall 163 of the housing 150 and are provided with receiving apertures such as 192 for receiving in turned ends such as 193 of a mounting base 194 for the terminal. In the illustrated embodiment the base 194 is formed by a cylindrical cold rolled steel wire having a diameter of 0.250 inch and having a nickel plate finish. The wire is bent into a generally rectangular configuration so as to provide side pieces such as indicated at 195, FIG. 12, and 196, FIG. 10, with a transversely extending connecting part 97 having a protective covering 198 of suitable frictional material, for example neoprene tubing.

The mounting blocks such as 191 are provided with mounting surfaces such as 191A secured in flatwise engagement with the undersurface of a bottom wall 163 of the housing. The mounting blocks 191 are provided with first recesses 191B with axes generally parallel to the mounting face 191A, and second recesses 191C with axes disposed at a desired inclined angle such as twenty-two degrees. In FIG. 12, the mounting base 194 is shown locked in engagement with recesses such as 191C so that the terminal 150 is disposed at a desired inclined relationship to a flat supporting surface such as indicated at 201. For purposes of shipping and the like, the base 194 may be shifted from engagement with the recess 191C to engagement with the recess 191B so as to provide a more compact overall configuration for shipping or the like. A protrusion is indicated at 191D between the recesses 191B and 191C which serves to retain the base 193 in the respective recess into which it is adjusted. Each mounting block such as 191 is relieved at a region such as indicated at 191E to enable the respective in turned ends such as 193 to be inserted into the respective mounting blocks 191 prior to the mounting blocks being secured to the housing 150.

In the embodiment illustrated in FIG. 12, the keyboard assembly 181 includes a printed circuit board 209 supporting an array of silicone rubber actuators 210, an aluminum plate 211 with an array of apertures for receiving the respective actuators, and a membrane overlay 212 for identifying the respective keys. As shown in FIG. 12, the aluminum plate 211 contains a relatively larger aperture 215 at its forward end which is aligned with the viewing means such as a window means 140. The printed circuit board 209 may be secured at the proper spacing relative to the aluminum plate 211 by means of tapped holes such as indicated at 211A receiving screws such as indicated at 216.

In a preferred embodiment components 209, 211, 212 and 140 form a preassembled unit which is simply inserted into the receiving guide channels and moves there along to the desired position. A ribbon cable is indicated at 219 which plugs into an array of receiving holes at the underside of printed circuit board 209. Keyboard encoding is partially accomplished by the positioning of the traces on the circuit board 209 below the respective columns of keys. The keyboard is scanned and each key has its own row-column position to identify the character associated therewith.

As indicated in FIG. 12, the display module 182 may comprise a flat cathode ray tube 220 having a luminescent screen 221 disposed at an angle so as to be readily viewed through window means 140. A ribbon cable 222 connects a receptacle 223, FIG. 11, of the display module 182 with the terminal board 185. The ribbon cables such as 219 and 222 are provided with connectors such as 228 and 229 so that the cables can be detached from the keyboard unit 181 and the display module 182 and these units removed via their guide channels. In the preferred embodiment, only one cable connects the order entry terminal to external power and data communication lines.

In one particularly advantageous embodiment, the overall size of the terminal 130 is 4.5 inches by 2.5 inches by 9.25 inches. The wire base 194 has side parts 195 and 196 with a length of 7.0 inches, a connecting part 197 with a length of 4.5 inches, and in turned free end parts such as 193 with a length of 1.0 inch. In the keyboard assembly 181, the aluminum plate 211 had an overall length of 8.85 inches, a width of 4.40 inches, and a thickness of 0.062 inch. The aluminum plate had a rectangular aperture 215 with a height of 2.95 inches and a width of 3.50 inches for alignment with the window means 140. The overall thickness of the keyboard subassembly was 0.222 inches, the cooperating guide channels 171 and 172, FIG. 11, having a height dimension of 0.230 inch. In one example, the dimensions of the display module 182 were width, 104 millimeters; height, 204 millimeters; and thickness, 41 millimeters. The effective screen area is defined by a width of 81 millimeters, and a height of 59 millimeters, to provide a diagonal measurement of about 101 millimeters (about four inches). The guide bars 183 and 184 were provided with a height dimension of 1.15 inch, and a length generally of eight inches. The cooperating channels 173 and 174 had a corresponding height dimension of 1.15 inch and a depth of about 0.075 inch. The terminal board 185 had a width of 4.4 inches and a length of 9.1 inches. The cooperating guide channels 175 and 176 had a height dimension of 0.062 inch. The circuitry of the processor board 185 controlled the display tube 220 and provided interface to the keyboard. All of the video signals may be generated on the terminal board 185, as indicated in the accompanying FIGS. 13A-13E.

Exemplary control codes, escape codes and switch positions for an exemplary terminal configuration are shown on the following pages. The switch positions refer to switches SW1, SW2 and SW3, FIG. 13A, as indicated parenthetically in the following tabulation.

| | Micro Terminal Control Codes |
|---|---|
| CTL @ | Switches terminal to local mode |
| CTL F | Changes the display Baud rate |
| | Increments to next higher rate for each "CTL F" sequence |

| Baud Rate Table | | |
|---|---|---|
| Terminal Code | | Baud Rate |
| 00 | | 110 |
| 01 | | 134.5 |
| 02 | | 150 |
| 03 | | 300 |
| 04 | | 600 |
| 05 | | 1200 |
| 06 | | 1800 |
| 07 | Switch Setting | 2400 |
| 08 | | 3600 |
| 09 | | 4800 |
| 10 | | 7200 |
| 11 | | 9600 |
| 12 | | 19.2 KB |
| 13 | | 19.2 KB |
| 14 | | 19.2 KB |
| 15 | | 4800 |

| | |
|---|---|
| CTL G | Rings the bell |
| CTL H | Destructive backspace with wrap around |
| CTL I | Tab function - standard tab spacing is for 8 characters Screen scrolling occurs at the bottom of the page |
| CTL J | Line feed function |
| CTL K | Vertical tab with scroll blanking the intervening lines |
| CTL L | Clears the screen and homes the cursor |
| CTL M | Carriage return character |
| CTL N | Non-destructive vertical cursor movement with top to bottom scrolling |
| CTL O | Non-destructive downward cursor movement with bottom to top scroll |
| CTL P | Non-destructive left cursor movement with wrap around moving up a line on wrap |
| CTL Q | Non-destructive right to left cursor movement with wrap around moving down a line on wrap. |
| CTL R | Moves cursor to home |
| CTL S | Generates a break signal |
| CTL T | (14H) Line graphic symbol + |
| CTL U | (15H) Line graphic symbol < |
| CTL V | (16H) Line graphic symbol > |
| CTL W | (17H) Line graphic symbol — |
| CTL X | (18H) Line graphic symbol |
| CTL Y | (19H) Line graphic symbol [ |
| CTL Z | (1AH) Line graphic symbol ] |
| CTL \ | (1CH) Line graphic symbol |
| CTL ] | (1DH) Line graphic symbol |

-continued

| | | |
|---|---|---|
| CTL | (1EH) Line graphic symbol | |
| CTL — | (1FH) Line graphic symbol | |

Note: For graphic symbol control characters, attribute bit 7 must be set to zero

Micro Terminal Escape Sequences

Note: The escape key CHR$(27) is struck or transmitted before the upper case character identifying the function

| | | |
|---|---|---|
| <ESC> A | Auxiliary port control (not implemented on microterminal) | |
| <ESC> B | Display microterminal Uart configuration switch settings and Baud rate | |
| <ESC> C | Enter control mode and show all "non-displayable" ascii characters | |
| <ESC> D | Toggles the microterminal online or local | |
| <ESC> E | Toggles the microterminal from FDX to HDX and back | |
| <ESC> F | Turns control mode off | |
| <ESC> G | Flips status line to normal video and turns on the graphics attribute bit | |
| <ESC> H | Turns off the graphics attribute bit | |
| <ESC> IV | Set attributes to specified sequence "V". All subsequent characters retain this attribute setting until changed by another <ESC> IV sequence is entered | |

| Attribute Bit | Attribute |
|---|---|
| #7 | Graphics |
| #6 | Blank |
| #5 | Underline |
| #4 | Double width |
| #3 | Double height |
| #2 | Blink |
| #1 | Half intensity |
| #0 | Reverse video |

Note: A logic 0 value in a bit position enables an attribute

| | |
|---|---|
| <ESC> K | Enables or disables the keyboard |
| <ESC> L | Light pen control (not implemented on the microterminal) |
| <ESC> Mxy | Dynamic cursor control - X is the column parameter and is valid from 0 to 79<br>Y is the line parameter and is valid from 0 to 23<br>X and Y values increment up from the ASCII Blank character (20)<br>The command:<br><ESC> M (25 Hex), (26 Hex) moves the cursor to position (5,6) |
| <ESC> P | Dumps screen data to the auxiliary port - (not implemented on the micro terminal) |
| <ESC> Q | Reruns self-test |
| <ESC> R | Causes the contents of the current line from left margin to be sent to the host character by character |
| <ESC> S | Causes screen contents from the home position to the current cursor position to be sent to the host |
| <ESC> T | Erases the current line from the cursor to the right margin |
| <ESC> W | Erases switch information and Baud rate from the status line |
| <ESC> Y | Erases entire screen from the cursor location to the end of the screen including the current cursor location |

Figure 13A:
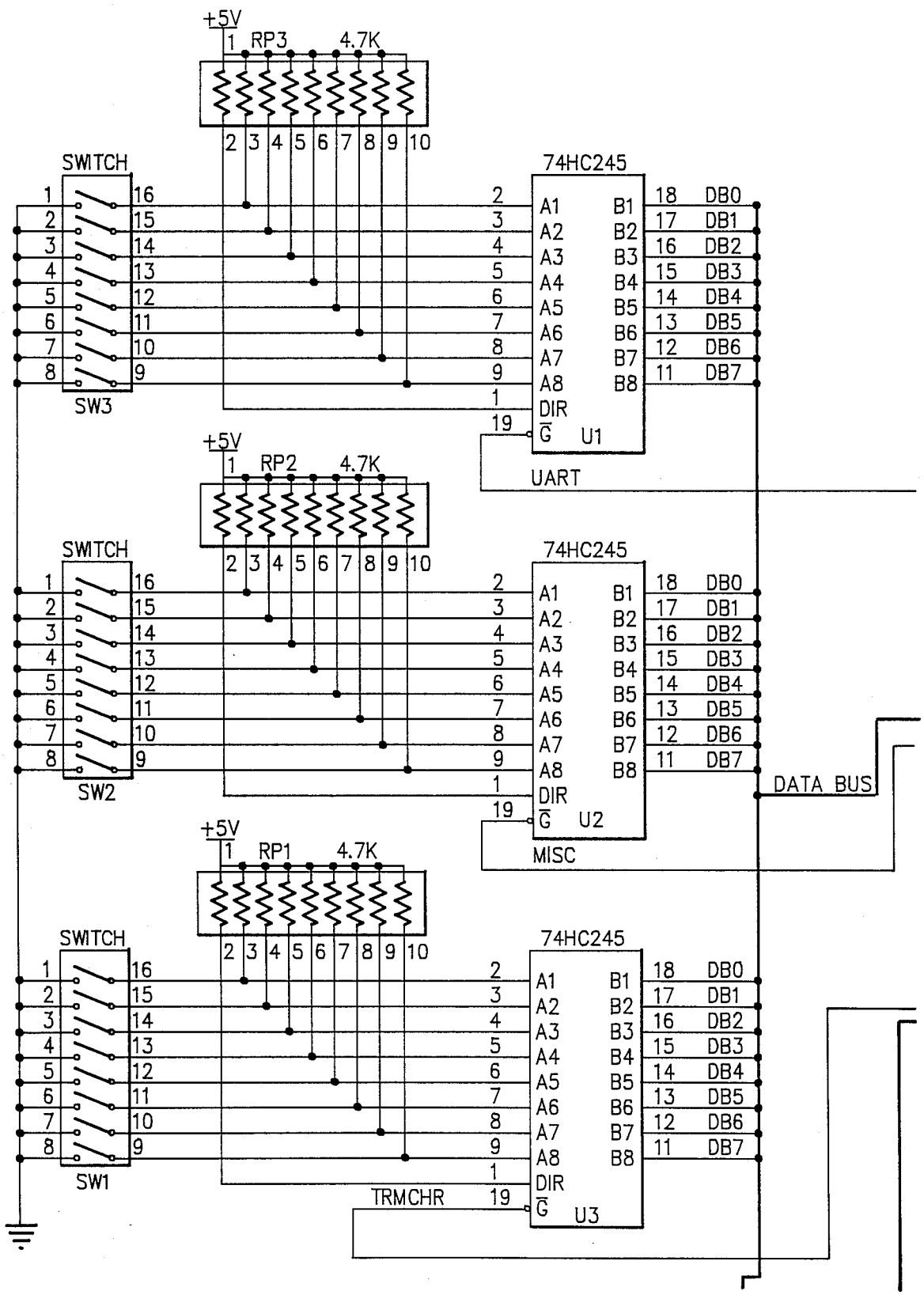
Figure 13A:
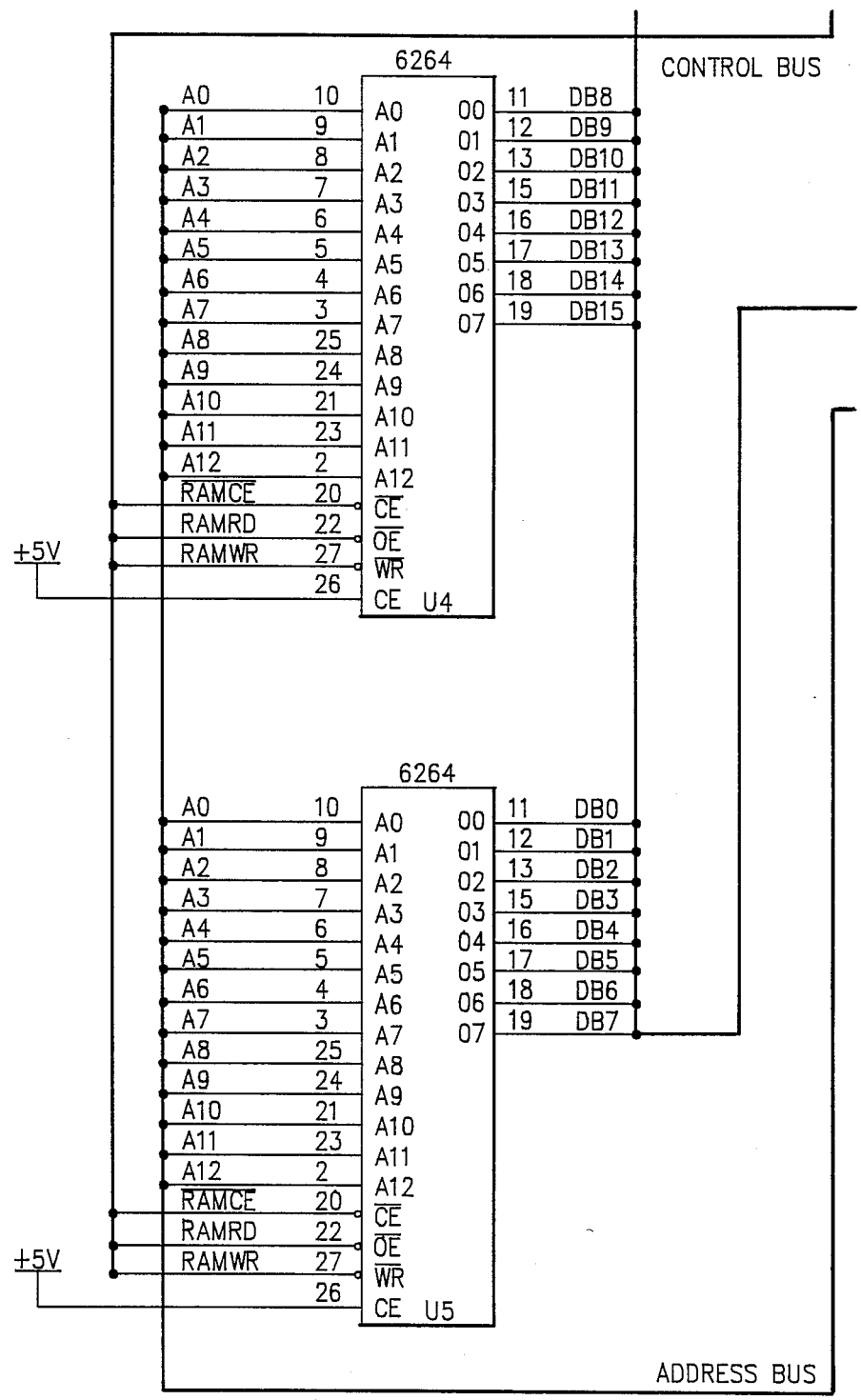

Micro-Terminal Switch Positions (FIG. 13A)

| SW 1 Switch Position | Function | Default |
|---|---|---|
| #1 | On for 50 HZ<br>Off for 60 HZ | Off |
| #2 | Loop mode<br>On connects TXD + RXD<br>Off disconnects TXD + RXD | Off |
| #3 | External test flag<br>On enabled<br>Off disabled<br>Disabled if self test is not selected | Off |
| #4 + #5 | Cursor select | |

| SW5 | SW4 | Cursor |
|---|---|---|
| on | on | solid underline |
| on | off | solid block |
| off | on | blinking underline |
| off | off | blinking block |
| | | SW #4 Off |
| | | SW #5 Off |

| | | |
|---|---|---|
| #6 | Reverse video<br>On - enabled<br>Off - disabled | Off |
| #7 | External attributes<br>On - enabled<br>Off - disabled | On |
| #8 | Power on and reset self test<br>On - enabled<br>Off - disabled | On |

Micro Terminal Switch Positions (FIG. 13A)

| SW #2 Position | Function | Default |
|---|---|---|
| #1 | On - CRLF<br>Off - CR | Off |
| #2 | Keyboard<br>On - scanned<br>Off - encoded | On |
| #3 | Local/on line<br>On - local<br>Off - on line | Off |
| #4 | FDX/HDX<br>On - FDX<br>Off - HDX | On |
| #5 | Slow<br>On - transmit slow<br>Off - Recv slow<br>Effectively disabled by #6 + #7 | On |
| #6 | Split Baud rate | Off |
| #7 | | Off |

| SW6 | SW7 | Divisor |
|---|---|---|
| on | on | 32 |
| on | off | 16 |
| off | on | 4 |
| off | off | 7 |

| | | |
|---|---|---|
| #8 | Word length<br>On - 7 bit<br>Off - 8 bit | Off |

Micro Terminal Switch Positions (FIG. 13A)

| SW #3 Position | Function | Default |
|---|---|---|
| #1, #2, #3, #4 | Band Rate | |

| SW1 | SW2 | SW3 | SW4 | Baud Rate |
|---|---|---|---|---|
| on | on | on | on | 110 |
| on | on | on | off | 134.5 |
| on | on | off | on | 150 |
| on | on | off | off | 300 |
| on | off | on | on | 600 |
| on | off | on | off | 1200 |
| on | off | off | on | 1800 |
| on | off | off | off | 2400 |
| off | on | on | on | 3600 |
| off | on | on | off | 4800 |
| off | on | off | on | 7200 |
| off | on | off | off | 9600 |
| off | off | on | on | 19.2 KB |
| off | off | on | off | 19.2 KB |
| off | off | off | on | 19.2 KB |
| off | off | off | off | 4800 |

2400 Band SW#1 on
SW#2 off
SW#3 off
SW#4 off

| | | |
|---|---|---|
| #5 + #6 | Parity Select | |

| SW5 | SW6 | |
|---|---|---|
| off | off | space if enabled |
| off | on | mark if enabled |
| on | off | even if enabled |
| on | on | odd if enabled |

SW#5 on
SW#6 off

| | | |
|---|---|---|
| #7 | Parity enable<br>On - No parity<br>Off - Parity enabled | |

SW#7 on

| | | |
|---|---|---|
| #8 | Stop bits<br>On - two stop bits<br>Off - one stopbit | |

Characteristics of the Micro Terminal

1. Current prototype boards were loaded with the switches backwards - the three switch position arrangements will be inverted on Version II (switch position #8

-continued will become #1 and so forth)
2. Graphics control characters are misinterpreted by the micro terminal board above 2400 Baud. This could be cables or software not operating properly and has yet to be repaired.
3. When double wide characters are sent to the screen, the attribute must be properly set and the characters must be sent twice (Double becomes Ddoouubbllee) The second half of the character is accessed during the second character time. Likewise with double height characters, each line should be sent twice. It naturally leads that for a double wide, double high character two lines must be sent and each one must use doublet characters.

The function and exemplary parameters for the components of FIGS. 13A–13E are tabulated as follows.

Functions and Exemplary Parameters for the Components of the Circuit of FIGS. 13A–13E.

Figure 13B:
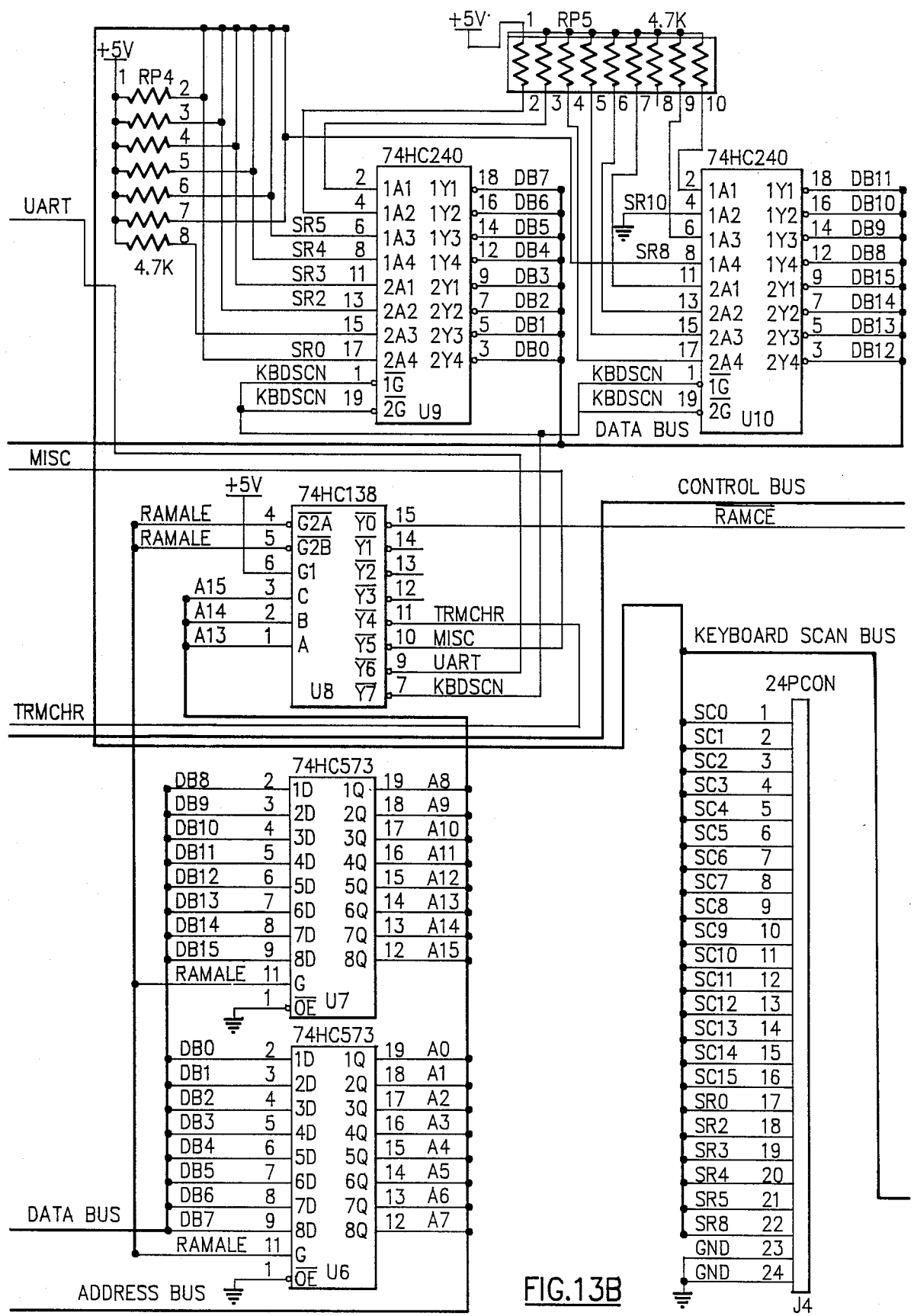
Figure 13C:
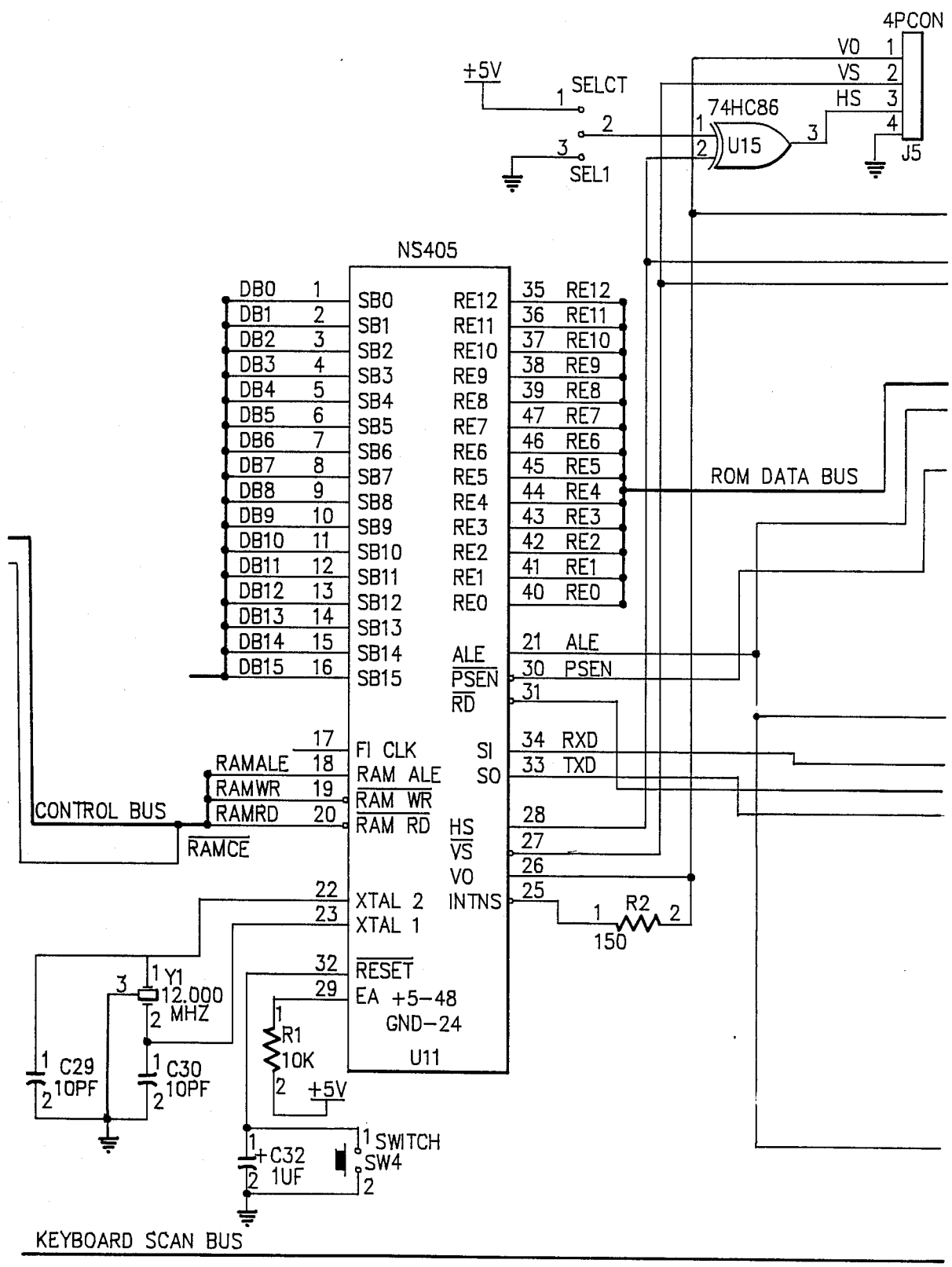
Figure 13D:
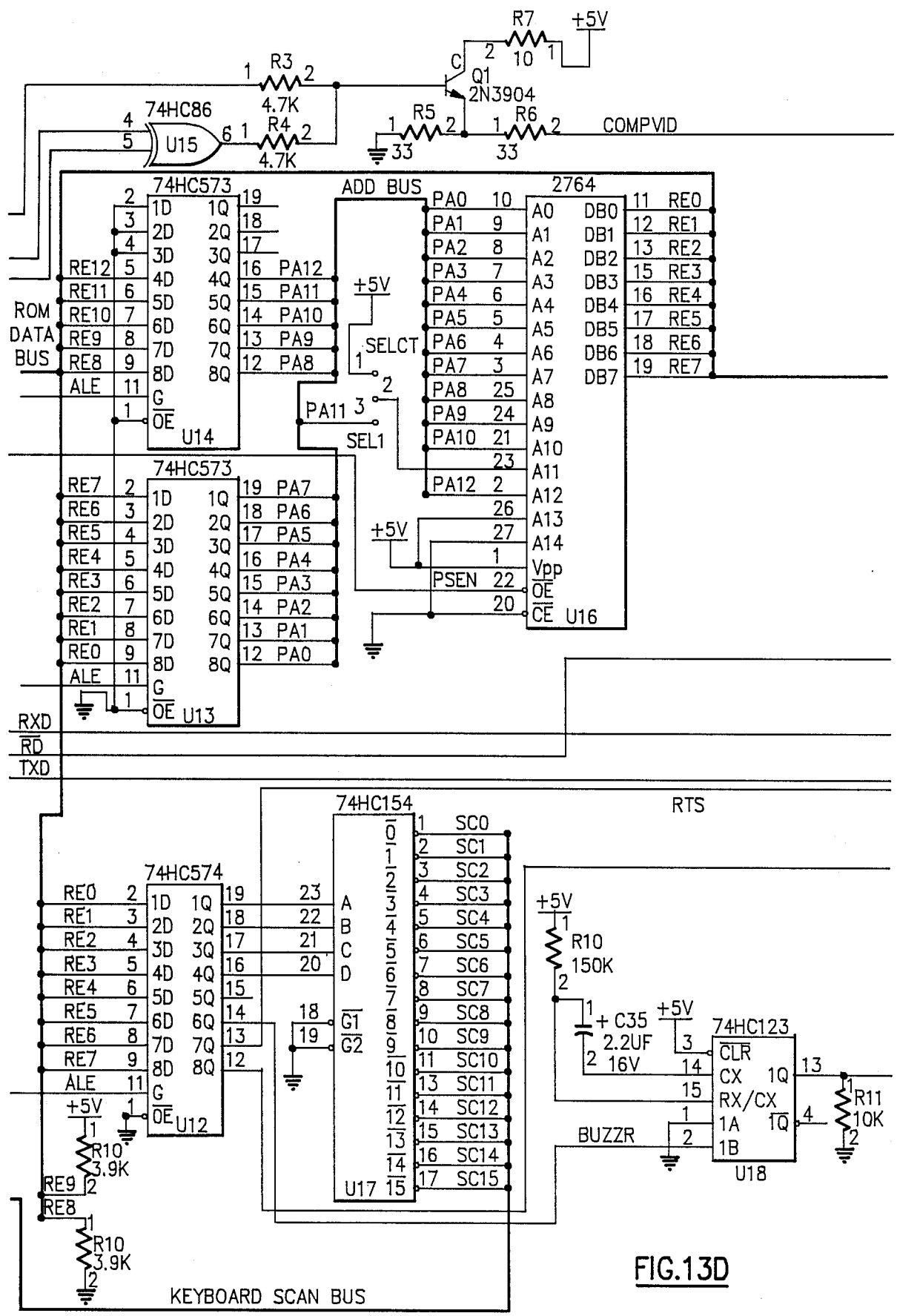
Figure 13E:
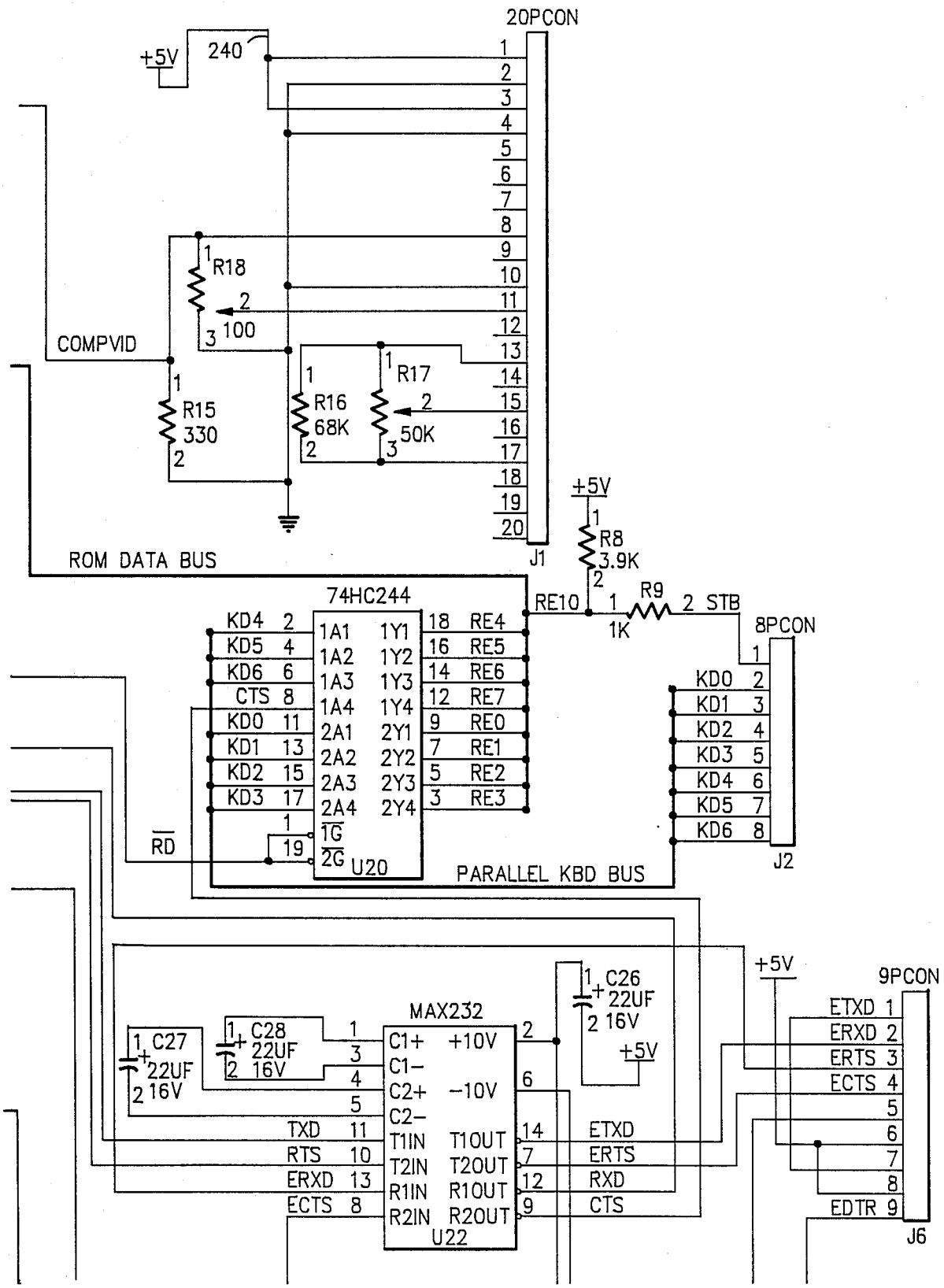
Figure 13E:
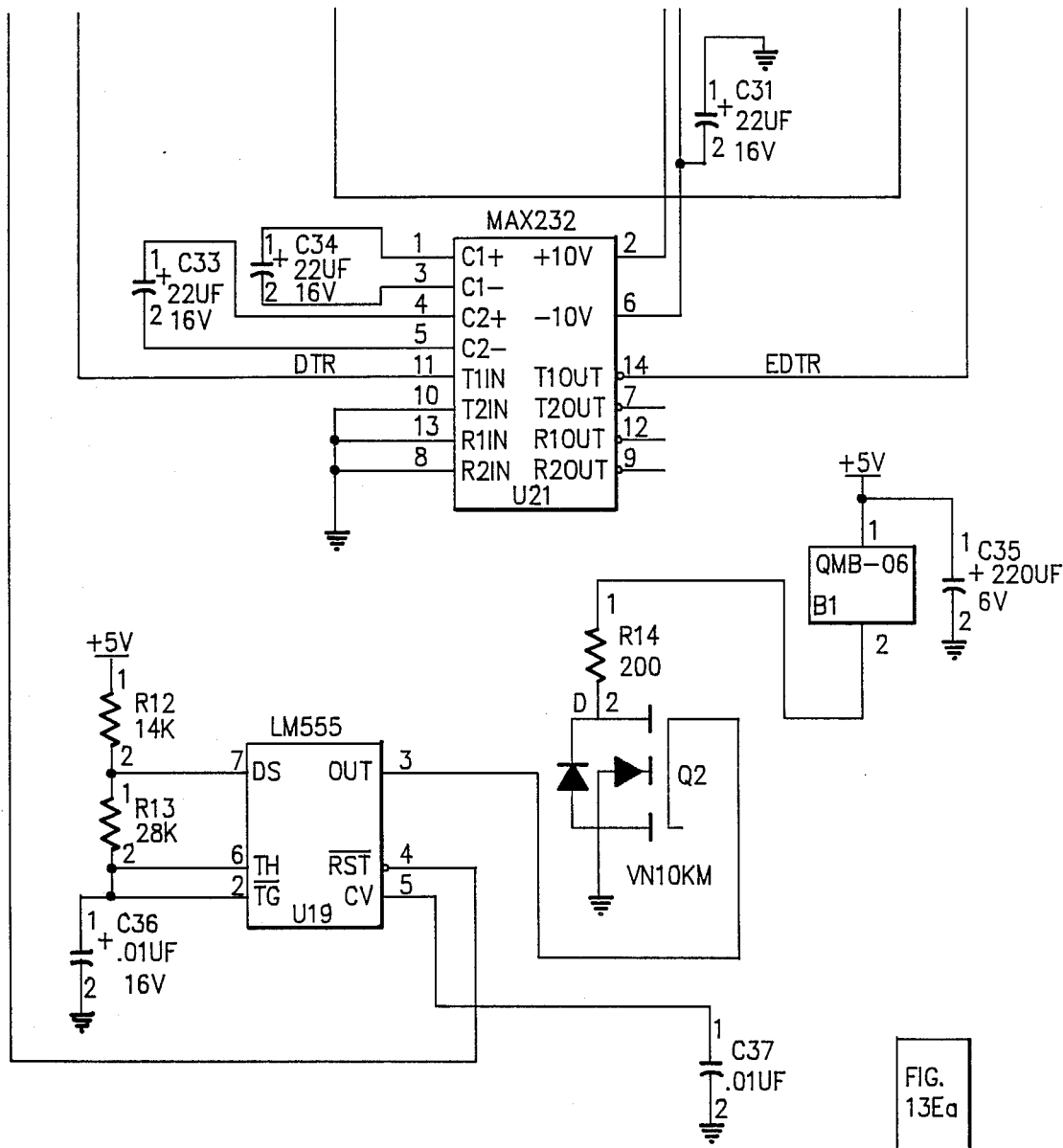

| | |
|---|---|
| FIG. 13A | |
| U1, U2, U3 | Terminal Configuration Controller, e.g. type 74HC245 |
| U4 | Attribute RAM, e.g. type 6264 |
| U5 | Character RAM, e.g. type 6264 |
| FIG. 13B | |
| U6, U7 | Data Latch, e.g. 74HC573 |
| U8 | Decoder, e.g. 74HC138 |
| U9, U10 | Keyboard Scan, e.g. 74HC240 |
| J4 | Keyboard connector |
| FIG. 13C | |
| U11 | Terminal Processor, e.g. NS405 |
| SW4 | Reset switch |
| J5 | Separated Video Output Connector |
| FIG. 13D | |
| U12 | Data Latch, e.g. 74HC574 |
| U13, U14 | Data Latch, e.g. 74HC573 |
| U15 | Composite Video Generation, e.g. |
| 74HC86U16 | Terminal Program Storage, e.g. 2764 |
| U17 | Keyboard Scan, e.g. 74HC154 |
| U18 | Beeper Control, e.g. 74HC123 |
| FIG. 13E | |
| U19 | e.g. LM555 |
| U20 | Parallel Keyboard Decoder, e.g. 74HC244 |
| U21, U22 | RS232 Interface, e.g. MAX 232 |
| J1 | Connector for cathode ray tube (82, FIG. 3) |
| R18 | Contrast Control, e.g. zero to 100 ohms |
| R17 | Brightness control, e.g. zero to fifty kilohmns |
| J2 | Parallel keyboard connector |
| J6 | RS232 D-Sub Connector |

In a prototype electric circuit bypass capacitors (designated C1 to C25, but not shown in FIGS. 13A–13E) were connected between the plus five volt supply line (+5 V) and ground, and had values of 0.1 microfarad except for two (C24 and C25) which were each rated at one hundred microfarads and six volts (6 V). In order to deal with noise problems, the pull-up potential of the Data Bus was increased so as to be nearer to the supply voltage, and additional decoupling capacitors were added. It is planned to use conductors of larger cross section for power and ground, and the power to the cathode ray tube 220, FIG. 12, will be the unregulated input voltage at line 240, FIG. 13E. An on-board DC to DC converter will be used in the CRT module 182. This improves system efficiency and distributes the internal heat dissipation. Basically, the modifications will improve the reliability of the terminal while retaining the advantages of the original configuration.

It is contemplated that a cathode ray tube with a green screen phosphor may enhance readability of the microterminal display. Anti-reflective coatings are being considered for the window means 140.

Figure 31:
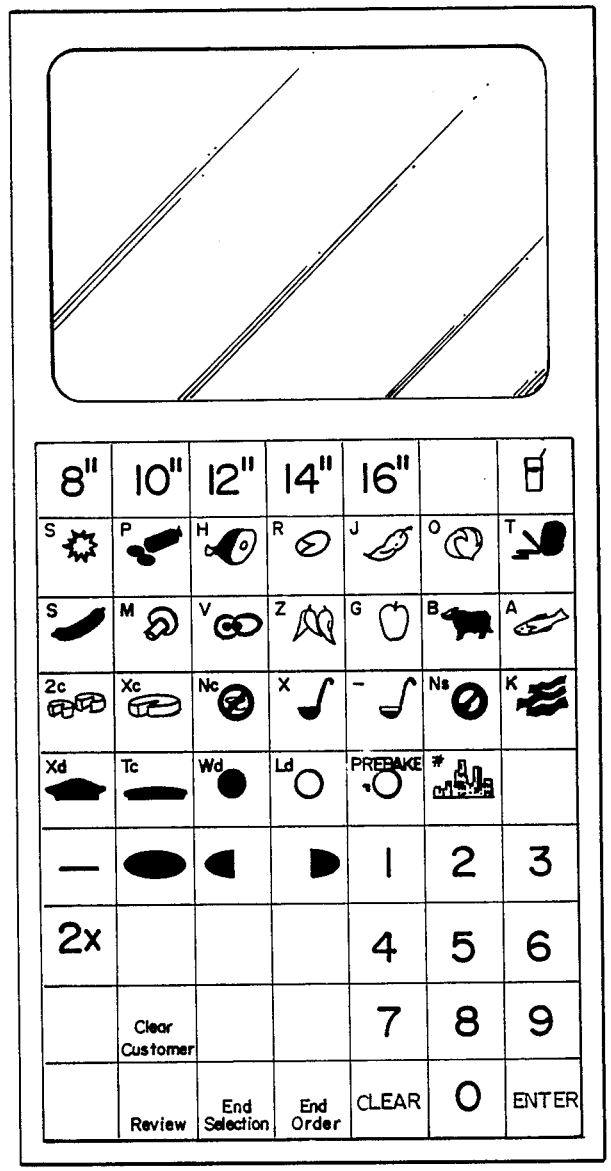
FIG. 31 is a plan view of an overlay sheet for a keyboard subassembly which may be substituted for the keyboard subassembly of FIGS. 10, 11 and 12, so as to represent certain of the entry locations of the keyboard by means of icon-type pictorial images, as has been disclosed in detail in an application for patent of George E. Hanson, U.S. Ser. No. 049,778 filed May 12, 1987, which disclosure is hereby incorporated herein by reference.

An optional "iconized" keyboard, FIG. 31, is designed to function in the same fashion as the elastomeric keyboard but with an additional fourteen keys. The technology of this keyboard is significantly different from the elastomeric unit. It is considered that both keyboards have their own market and as such the "iconized" style of keyboard will work well in food service installations but the elastomer unit is more appropriate for the more conventional computer terminal application. The emphasis here is upon the flexibility of this unit. A keyboard change will only affect the "look" of the unit, not its functions. Additionally, the circuit board is being redesigned to allow the use of custom character sets. This involves the addition of three more IC's. Since the configuration is fairly well determined, ten components will be removed from the existing board and will be replaced by one. The components to be removed are three dip switches, three buffers (74HC245), three resistor packs and one 74HC138 decoder chip. Reliability and performance should be enhanced by this reduction in component count.

Figure 14A:
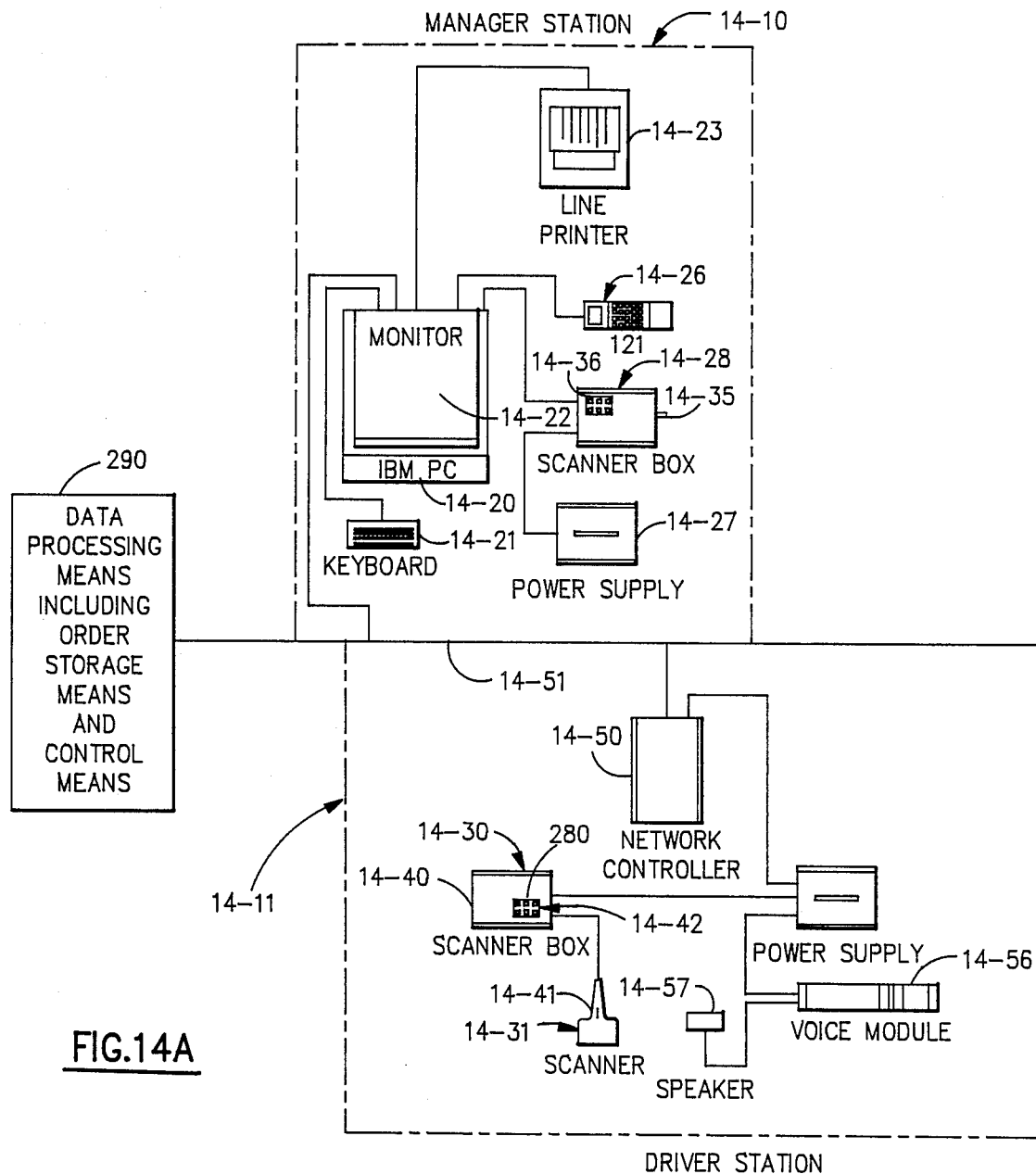
FIGS. 14A and 14B show a specific exemplary embodiment in accordance with the present invention.
Figure 14B:
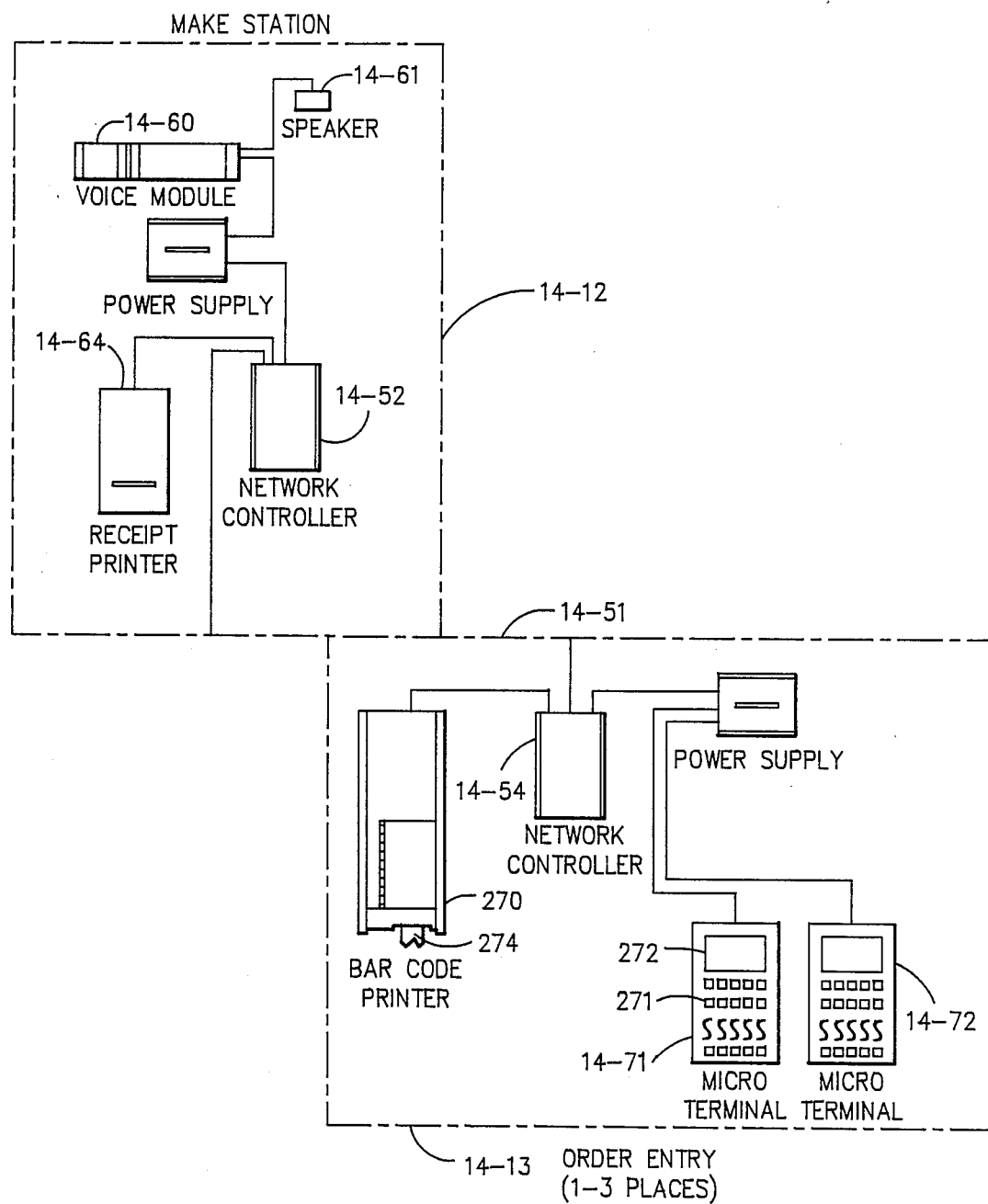

Description of the Specific Embodiment of FIGS. 14A and 14B

FIGS. 14A and 14B illustrate a specific implementation of a pizza home delivery system falling within the scope of the present invention. The illustrated system includes a manager station 14-10 and a driver check-out station 14-11, FIG. 14A, and a make station 14-12 and an order entry station 14-13, FIG. 14B.

The manager station 14-10 may include conventional data processing equipment such as a personal computer 14-20 with a keyboard 14-21, a monitor 14-22 and a line printer 14-23. This equipment may generate daily reports including individual driver cash reconciliation reports, based on the data generated at the driver station 14-11 as herein described. Cash deposits by the drivers may be entered into the system via keyboard 14-21, for example.

A portable hand held data unit 14-26 may have a receptacle at the manager station such that when the unit is inserted into such receptacle, it is placed on line with the total system. Such a receptacle is commonly used with a hand held data unit model 121 of the Norand Corporation of Cedar Rapids, Iowa. Rechargeable batteries of the unit 14-26 may be recharged from power supply 14-27 while the unit is associated with its receptacle. The unit 14-26 may represent means for transporting system data to a manager's residence, for example, or to a delivery vehicle, for example, as well as means for collecting inventory and/or pricing data for input to the system.

Scanner box 14-28 at the manager station may be identical to scanner box 14-30 at the driver station 14-11, so that these units are fully modular and interchangeable. An instant bar code reader such as 14-31 may be plugged into either scanner box and may be used to instantaneously read an individual bar code assigned to each driver, as well as to read the bar codes of labels such as shown in FIGS. 7 and 8.

As an example, the manager station may have an automatic cash depository similar to an automatic teller machine. The driver may deposit cash with the system by presenting a badge or card with his identifying bar code e.g. at a receiving slot associated with a fixed scanner, or to hand held reader 14-31; or an individually coded key such as indicated at 14-35 may be inserted in a key receiving aperture of scanner box 14-28 as indicated in FIG. 14A. The driver may also manually enter his personal identification code on a keyboard 14-36. If there is a match of identification codes, the driver may be permitted to enter the amount of his cash deposit for example via a keyboard coupled with the system, in a manner similar to operation of automatic teller machines. A similar procedure using a key such as 14-35 and the keyboard 14-36 may be used for maintaining a record in the system of the hours worked by each employee.

The scanner box 14-30 of the driver check-out station 14-11 may be mounted generally as shown in FIG. 6 and arranged to receive individual driver's identification keys as indicated at 14-40. The hand held bar code reader 14-31 may be triggered manually by a button 14-41 to read a label on a box such as 251, FIG. 6, e.g. while the box is supported on a table surface such as 252. In the example of FIG. 14A, reader 14-31 may also be triggered manually by the button 14-41 to read a bar code on an employee badge or identification card as an alternative to the key identification means 14-40. An indicator light 14-42 may emit green light when a valid bar code is read, and may provide a red light signal to indicate the need for a repeated read operation.

Information on the construction of bar code readers is found in a pending application of Jonathan R. White, U.S. Ser. No. 905,779 filed Sept. 10, 1986, Attorney's Docket DN 5726, and in a pending application of Arvin D. Danielson and Dennis Alan Durbin, U.S. Ser. No. 894,689 filed Aug. 8, 1986. Reference is also made to a commercial product of Norand Corporation known as the 20/20 Instant Portable Bar Code Reader.

An exemplary interface circuit for the scanner boxes 14-28 and 14-30 may be similar to that shown in FIGS. 15A-15J.

The data communications means of the system of FIGS. 14A and 14B is illustrated as comprising a network controller 14-50 coupled with the other stations via a communications bus such as indicated at 14-51. Network controller 14-50 and identical network controllers 14-52 and 14-54 at the make station 14-12 and the order entry station 14-13 may be similar to those shown in a pending application of Arvin D. Danielson, Joseph J. Kubler, Dennis Alan Durbin, Micheal D. Morris and Keith K. Cargin, Jr., U.S. Ser. No. 907,496 filed Sept. 15, 1986, and in a pending application of Keith Cargin, Jr., George E. Hanson and Phillip Miller, U.S. Ser. No. 915, 023, filed Oct. 3, 1986.

A voice module 14-56 with its speaker 14-57 may be of conventional construction and a similar unit may be provided at other stations for example as indicated at 14-60 and 14-61 in FIG. 14B. These units may function as described with reference to voice synthesizer unit 71, FIG. 6.

Figure 9:
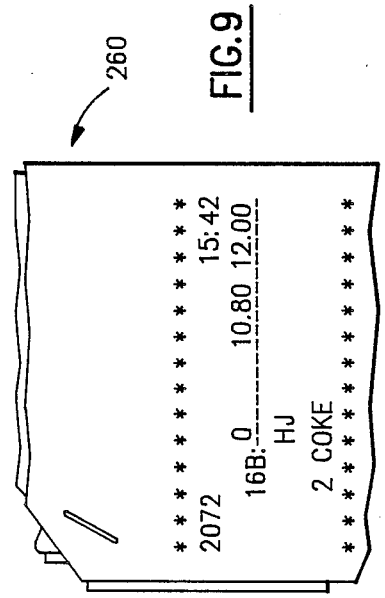
FIG. 9 illustrates a receipt form which may be printed, for example at a make station, for example one combining the functions of the stations of FIGS. 2 through 5.

FIG. 14B illustrates the case where a receipt printer 14-64 prints receipts such as indicated at 260, FIG. 9. In the specific embodiment of FIG. 14B, a bar code printer 270 is shown located at an order entry station in correspondence with bar code printer 42 of FIG. 1. The printer 270 may produce a bar code label such as described with reference to FIG. 7 or FIG. 8 which may be adhesively applied to an appropriate size box at the make station 14-12, for example, and scanned at the driver check-out station 14-11 as previously described.

An exemplary bar code printer is a modified Zebra thermal bar code printer.

Microterminals such as indicated at 14-71 and 14-72 may correspond with those shown in FIGS. 10, 11, 12 and 13A through 13E and may be associated with respective telephone consoles and operated as described herein.

The coupling of terminals within a store with other units e.g. at a manager station via a loop fiber optic network is described in U.S. Pat. Nos. 4,430,700 and 4,604,693 of Norand Corporation and is utilized in a commercial system of Norand Corporation known as the A Line Food Service Management System.

Summary of Operation of FIGS. 14A and 14B

In operation of the specific exemplary embodiment of FIGS. 14A and 14B, a telephone order is processed at station 14-13 by entering the telephone number of the incoming call into the system e.g. automatically or via a keyboard such as indicated at 271. The telephone number may serve to retrieve the caller's last known address for display at 272, where it can be verified. In an initial type of system, customer addresses may be entered manually as at 36, FIG. 7, on a bar code label supplied by printer 270, as indicated at 274, FIG. 14B. Other desired data may be entered manually, for example as indicated at 31 through 35 and 37, 38 and 39, FIG. 7, or such data may also be mechanically imprinted by the system as represented in FIG. 8.

In an initial system, a person from make station 14-12 may periodically pick up completed labels and affix the same to appropriate packaging, e.g. generally as indicated in FIG. 3.

At the make station 14-12, each order may be read out on-line by means of the receipt printer 14-64 to produce duplicate receipt slips such as indicated at 260, FIG. 9. Such slips may be used in place of monitor 22, FIG. 2, to sequence the order preparation process. Thus, a receipt slip such as 260, FIG. 9, may accompany each pizza as it is being packaged (as indicated in FIG. 5) at the make station 14-12, and may accompany the packaged order as delivered to the driver station 14-11.

In the actual system of FIGS. 14A and 14B, the time of each order would be entered into the system, and voice synthesizer units 14-60, 14-61 and 14-56, 14-57 would be activated if a given order had not been checked out at scanner means 14-30, 14-31 within a time interval established in the system. In an actual operating system similar to that of FIGS. 14A and 14B, the voice synthesizer unit may repeat warning messages at a selected interval specifying the number of minutes an overdue order has been in the system. Other messages may be given exclusively at the driver station, for example a reminder concerning beverages for an order being checked out, or a message to a specific driver identified at scanner means 14-30, 14-31, suggesting that a deposit of accumulated cash would be advisable.

Description of FIGS. 15A through 15J

Figure 15A:
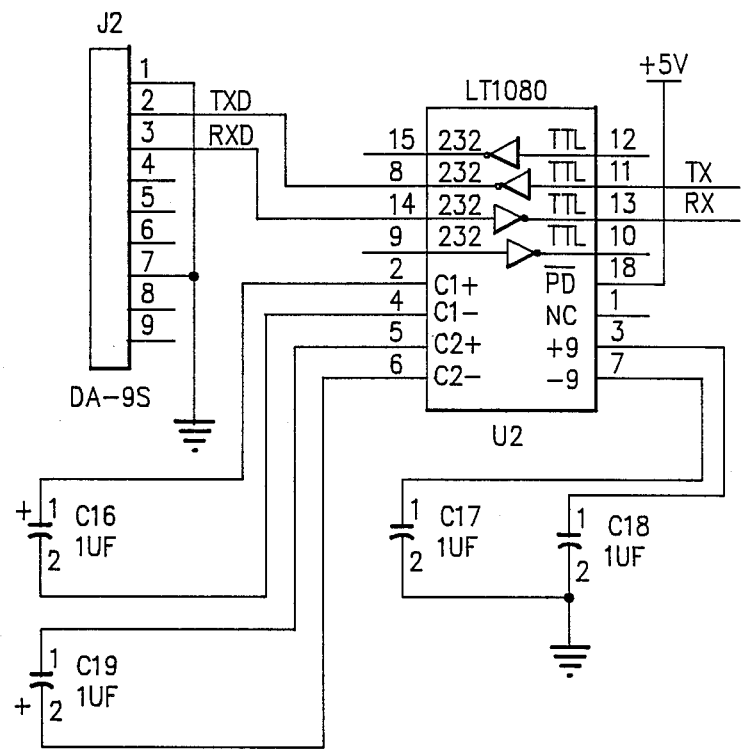
FIGS. 15A through 15J illustrate exemplary circuitry for a check-out station such as shown in FIG. 6 and/or FIG. 14A.
Figure 15A:
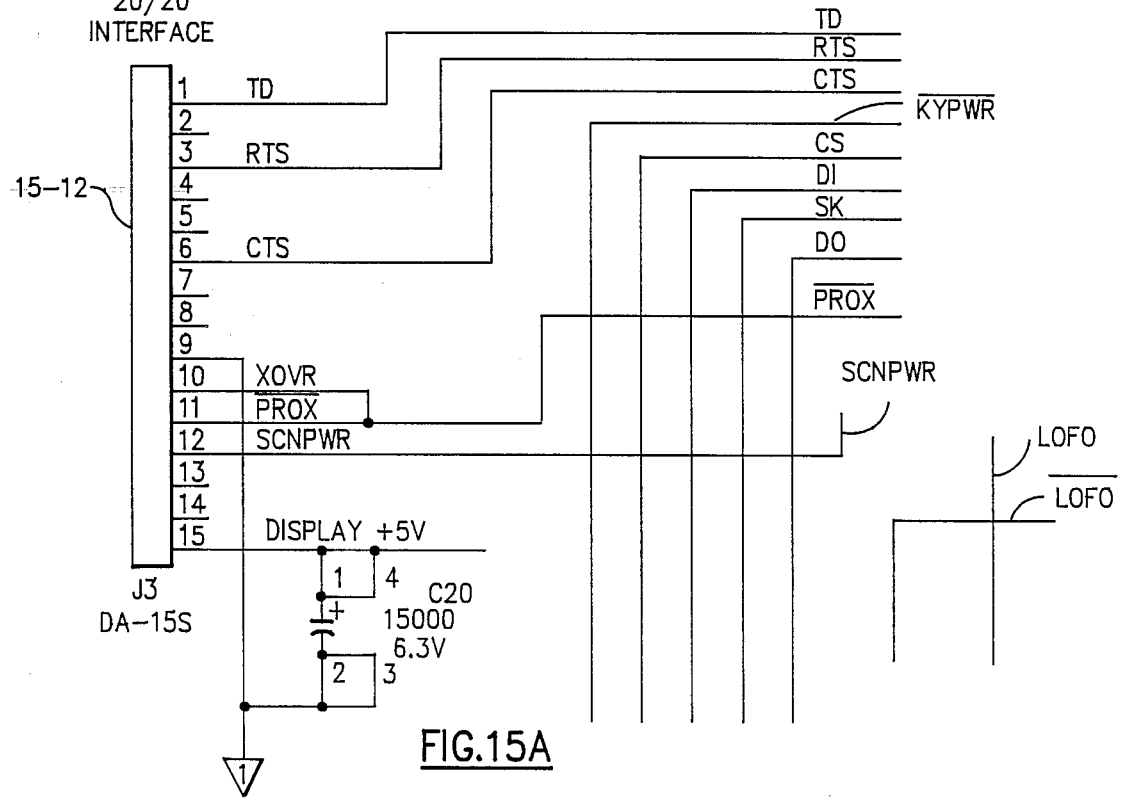
Figure 15B:
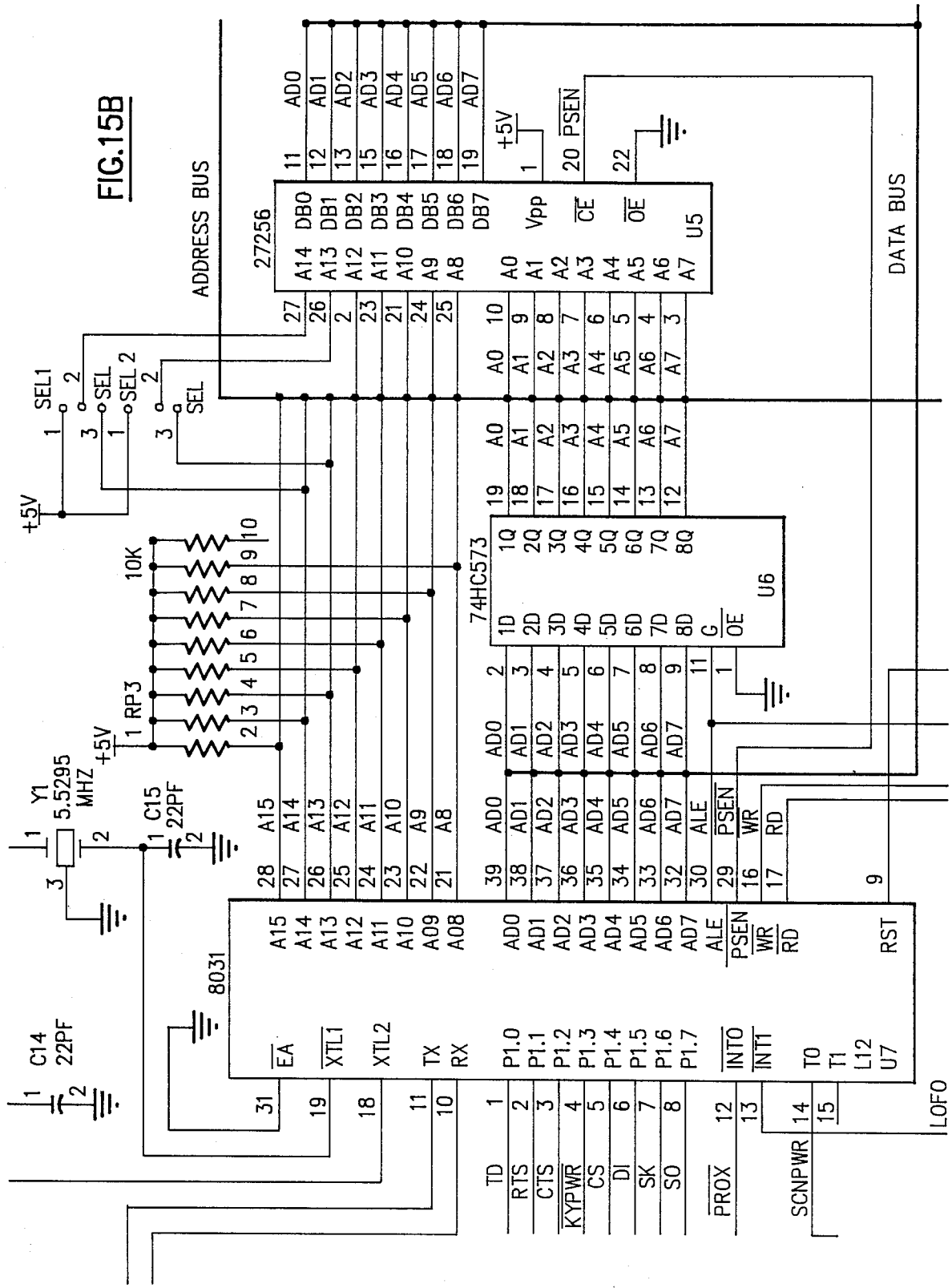
Figure 15C:
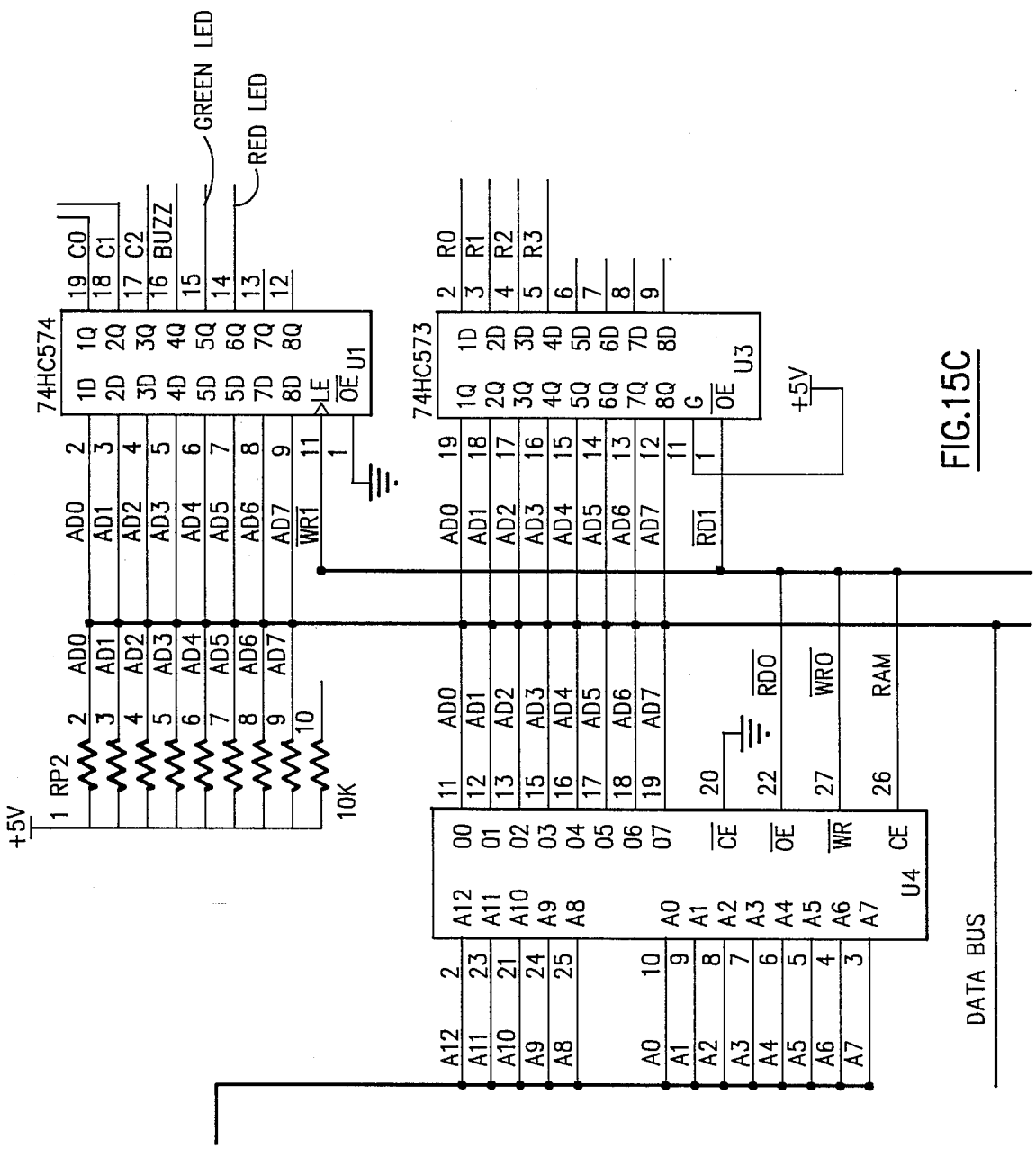
Figure 15D:
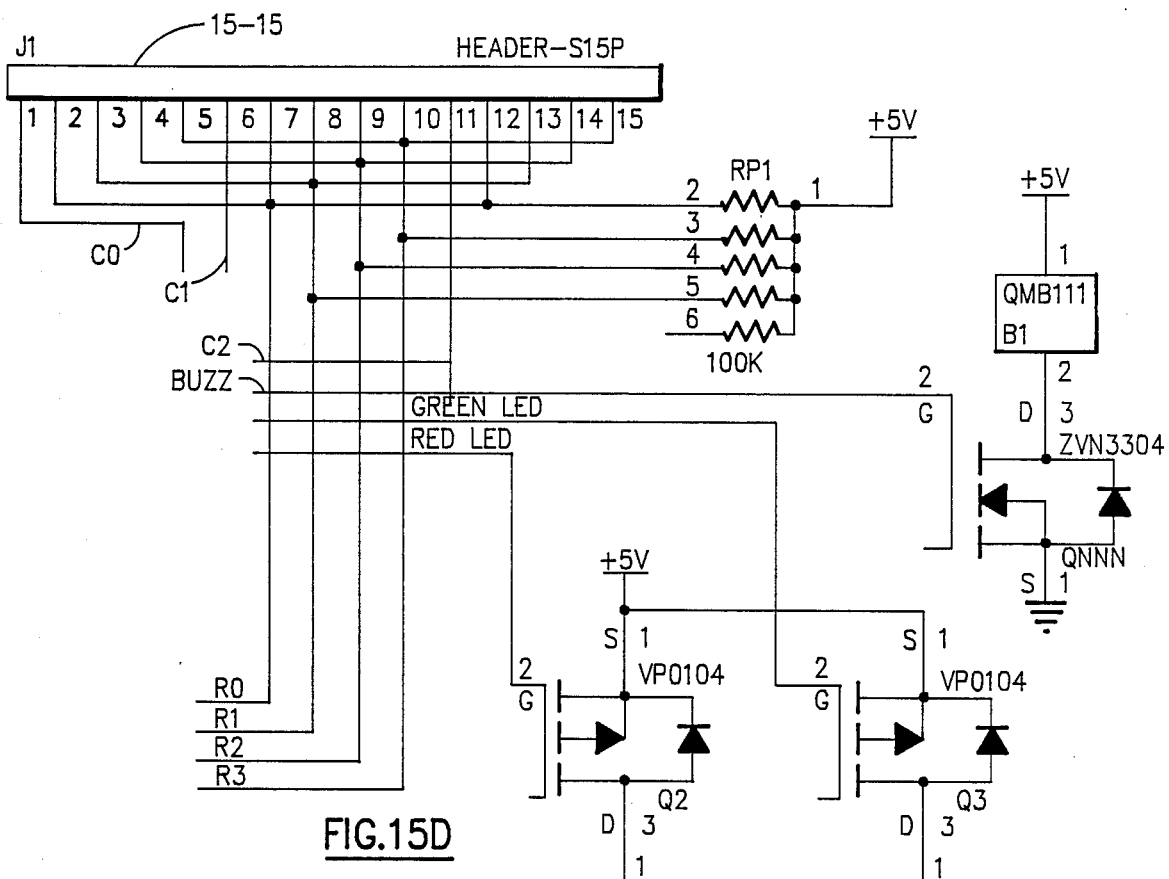
Figure 15I:
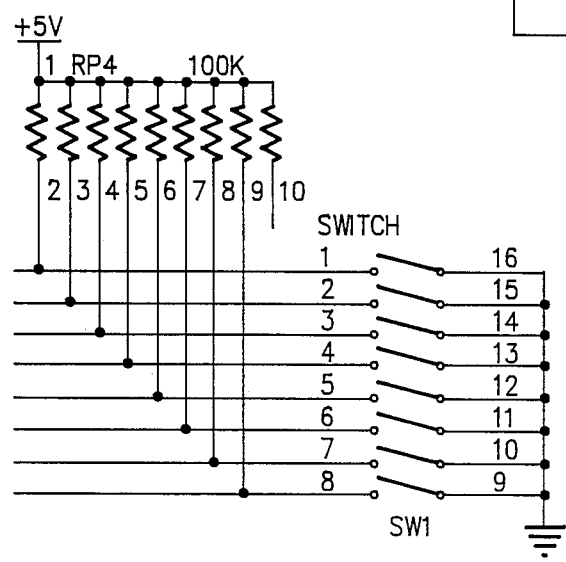
Figure 15E:
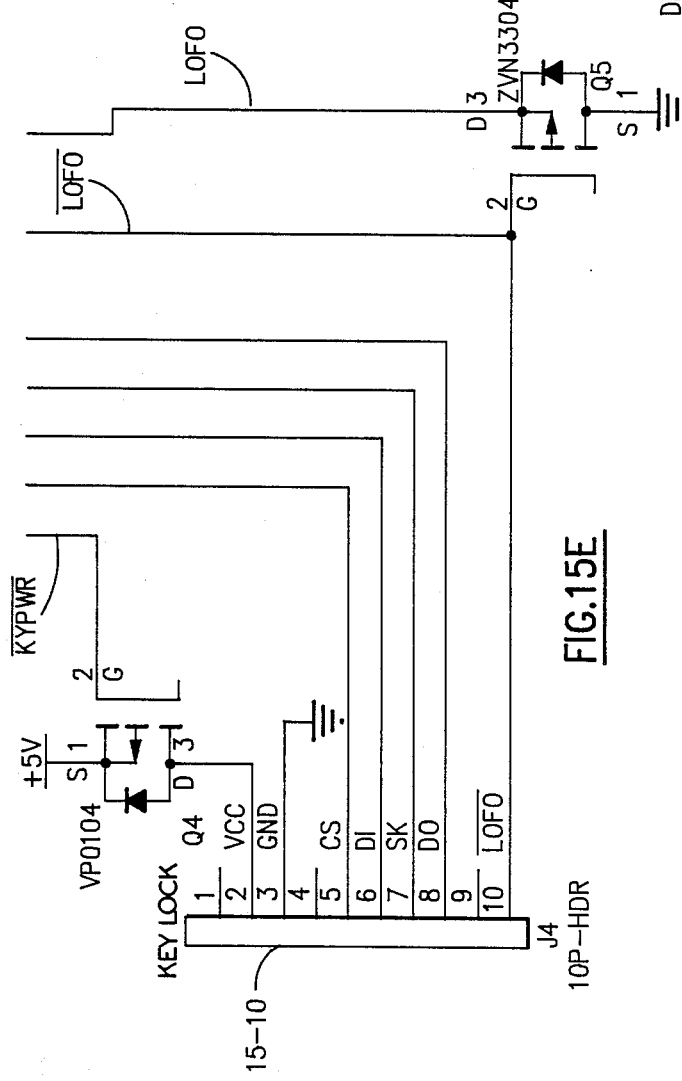
Figure 15J:
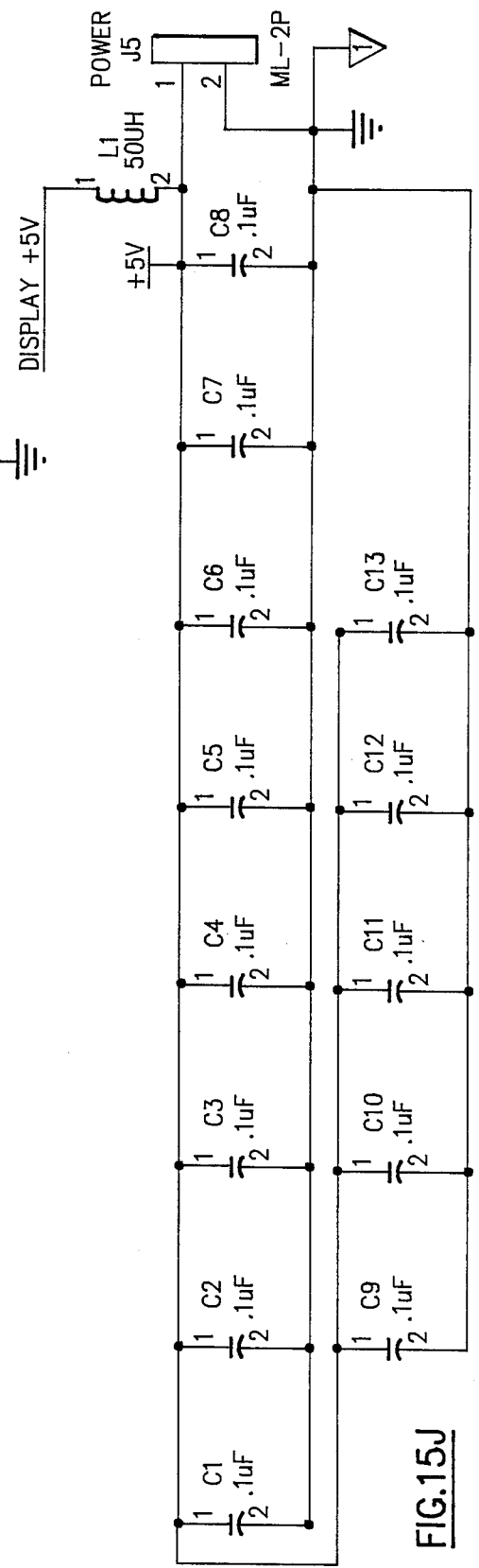
Figure 15F:
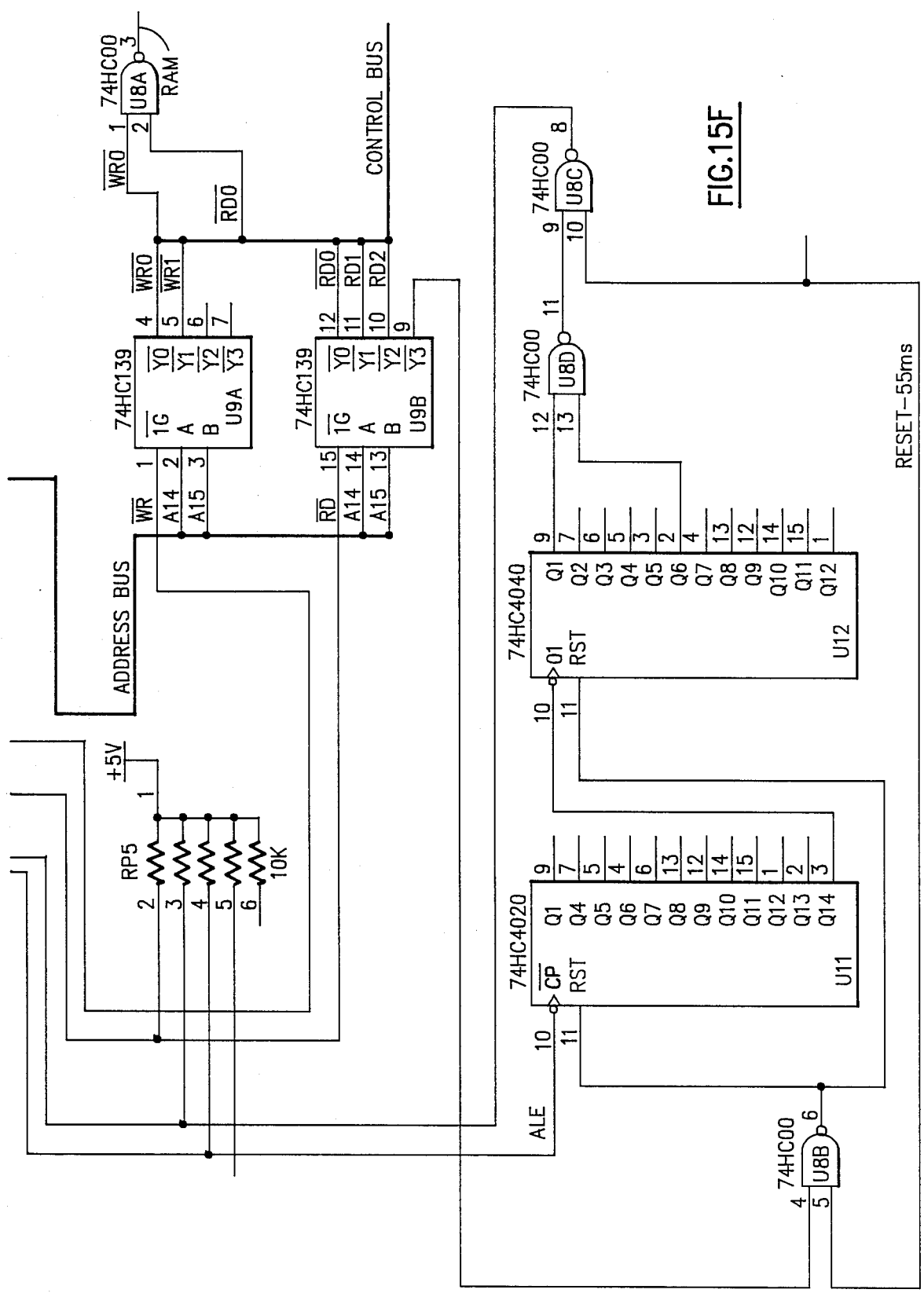
Figure 15G:
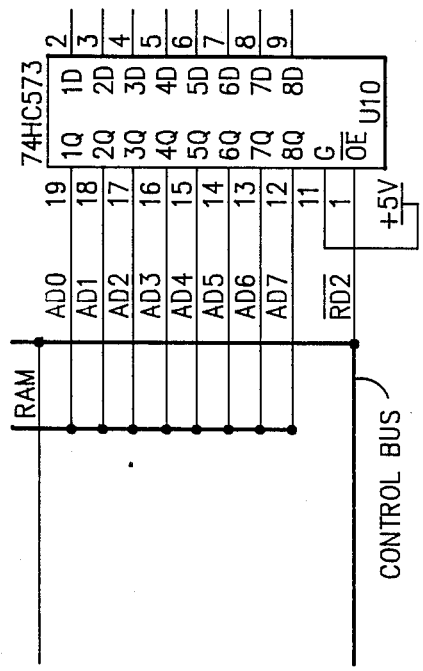
Figure 15H:
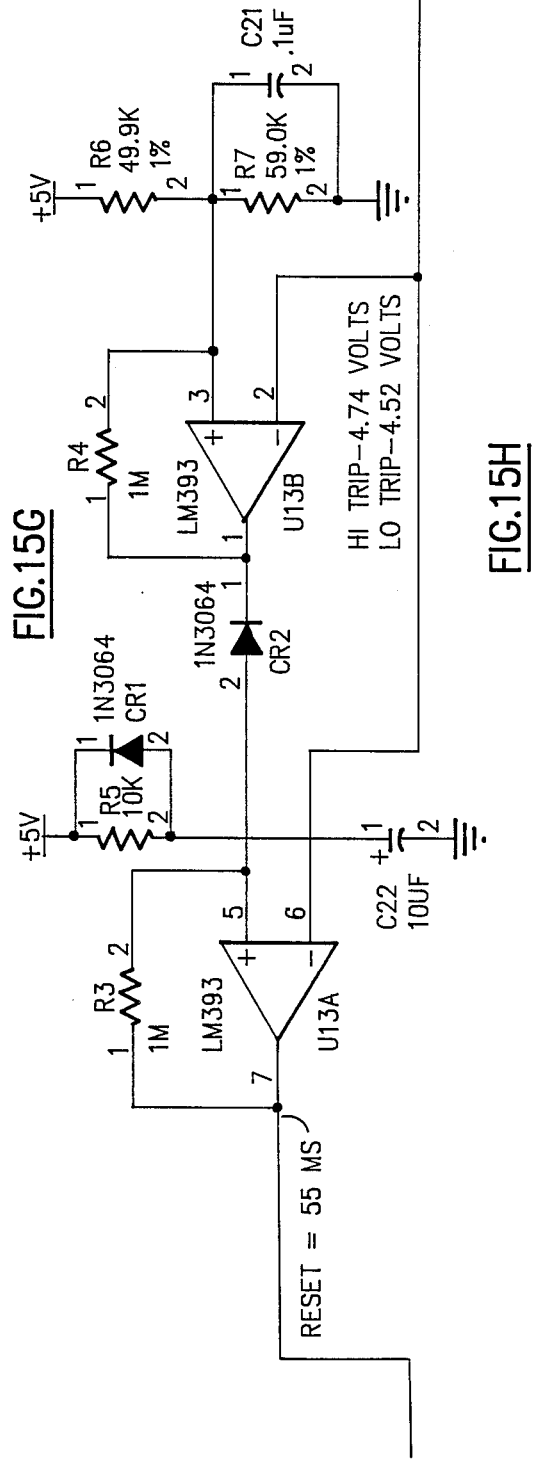

The exemplary scanner interface circuit of FIG. 15A et seq. is most closely related to the embodiment of FIG. 6. In this case, a coded key sensor of FIG. 6 is coupled to connector 15-10, FIG. 15E, and the instant scanner unit at 82 is coupled to a connector 15-12, FIG. 15A, while keyboard 84, FIG. 6, is coupled at 15-15, FIG. 15D.

Exemplary components in FIG. 15A et seq. may be as follows:

| Component | Description | Exemplary Type Designation |
| --- | --- | --- |
| J2 | RS-232 Interface | DE-9S* |

-continued

| Component | Description | Exemplary Type Designation |
|---|---|---|
| J3 | Instant Bar Code Reader Interface | DA-155* |
| J4 | Key lock input | 10P-HDR |
| U2 | RS-232/TTL converter | LT1080 |
| Y1 | Crystal (5.5295 Megahertz) | |
| U7 | Eight-Bit Microcomputer | 8031 |
| U6 | Octal Transparent Latch Three-State | 74HC573 |
| U5 | EPROM chip | 27256 |
| U9A, U9B | Two to Four Decoders | 74HC139 |
| U11 | Binary Counter | 74HC4020 |
| U12 | Binary Counter | 74HC4040 |
| U13A, U13B | Comparator | LM393 |
| UI | Octal D-Type Flip-Flop Positive Edge-Triggered Three-State | 74HC574 |
| U3, U10 | Octal Transparent Latch, Three-State | 74HC573 |
| J1 | Keyboard Interface | Header-S15P** |
| B1 | Piezo transducer (beeper) | QMB111 |

*"S" stands for socket or receptacle type of connector.
**"P" stands for pin type of connector.

The following shows an exemplary program sequence for the driver station 14-11, FIG. 14A, or 70, FIG. 6:

(1) Input from scanner box e.g. 14-30, FIG. 14A:
   Employee Number and Order Number of box such as 251, FIG. 6, from bar code label of FIG. 7 or FIG. 8 on the box.
(2) Get order from order storage means 290, FIG. 14A.
   (2A) Does order have more than one box?
   (2A1) If yes, speak: "___*___ pizza's" then go to (1) for order number of other box or boxes.
   (2A2) If no, continue at (2B).
   (2B) Does order contain beverages?
   (2B1) If yes, speak: "This order contains beverage" (e.g. via synthesizer unit 14-56, 14-57, FIG. 14A, or 71, FIG. 6).
   (2C) Is order for cash payment only?
   (2C1) If yes, speak: "This order is cash only".
   (2D) Compute and speak: "___**___ minutes out the door".
   (2E) Driver cash too high?
   (2E1) If yes, speak "Driver please make a drop (deposit)".
(3) Update files.

*A number is to be spoken here according to the number of boxes needed for the order.
**A number is to be spoken here according to the number of minutes between the original entry of the order and scanning of the box or boxes for the order at the check-out station.

An exemplary directory of speech synthesizer elements at respective directory location numbers is as follows:

| DIRECTORY # | VERSION Ø WORD OR PHRASE |
|---|---|
| 0 | BETWEEN SENTENCE PAUSE |
| 1 | 0 |
| 2 | 1 |
| 3 | 2 |
| 4 | 3 |
| 5 | 4 |
| 6 | 5 |
| 7 | 6 |
| 8 | 7 |
| 9 | 8 |
| 10 | 9 |
| 11 | 10 |
| 12 | 11 |
| 13 | 12 |
| 14 | 13 |
| 15 | 14 |
| 16 | 15 |
| 17 | 16 |
| 18 | 17 |
| 19 | 18 |
| 20 | 19 |
| 21 | 20 |
| 22 | 30 |
| 23 | 40 |
| 24 | 50 |
| 25 | 60 |
| 26 | 70 |
| 27 | 80 |
| 28 | 90 |
| 29 | OF |
| 30 | THIS ORDER IS CASH ONLY |
| 31 | PIZZA'S |
| 32 | DRIVER PLEASE MAKE A DROP |
| 33 | MINUTES OUT THE DOOR |
| 34 | THIS ORDER CONTAINS BEVERAGE |
| 35 | INVALID ORDER NUMBER |
| | THIS PIZZA IS IGNORED |

XON - XOFF
XON EVERY SEVERAL SECONDS, GUARANTEES 32 OR MORE BYTES IN INPUT BUFFER

The following is an outline concerning the circuitry of FIGS. 15A-15J:
1.0 Scope:
This document describes the architecture of a CCD 20/20 scanner interface equipped with a Key Board, Key Lock (removable nonvolatile memory module), and an RS-232 communications link. This document includes a description of the memory mapped I/0, the RAM location and the I/0 port functions.
2.0 Scanner Unit Architecture:
The interface is an 8031 microcontroller base unit with 32K of program memory and 8K of data memory.
Port I/0 consists of an RS-232 two line type interface, a scanner interface that will service a 20/20 bar code reader or a wand, and a key lock type nonvolatile removable memory module.
Memory mapped I/0 is made up of a 12 key keypad matrix input/output, a buzzer, two LED output bits, an eight bit address switch, and a memory read location to reset a watchdog timer.
2.1.0 Interface memory map:
2.1.1 Memory Map Location:

| | | |
|---|---|---|
| (1) Program memory: | Starts at 0000 hex | |
| (2) RAM memory: | Starts at 0000 hex to 3FFF hex | |
| (3) Key Pad | 4000 hex Write bits 0,1,2 Read bits 0,1,2,3 | |
| (4) Buzzer | 4000 hex Write bit 3 | |
| (5) LEDs | 4000 hex Green LED Write bit 4 Red LED Write bit 5 | |
| (6) Address Switch | 8000 hex | |
| (7) Watch-Dog | C000 hex The watchdog will reset the CPU in no less than 1 sec. and no longer than 2 sec. | |

2.1.2 Memory Mapped I/0 Operation Definition:
Key Pad Operation:

| Key Pad Matrix Truth Table | | |
|---|---|---|
| Key | Write bit | Read bit |
| 1 | 0 | 2 |
| 2 | 1 | 2 |
| 3 | 2 | 2 |
| 4 | 0 | 1 |
| 5 | 1 | 1 |
| 6 | 2 | 1 |
| 7 | 0 | 0 |
| 8 | 1 | 0 |
| 9 | 2 | 0 |
| * | 0 | 3 |
| 0 | 1 | 3 |
| # | 2 | 3 |

Write bit low to column (bit 0 thru 2)
Read bit as a low true for row (bit 0 thru 3)

Buzzer operation:
  Initialize bit to 0 when not in use
  To operate, write bit 3 alternating from "1" to "0" at twice the desired frequency.
  Example: for 2000 hertz tone, the period between writing a "1" to a "0" or "0" to a "1" would be 250 microseconds LED Operation:
  Green LED—write bit 4 Low to turn "ON" High to turn "OFF"
  Red LED—write bit 5 Low to turn "ON" High to turn "OFF"

2.2.0 Interface I/0 Assignments:
2.2.1 Scanner interface signals:

| Signal | Name/type | Port # | Description |
|---|---|---|---|
| /PROX | Input | P3.2 | Read Data (unit reading) |
| XOVR | Input | same | Wand scanner data input |
| TD | Output | P1.0 | Commands to CCD 20/20 |
| RTS | Output | PI.1 | Clock to CCD 20/20 |
| CTS | Input | P1.2 | High if 20/20 Low if wand |
| SCNPWR | OUTPUT | P3.4 | Digital type wand enable active high. |

2.2.2 RS-232 Interface:

| Signal | Name/type | Port # | Description |
|---|---|---|---|
| RX | Input | P3.0 | Received Data |
| TX | Output | P3.1 | Transmit Data |

2.2.3 Keylock Interface:

| Signal | Name/type | Port # | Description |
|---|---|---|---|
| KYPWR/ | Output | P1.3 | Key module power |
| CS | Output | P1.4 | Key module chip select |
| D1 | Output | P1.5 | Serial Data into key |
| SK | Output | P1.6 | Serial Data Clock |
| DO | Input | P1.7 | Serial Data from key |
| LOFO | Input | P3.3 | Last-on-First-off This signal goes high after the key is all connected and low before the key disconnects. |

Description of FIGS. 16A–16H and 17A–17D

Figure 16A:
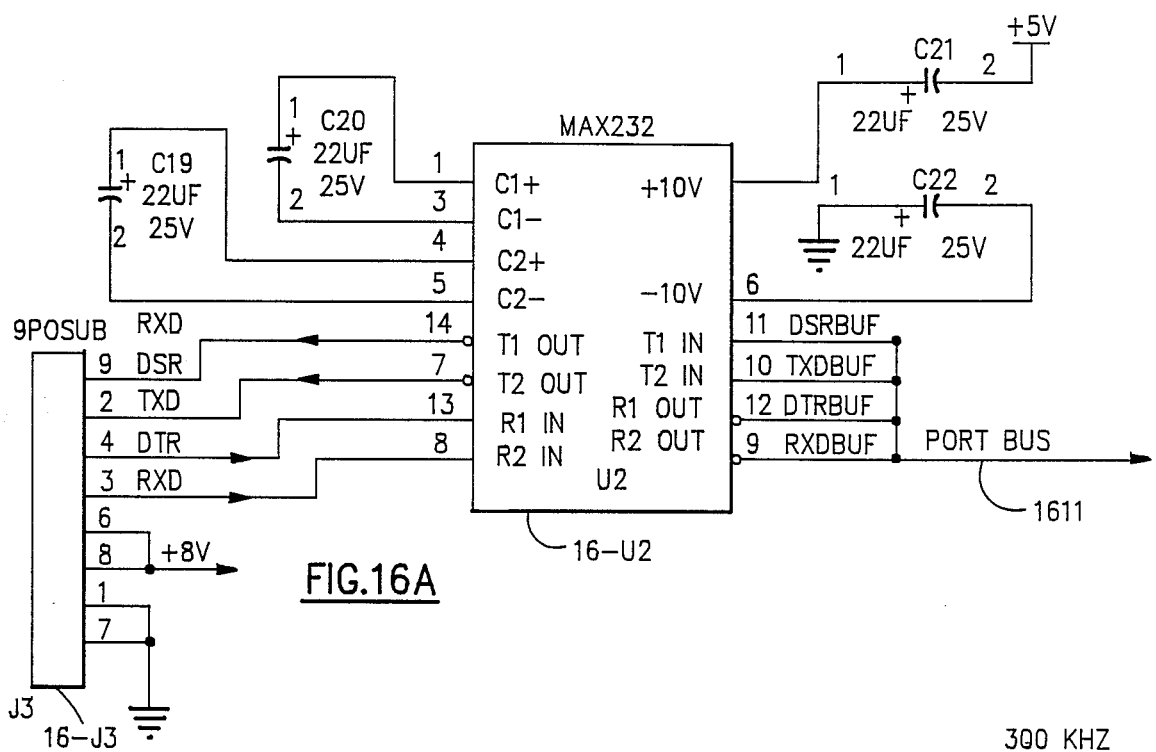
Figure 16B:
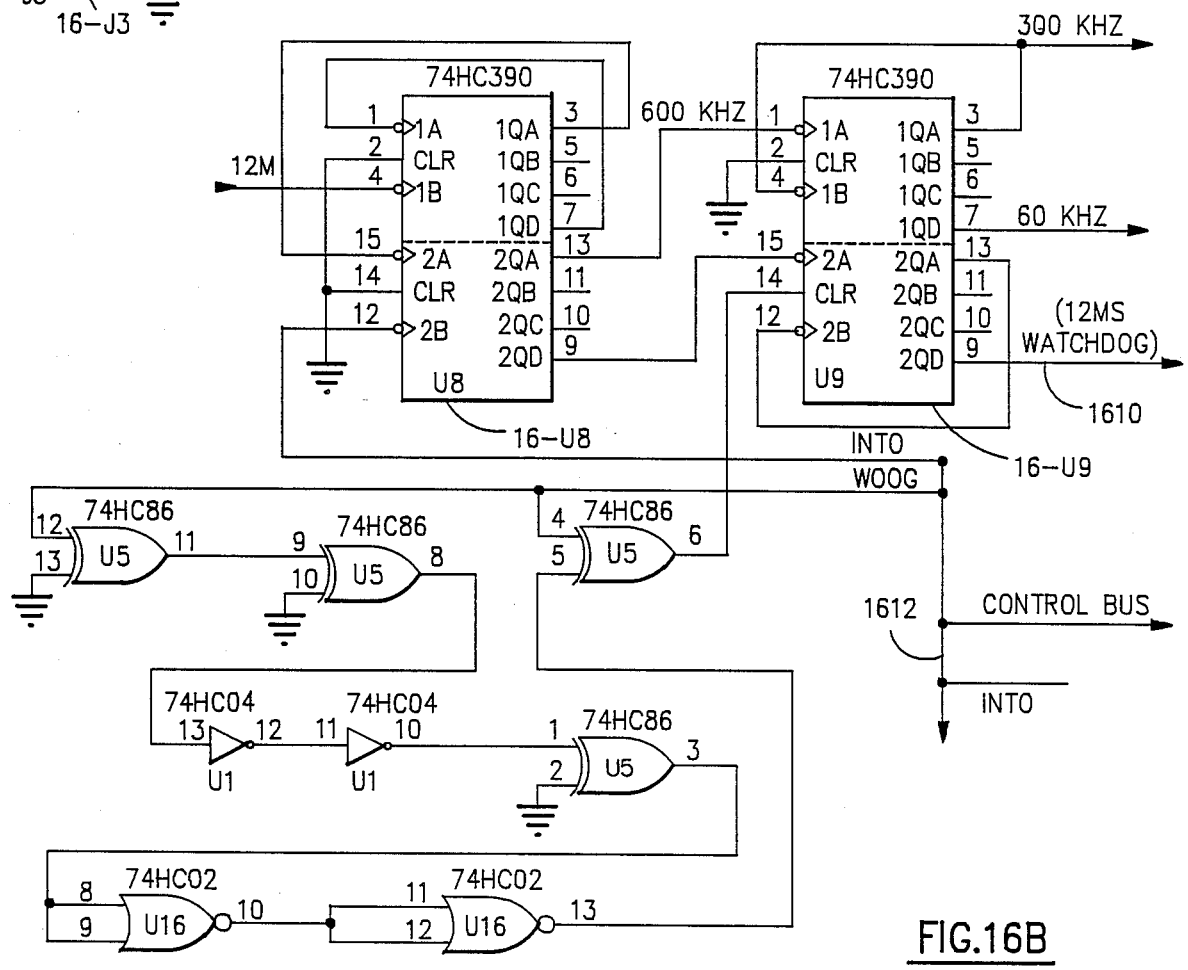
Figure 16C:
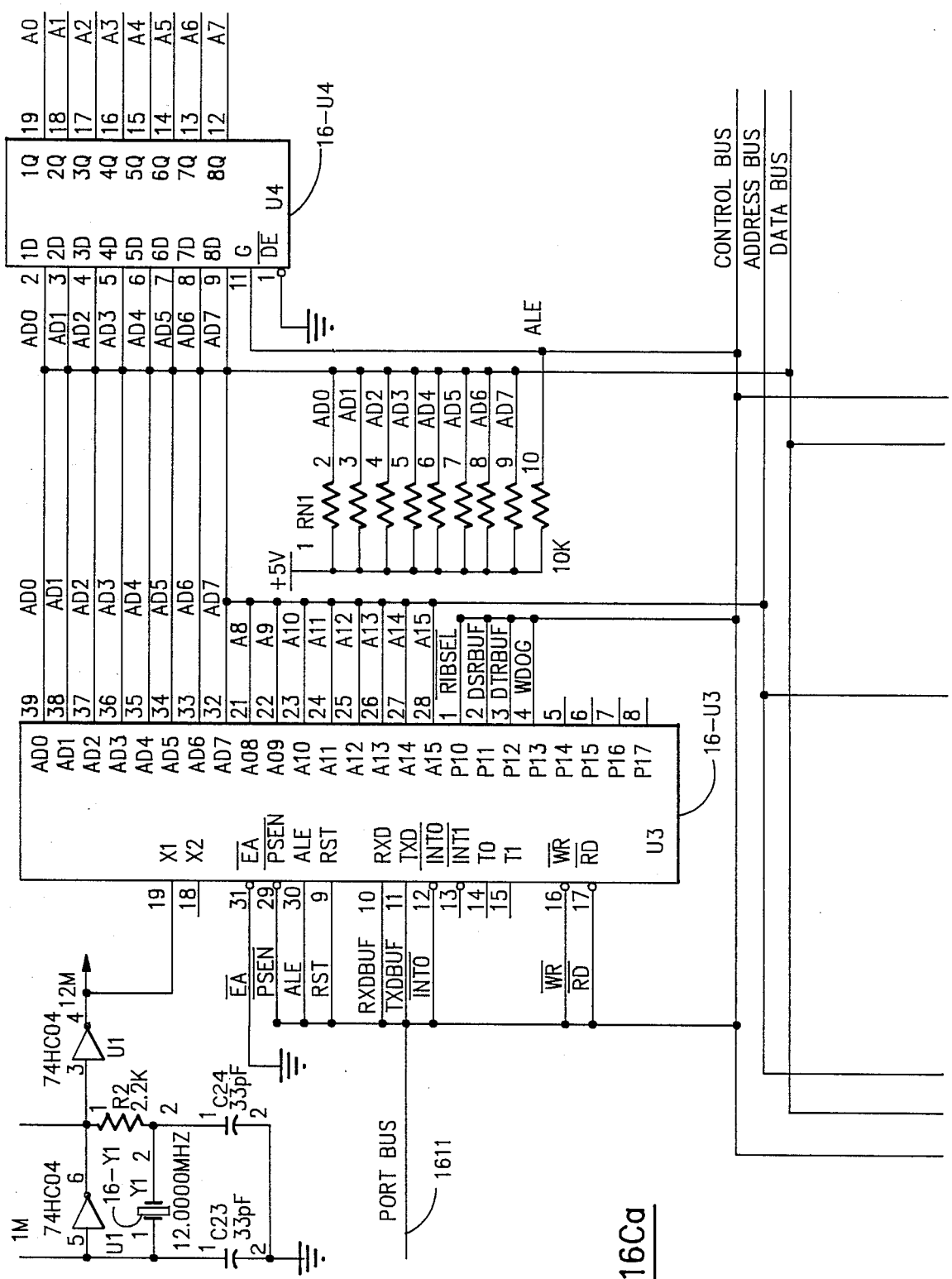
Figure 16D:
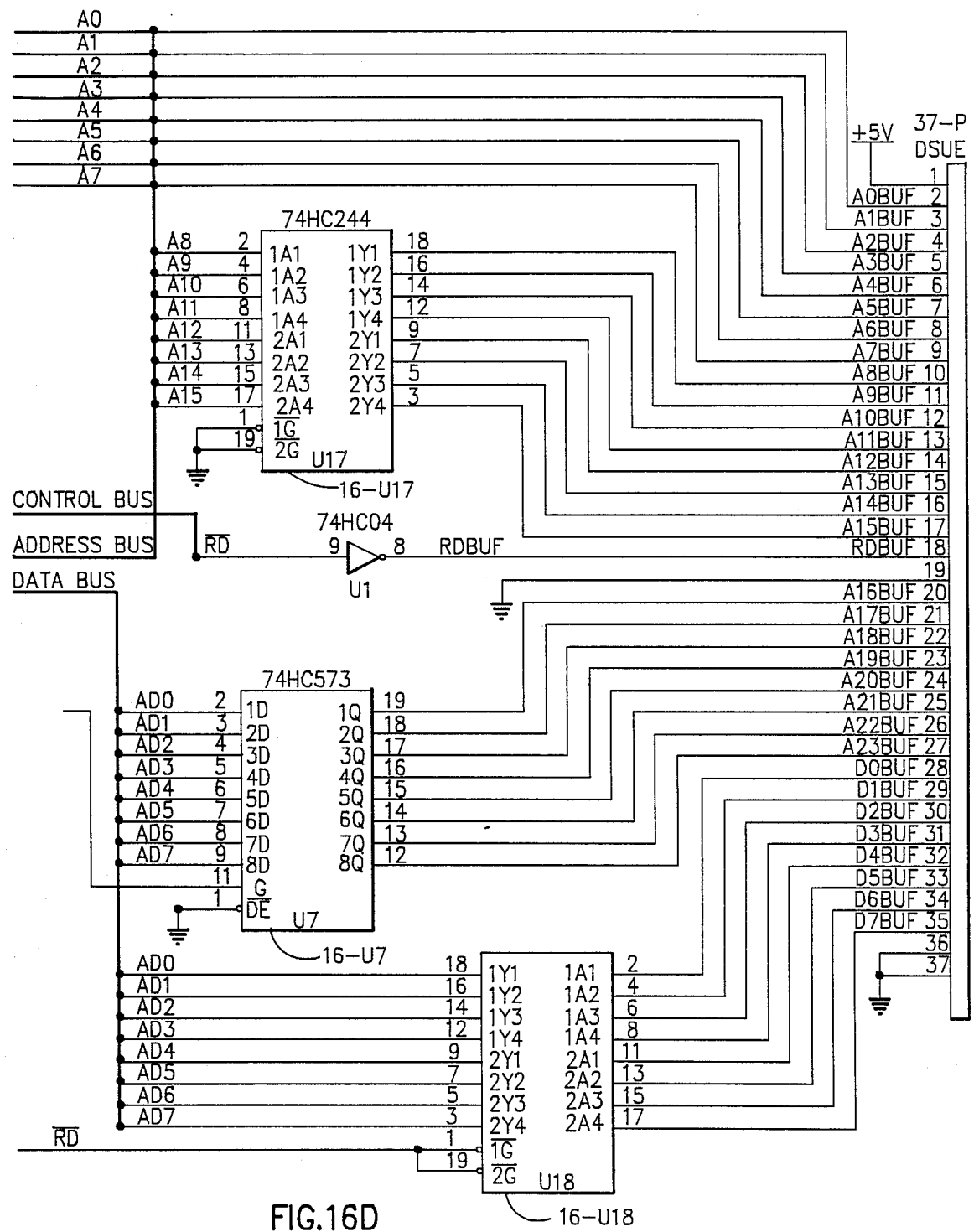
Figure 16E:
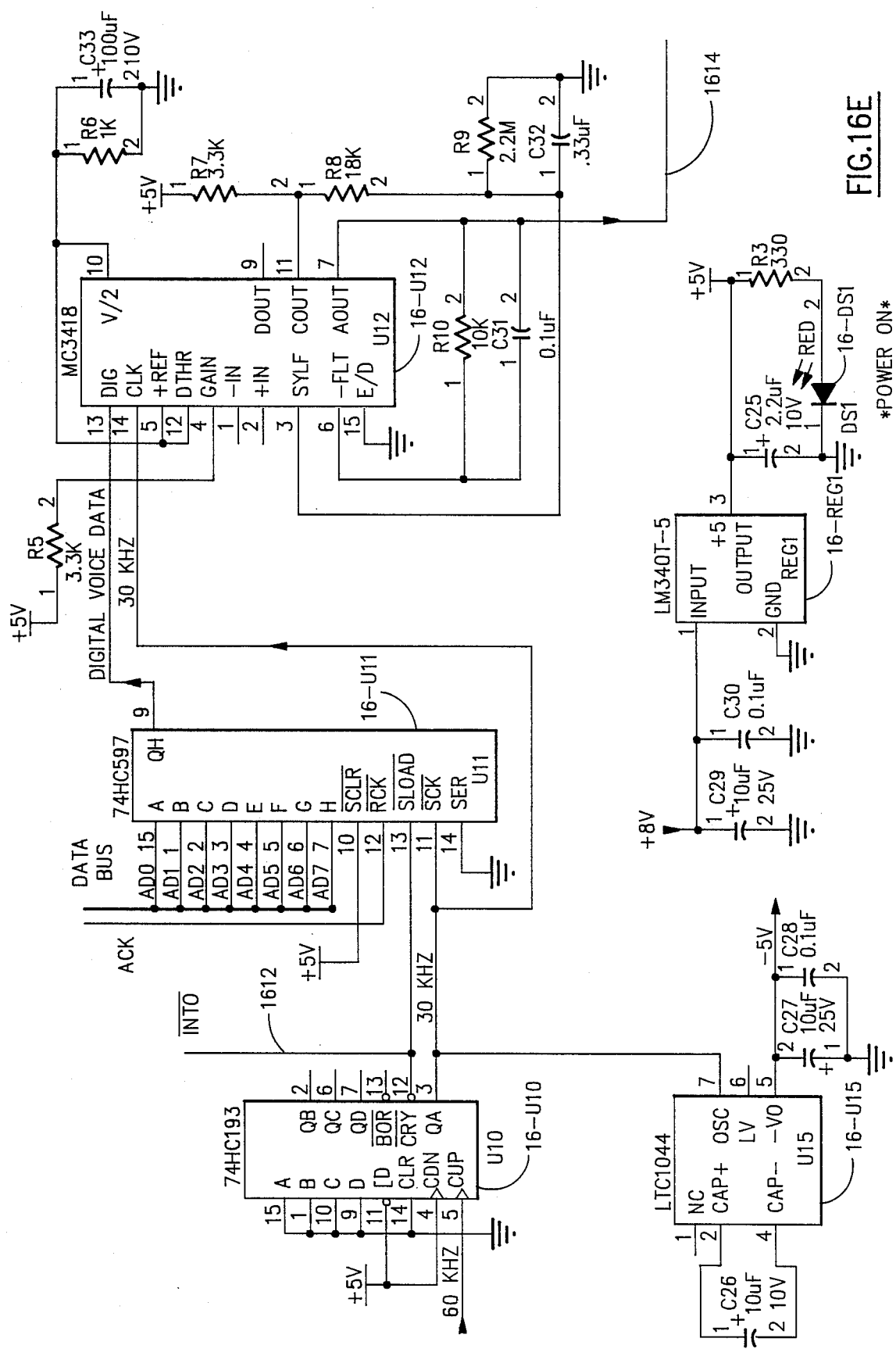
Figure 17A:
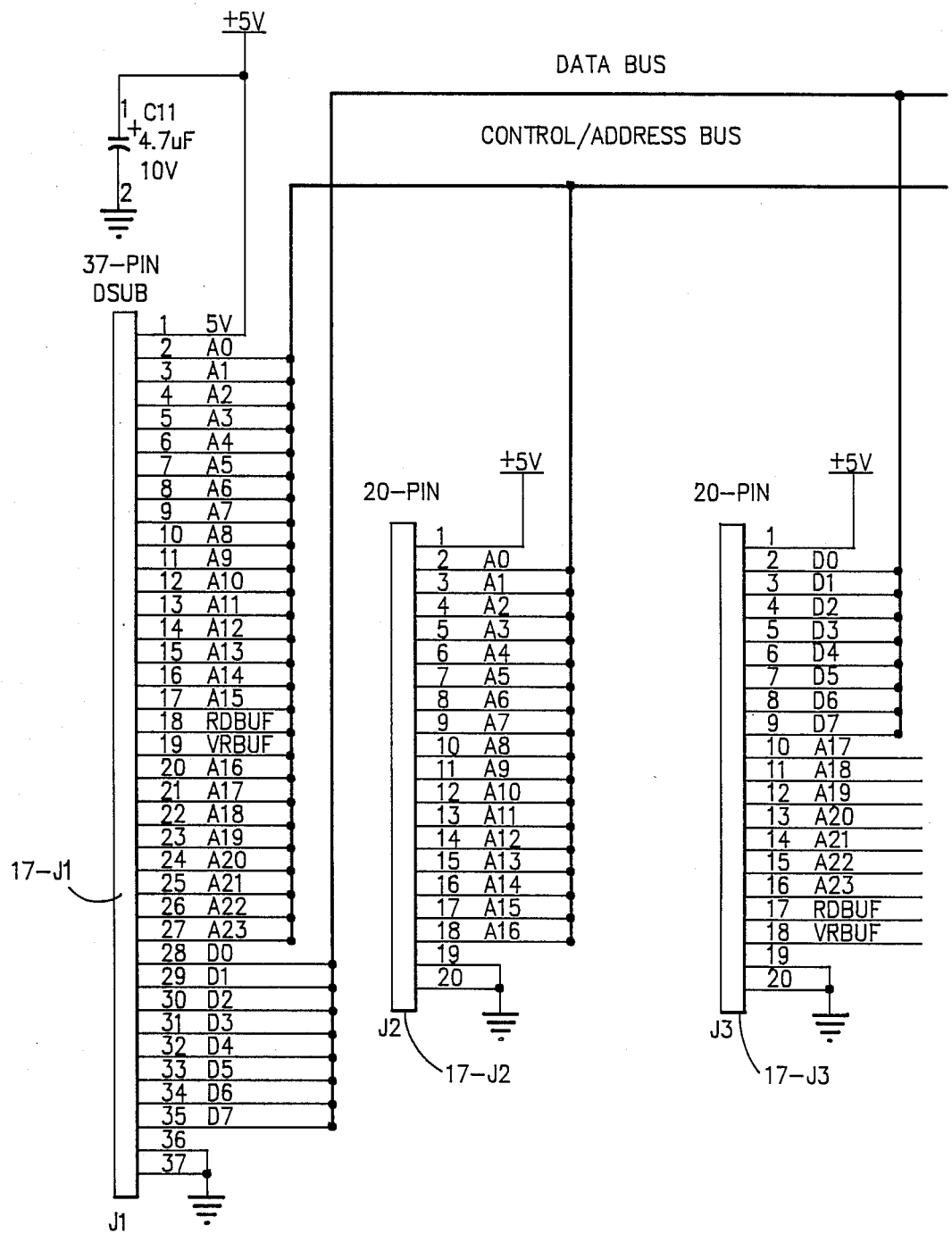
FIGS. 17A through 17D show circuitry for storing speech data for use by the speech generator circuitry of FIGS. 16A through 16H, FIG. 17B being a continuation of FIG. 17A to the right, and FIG. 17C being a continuation of FIG. 17B in a downward direction.
Figure 17B:
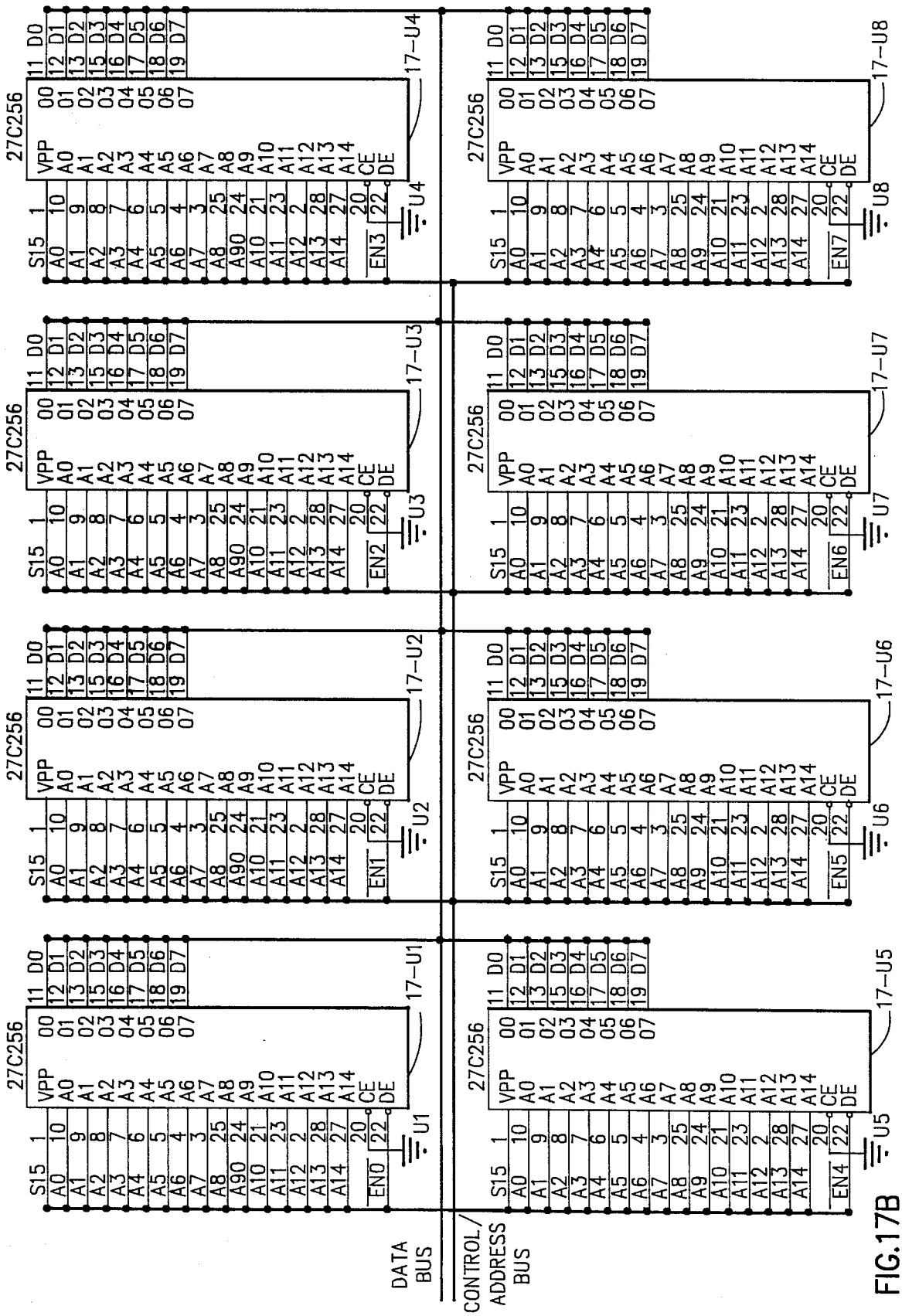
Figures 17C, 17D:
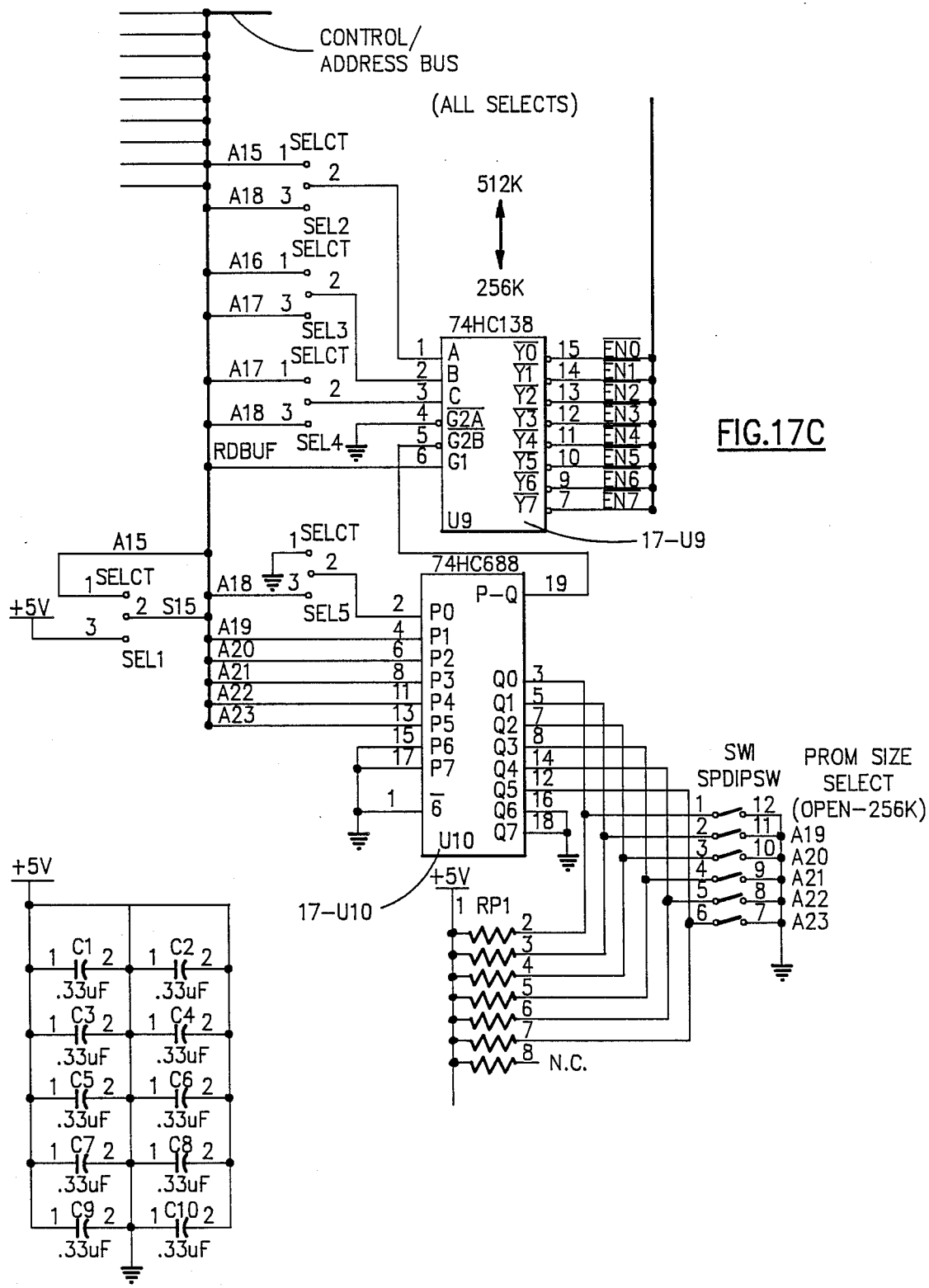

FIGS. 16A–16H and 17A–17D show exemplary circuitry for the voice modules 14-56, FIG. 14A, and 14-60, FIG. 14B. Exemplary components for this circuitry may be as follows:

| Speech Electronics, FIGS. 16A–16H | |
|---|---|
| Component | Description |
| FIG. 16A | |
| 16-J3 | RS-232 D-Sub Connector |
| 16-U2 | RS-232 Interface, e.g. MAX 232 |
| FIG. 16B | |
| 16U8, U9 | Watchdog Counter, e.g. 74HC390 |
| FIG. 16C | |
| 16-Y1 | Crystal 12.0000 MHZ |
| 16-U3 | Microcontroller, e.g. 80C31 |
| 16-U4 | e.g. 74HC573 |
| 16-U6 | Program Storage, e.g. 27C64 |
| FIG. 16D | |
| 16-U17, U18 | e.g. 74HC244 |
| 16-U7 | e.g. 74HC573 |
| 16-J1 | 37 Pin D-Sub Connector |
| FIG. 16E | |
| 16-U10 | e.g. 74HC193 |
| 16-U11 | Parallel to Serial Shift Register, e.g. 74HC597 |
| 16-U12 | Continuously Variable Slope Modulator (CVSD) chip, e.g. MC3418 |
| FIG. 16E | |
| 16-U15 | e.g. LTC1044 |
| FIG. 16F | |
| 16-REG1 | e.g. LM340T-5 |
| 16-DS1 | Red Light Emitting Diode ("Power On" Indicator) |
| FIG. 16G | |
| 16-U13 | Switched Capacitor Filter Chip, e.g. MF4-100 |
| 16-R4 | Volume Adjust Potentiometer, e.g. zero to one hundred kilohms |
| 16-U14 | Audio Power Amplifier chip, e.g. LM386 |
| 16-U2 | RCA Phone Jack (To Eight-Ohm Speaker) |
| FIG. 16H | |
| C1–C18 | Bypass Capacitors e.g. 0.1 microfarad |
| Read Only Memory Module, FIGS. 17A–17D | |
| FIG. 17A | |
| 17-J1 | 37 Pin D-Sub Connector |
| 17-J2 | 20 Pin Connector (for additional ROM) |
| 17-J3 | 20 Pin Connector (for additional ROM) |
| FIG. 17B | |
| 17-U1, U8 | EPROM e.g. 27C256 |
| FIG. 17C | |
| SEL1–SEL4 | 512K or 256K EPROM Selectors |
| 17-U9 | e.g. 74HC138 |
| 17-U10 | e.g. 74HC688 |
| SW1 | PROM Size Select (Six Pole DIP Switch, Open = 256K EPROM) |
| FIG. 17D | |
| C1–C10 | Bypass Capacitors e.g. 0.33 microfarad |

The speech generator comprises the speech electronics of FIGS. 16A through 16H and the read only memory module of FIGS. 17A–17D. The speech electronics is contained in its own housing and connects to the host system (indicated in FIGS. 14A and 14B) via a nine pin connector 16-J3, FIG. 16A. The speech electronics module has a standard RCA phono jack 16-J2, FIG. 16G, to connect its audio output to an external speaker such as indicated at 14-57, FIG. 14A, or 14-61, FIG. 14B. The module also has a volume control, 16-R4, FIG. 16G, and a "power on" indicator 16-DS1, FIG. 16F. The speech module mates with the ROM module via a thirty-seven pin "D" connector 16-J1, FIG. 16D, at its top side. Together the two modules are mounted in a vertical position with the ROM module on top.

The ROM module contains the actual voice messages, stored in CMOS EPROMS indicated at 17-U1 through 17-U8, FIG. 17B. The module normally contains a single "main" board mounted in the center of its housing. The main board has provision for holding up to eight EPROM chips of either the 27C256 or 27C512 variety (jumper selectable). The speech electronics "reads" 30,000 bits per second from the ROM module, so a single 256K ROM chip can store 8.5 seconds of speech. As an example, a fully populated ROM module main board can contain sixty-eight seconds of speech if using 27C256 EPROM chips, and 136 seconds of speech if using 27C512 EPROM chips. The ROM module is designed to accept two additional "piggyback" EPROM boards, each with six EPROM chips. One board mounts on top of the main ROM board, while the other mounts beneath the main ROM board. A ROM module so equipped with 27C512 chips permits 5.7 minutes of continuous non-repetitive speech.

The ROM module receives its power through the thirty-seven pin "D" connector, 17-J1, FIG. 17A, as well as twenty-four bits of ROM addressing, from the speech electronics module. Eight bit parallel ROM data (via D0-D7) is fed back to the speech electronics module via the same connector.

The speech electronics module contains a microcontroller 16-U3, and RS-232 interface 16-U2, a "watchdog" circuit 16-U8, 16-U9, FIG. 16B, a continuously variable slope monitor chip 16-U12, an audio filter chip 16-U13, and a small audio power amplifier stage 16-U14.

Chip 16-U6 provides storage for the microcontroller program. The microcontroller provides ROM module addressing and receives the resultant byte of data from the ROM module. The speech data byte is output from the microcontroller to a parallel to serial shift register 16-U11, FIG. 6E. The shift register 16-U11 is clocked continuously by counter hardware 16-U10, providing a constant thirty kilobit per second data stream to the CVSD chip 16-U12, FIG. 16E. Chip 16-U12 converts the serial data stream to an analog signal (voice) which is then bandwidth-limited to three kilohertz by a switched capacitor filter chip 16-U13, FIG. 16G. The audio signal is amplified by audio power amplifier chip 16-U14 and output to the RCA phono jack 16-J2.

The CVSD chip 16-U12 is driven continuously, even during "no speech" times to prevent undersirable clicks at the beginning and end of messages. At the end of the last message, the microcontroller 16-U3 outputs a "quieting" pattern byte to the shift register 16-U11 to quiet the output of the CVSD chip 16-U12.

The speech electronics board uses a "watchdog" timer circuit 16-U8, 16-U9 to reset the microcontroller in case the program fails. The watchdog circuit must be pulsed by the microcontroller via line 1610, FIG. 16C and FIG. 16B, every twelve milliseconds or it will generate a reset pulse resetting the microcontroller.

The microcontroller 16-U3 communicates with the host system via an RS-232 port bus 1611, FIG. 16C, FIG. 16A, using X-on/X-off protocol. The microcontroller buffers up to thirty commands from the host system, and executes them sequentially. Commands from the host system consist of numbers, separated by spaces, and followed by a carriage return. Each number represents a message stored in the ROM module; see the table with the heading "VERSION ∅ (application page 38). A phrase may consist of just one number (e.g. No. 30, No. 32, or No. 34), or a combination of numbers (e.g. No. 22 followed by No. 33) to form a complete sentence. The speech electronics module begins executing the first message upon receiving a carriage return. There is no real limit on the number of messages stored in ROM. The only limit is the ROM space needed to speak them all.

Messages are stored sequentially in the ROM address space. At the very "bottom" of ROM memory space is a library of all the messages. The library contains five bytes of information for each message stored in ROM. The first three bytes of each message description in the library define the absolute starting address of the message in ROM. The last two bytes define the length of the message (in bytes). The microcontroller 16-U3 locates each message to output by multiplying the message number, receive from the host system, by five so as to obtain the proper address offset in the message library. The microcontroller then retrieves the pertinent data from the library, then proceeds to the absolute ROM memory address and begins retrieving ROM speech data for that message a byte at a time. The counter hardware 16-U10 controlling the shift register 16-U11 and the CVSD chip 16-U12 also signals via line 1612, FIG. 16E, FIG. 16B to the microcontroller 16-U3 when a new byte of data is required by the shift register 16-U7. The speech message is supplied from the CVSD chip 16-U12 to the filter chip 16-U13 via line 1614, FIG. 16E, FIG. 16G. During quiet times the microcontroller ignores these requests for data so that the shift register continues to output its current byte of data repeatedly to the CVSD chip 16-U12. Of course, the data byte is the "quieting" byte needed to quiet the output of the CVSD chip.

DESCRIPTION OF FIGS. 18A-18I

Figure 18A:
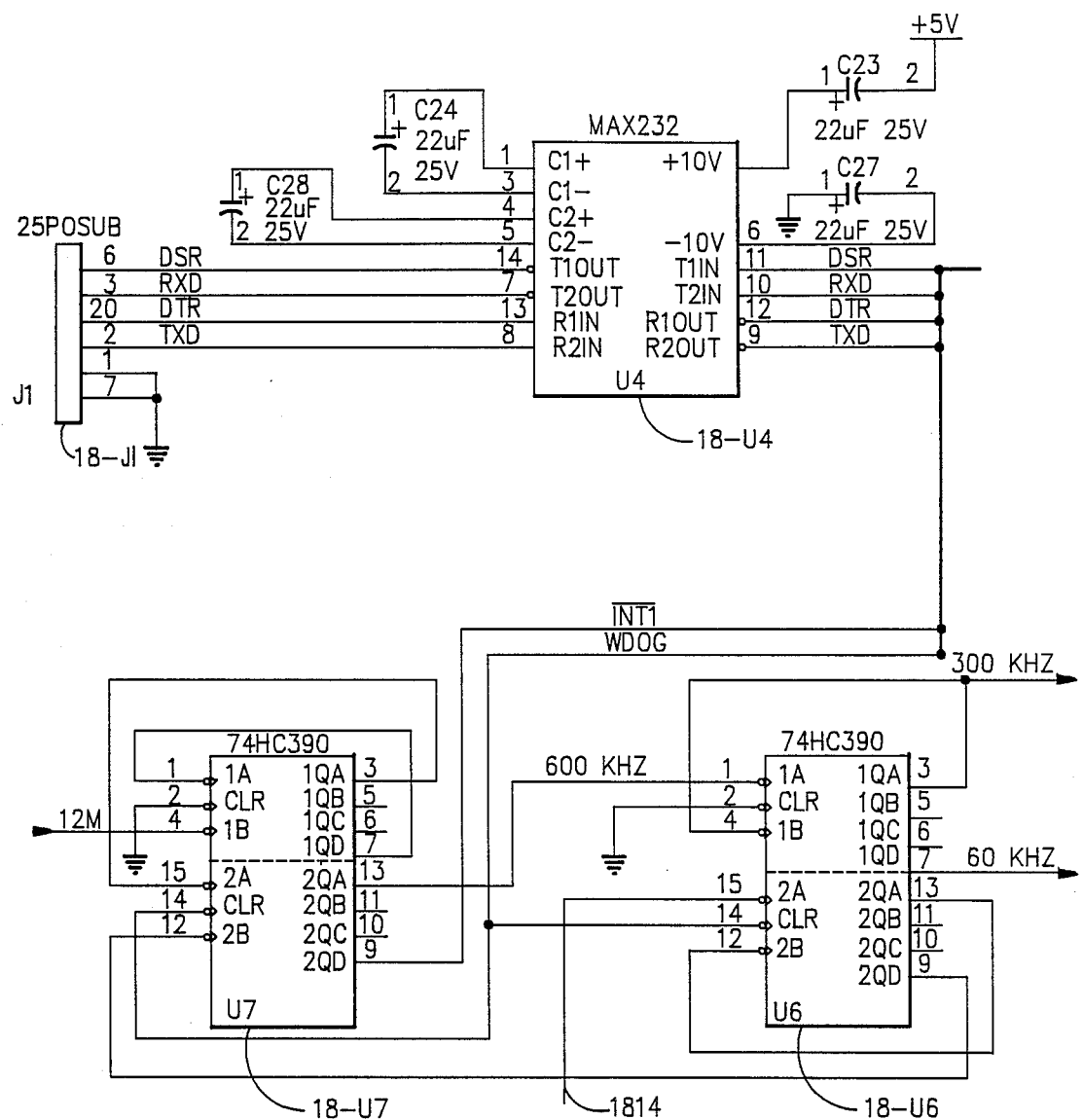
Figure 18B:
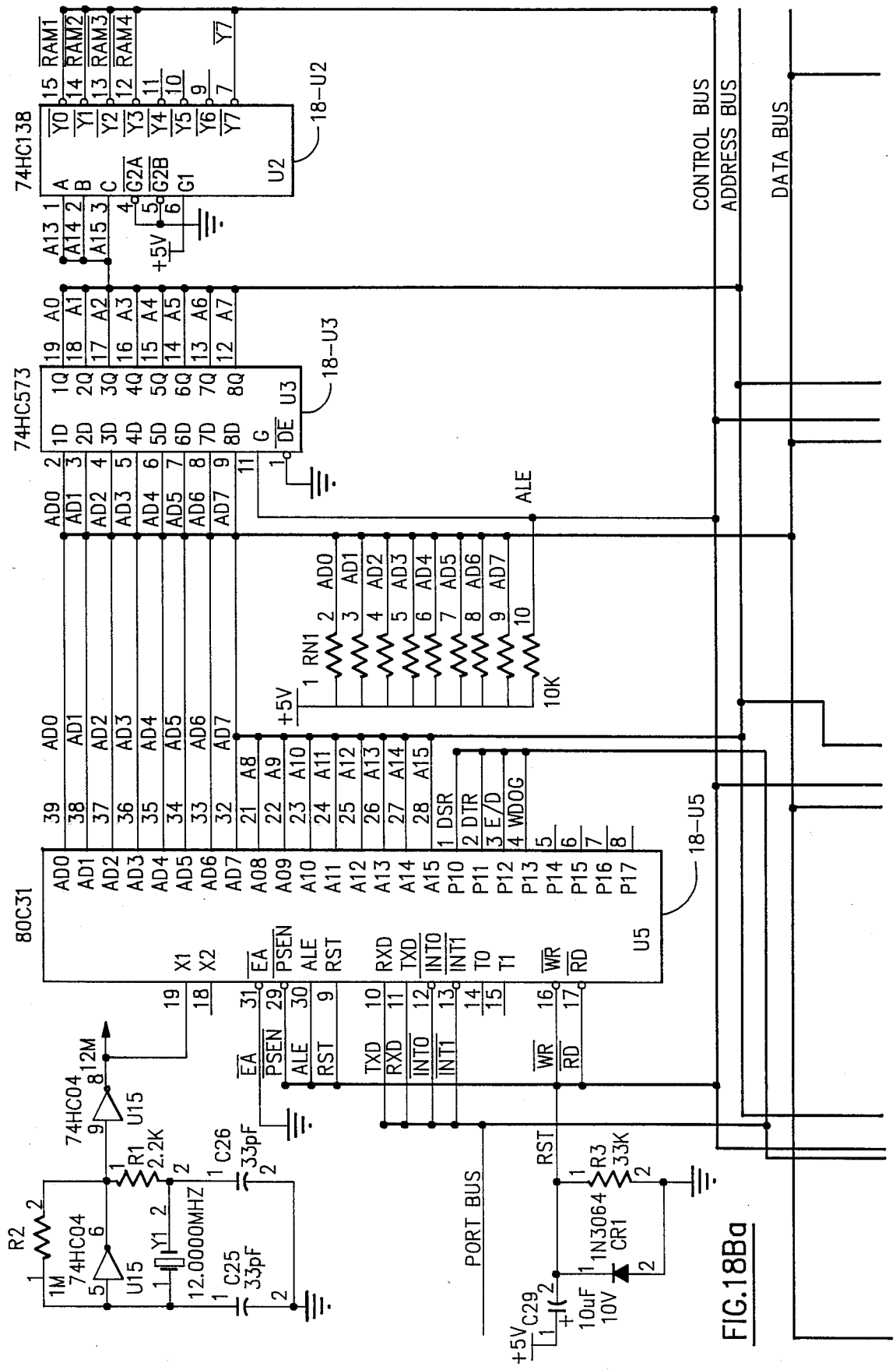
Figure 18B:
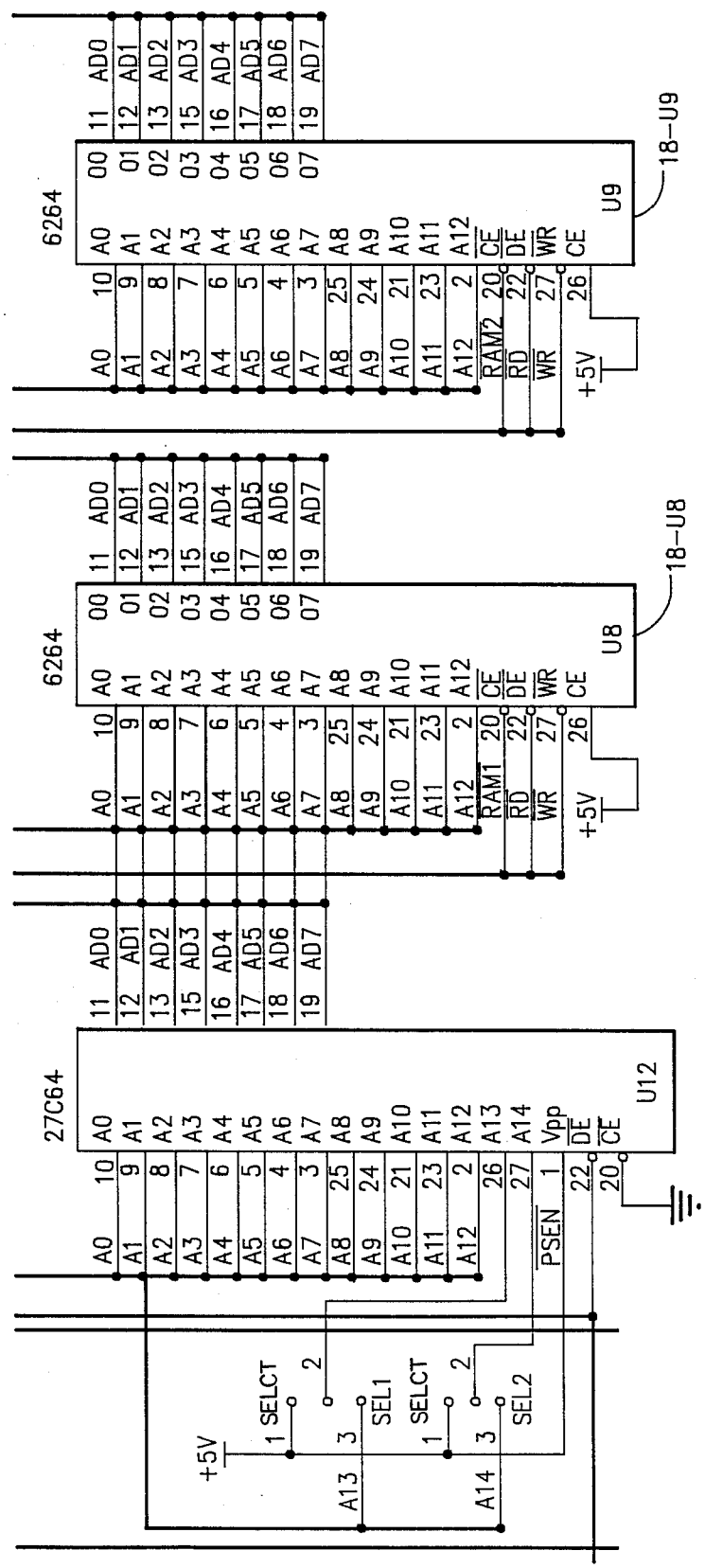
Figure 18G:
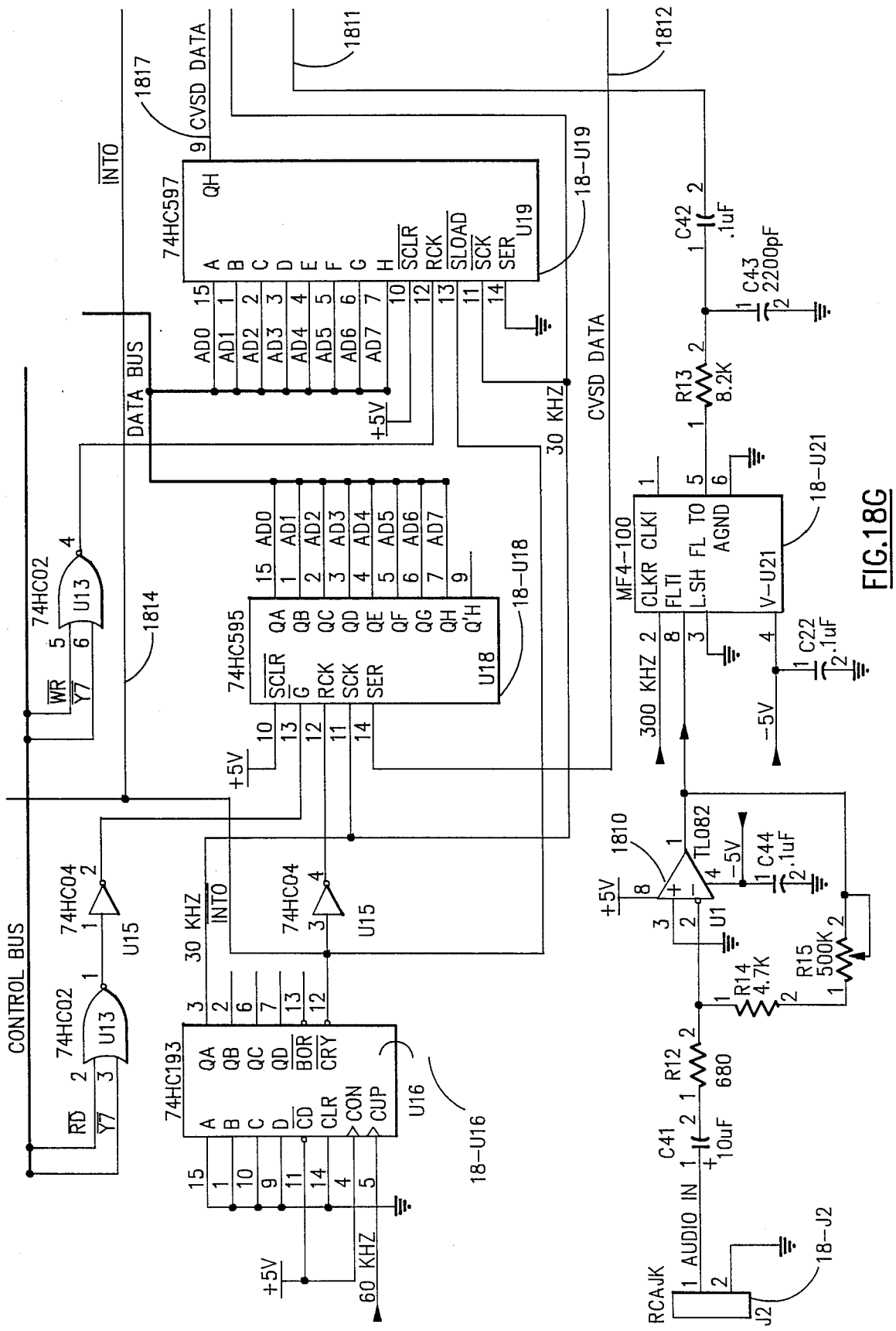

FIGS. 18A-18I illustrate an exemplary speech editor system for receiving analog (voice) signals at jack 18-J2, FIG. 18G, and digitizing the signals for storage and processing. Exemplary components for the speech editor circuitry are as follows:

| Component | Description |
|---|---|
| FIG. 18A | |
| 18-J1 | RS-232 D-Sub Connector |
| 18-U4 | RS-232 Interface e.g. MAX232 |
| 18-U6, U7 | e.g. 74HC390 |
| FIG. 18B | |
| Y1 | Crystal, 12.000 MHz |
| 18-U5 | Microcontroller, e.g. 80C31 |
| 18-U3 | e.g. 74HC573 |
| 18-U2 | e.g. 74HC138 |
| 18-U12 | Program storage |
| 18-U8, U9 | RAM e.g. 6264 |
| FIG. 18C | |
| U10, U11 | RAM, e.g. 6264 |
| FIG. 18D | |

-continued

| Component | Description |
|---|---|
| 18-REG1 | E.G. LM340T-5 |
| 18-J4 | Two-pin Mate and Lock Connector |
| FIG. 18E | |
| C-1-C21 | Filter Capacitors, e.g. 0.1 Microfarad |
| FIG. 18G | |
| 18-U16 | E.G. 74HC193 |
| 18-U18 | Serial to Parallel Shift Register, e.g. 74HC595 |
| 18-U19 | Serial to Parallel Shift Register, e.g. 74HC597 |
| 18-U21 | Switched Capacitor Filter Chip, e.g. MF4-100 |
| FIG. 18H | |
| 18-U17 | Continuously Variable Slope Modulator (CVSD), e.g. MC 3418 |
| 18-U20 | Switched Capacitor Filter Chip, e.g. MF4-100 |
| 18-J3 | RCA Audio Jack |
| FIG. 18I | |
| 18-U14 | e.g. LTC 1044 |

The editor circuitry of FIGS. 18A through 18I is controlled via an RS-232 input at 18-J1, FIG. 18A, and communicates with the host personal computer system using the X-on/X-off protocol. The program (known as "PHRED") running on the host personal computer prompts the user with a menu. The menu possibilities are:
(1) RECORD A PHASE
(2) PLAY BACK A PHRASE
(3) READ DIGITIZED PHRASE FROM PHRED ONTO DISK
(4) WRITE DIGITIZED PHRASES FROM DISK TO PHRED
(5) LIST PHRASES CURRENTLY ON DISK
(6) CHECK LINK WITH PHRED (checks RS-232 link)

The RAM storage 18-U8 through 18-U11 may provide only 8.5 seconds of speech, so that any message recorded or played back can be only 8.5 seconds long. If the message is to be longer, then it can be divided into several sections and played back on the "target" system with no perceptible pause between sections.

To record a phrase the user selects the appropriate menu and follows the prompts on the screen. The editor system accepts the user audio via input 18-J2, FIG. 18G, and amplifies the signal at 1810 to usable levels. The analog signal is passed through the band-limiting filter 18-U21 which limits the bandwidth to three kilohertz, and is then sent via line 1811, FIG. 18G, FIG. 18H, to the CVSD chip 18-U17. The CVSD chip digitizes the analog signal into a serial data stream at thirty kilobits per second. The serial data is supplied via line 1812, FIG. 18H, FIG. 18G, to the serial to parallel shift register 18-U18. The microcontroller 18-U5 is signaled by the counter hardware 18-U15 (via line 1814, FIG. 18G, FIG. 18H, of bus 1815, FIG. 18H, FIG. 18B,) that a byte of data is available for RAM storage, at the output port of shift register 18-U18. The byte of digitized voice data is placed in the next available RAM location and the RAM address counter 18-U2, 18-U3, FIG. 18B, is advanced to the next location. The procedure is repeated again and again until RAM space is used up or the user presses the space bar on the host computer keyboard, to stop recording.

Once a message is stored in the RAM memory 18-U9 through 18-U11, it can be played back in its entirety or in small sections, again menu selected by the user. A phrase can be dissected into its individual words or sounds and each stored as a new independent phrase. The editor plays back the selected phrase, or partial phrase, by reading sequential bytes of data from the RAM storage and outputting them one at a time to the parallel to serial shift register 8-U19, FIG. 18G. Counter hardware alerts the microcontroller that a new byte is needed by the shift register when the last byte has been shifted out. Actually the shift register 18-U19 is "double-buffered" meaning that it contains two byte storage locations. One is undergoing shifting while the other waits. This allows the processor 18-U5 more time to deliver another byte of data, a feature that facilitates programming. The shift register 18-U19 outputs the digital voice data via 1817, FIG. 18G, FIG. 18H, to the CVSD chip 18-U17 at thirty kilobits per second for conversion to analog form. A resultant analog signal from the chip 18-U17 is bandwidth-limited to three kilohertz at component 18-U20 and output to a buffer amplifier 1818, FIG. 18H. The buffer amplifier simply drives a pair of head phones so that the user can hear the results of his/her editing.

The audio signal is bandwidth-limited by component 18-U21, FIG. 18G, when recording to prevent "aliasing", a distortion that is caused by a signal changing too much between digitization sample periods. The bandwidth-limiting at the output of 18-U17, FIG. 18H, is needed to limit the high frequency content of the signal, and to strip off the digitization noise that occurs as a result of waveform reconstruction.

Once the user is satisfied with the edited phrase, he or she can transfer the data to the host system's mass storage device (e.g. a hard or floppy disk, or a system RAM disk) where it will be stored as a unique message.

A message, or group of messages, can be transferred from the host memory to EPROM devices such as 17-U1 through 17-U8, FIG. 17B, for use in the target speech generator device. As previously described, first the messages are collected and butted together (to save memory space), and a library formed defining each message's absolute starting address and length. This is done using the program "DOMFILE" which prompts the user for the names of the stored message phrases and links them together and creates the library. The library is linked first so it resides in the lowest target ROM addresses.

Description of FIGS. 19A-19F

Figure 19A:
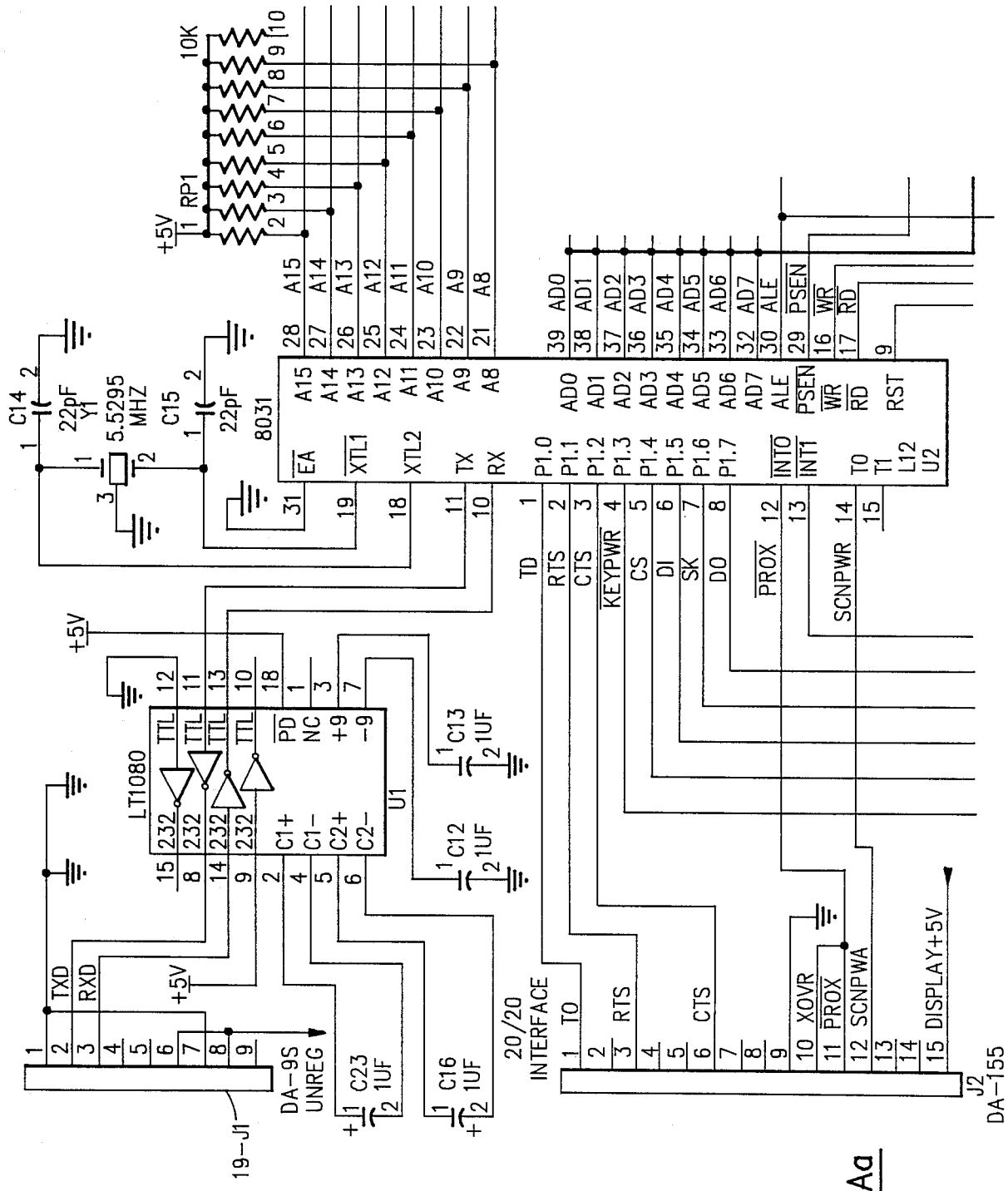
FIGS. 19A through 19F show a circuit for the scanner box of FIG. 14 which has been revised somewhat in comparison to the circuit of FIGS. 15A through 15G, FIG. 19B being a continuation of FIG. 19A to the right, and FIG. 19C being a continuation of FIG. 19B to the right.

FIGS. 19A through 19F show a circuit for the scanner box 14-28 or 14-30, FIG. 14A, which has been revised somewhat in comparison to the circuit of FIGS. 15A-15G. Exemplary components in FIG. 19A et seq. may be as follows:

| Component | Description |
|---|---|
| FIG. 19A | |
| 19-J1 | Nine Position Connector for RS-232 Interface |
| 19-J2 | Fifteen Position Connector for Instant Bar Code Reader Interface |
| 19-J3 | Ten Pin Header for |

Figure 19B:
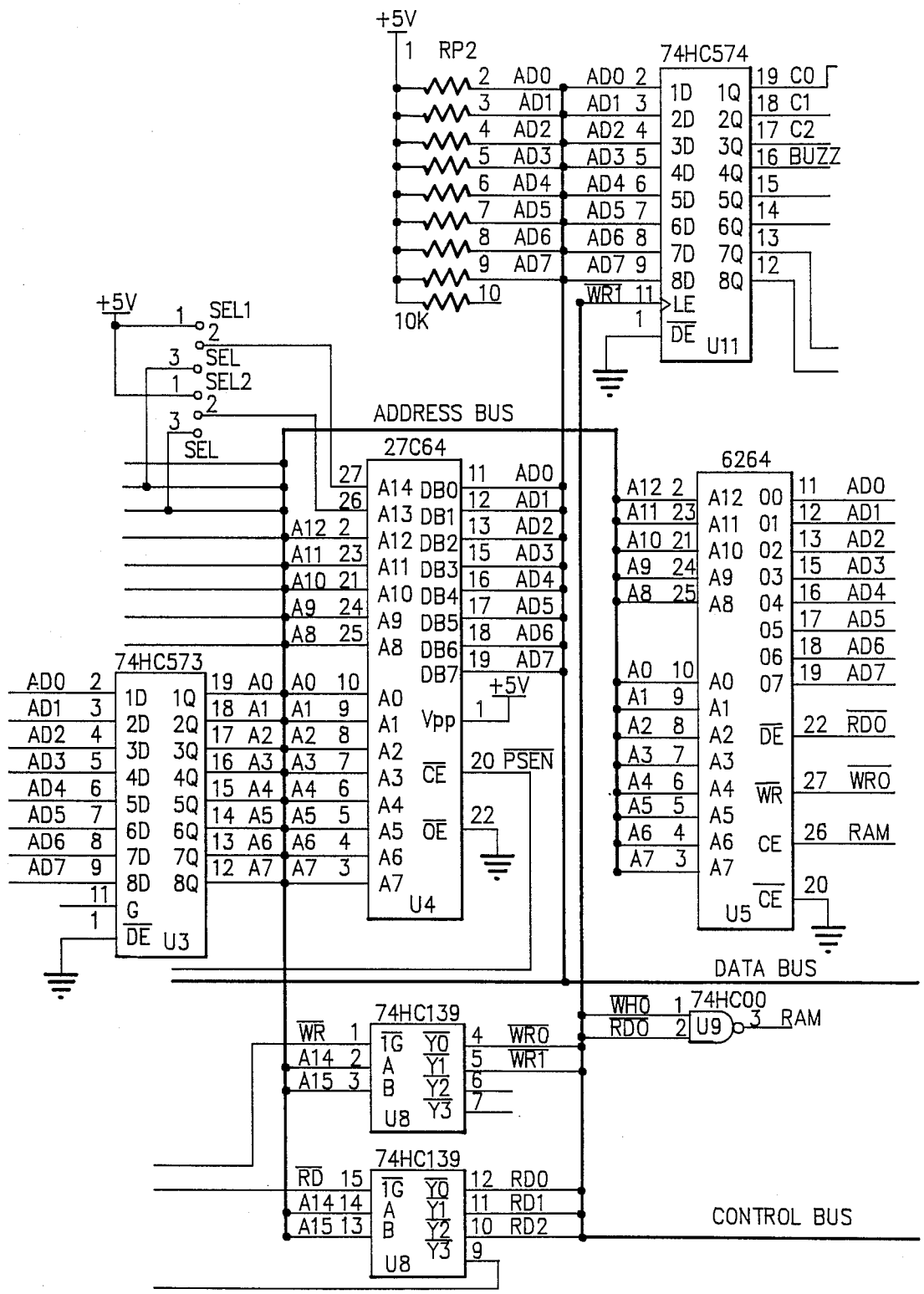
Figure 19C:
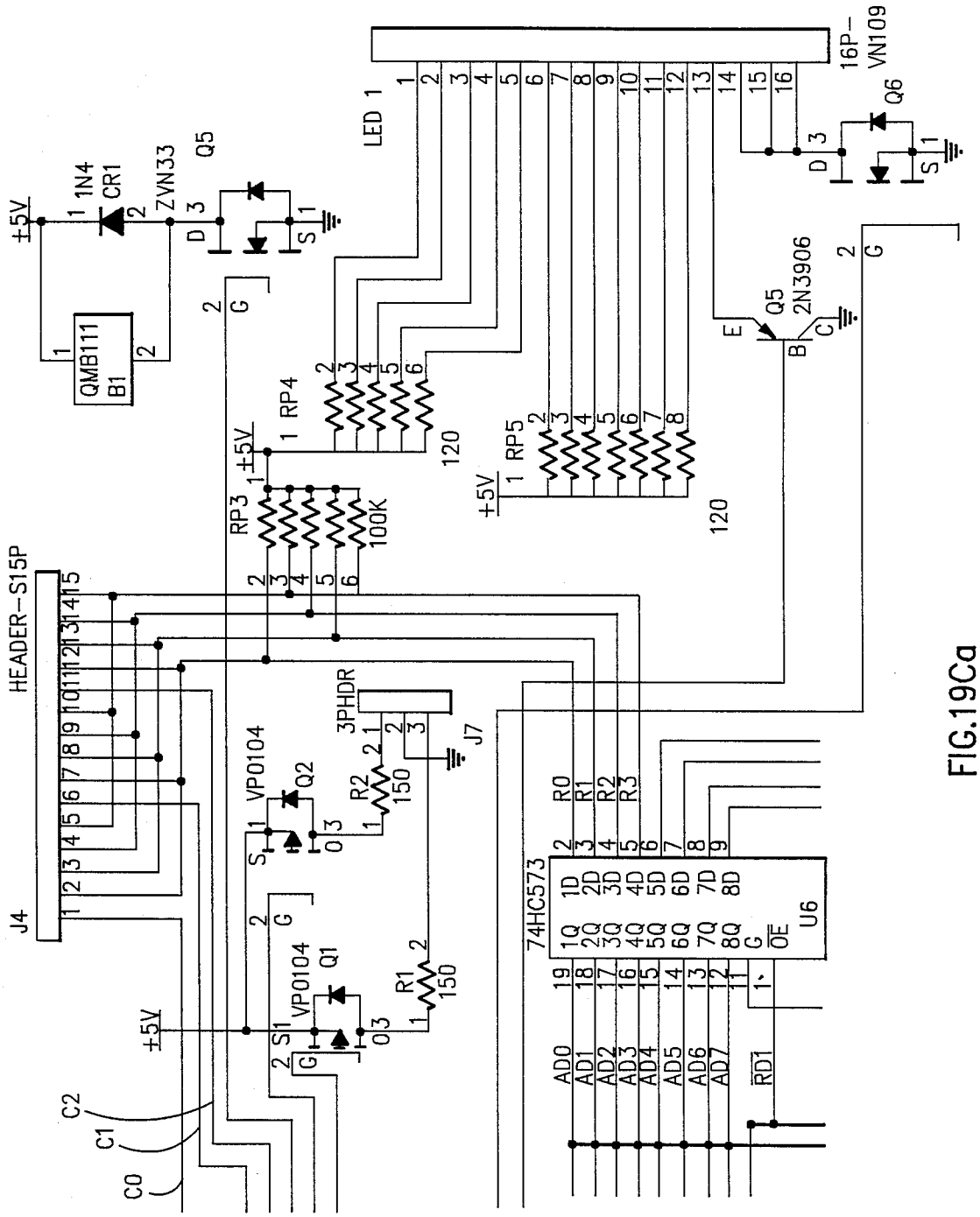
Figure 19F:
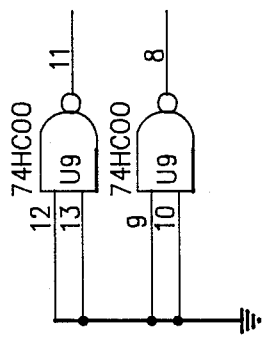
Figure 19E:
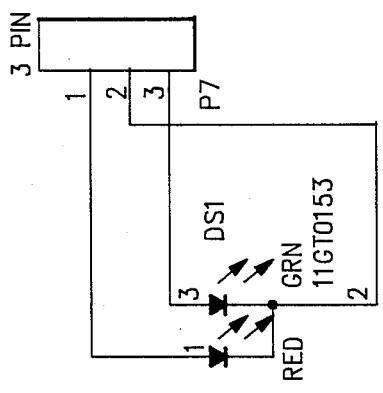
Figure 19D:
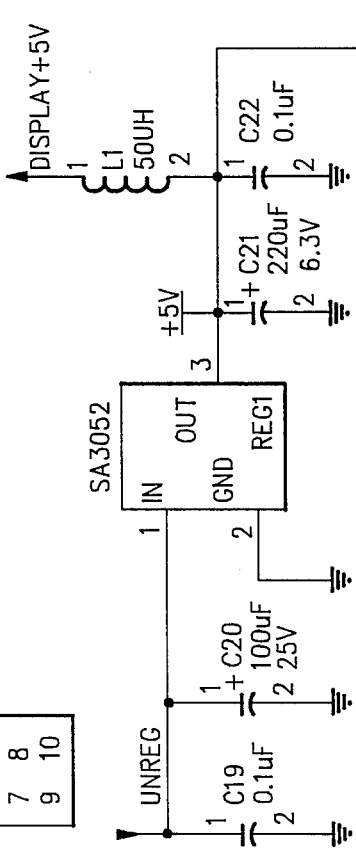

| Component | Description |
|---|---|
| 19-U1 | Key Lock Input RS-232/TTL Converter e.g. LT1080 |
| 19-Y1 | Crystal (5.5295 megahertz) |
| 19-U2 | Microcomputer, e.g. 8031 |
| 19-U7 | e.g. DS1232 |
| FIG. 19B | |
| 19-U3 | e.g. 74HC573 |
| 19-U4 | e.g. 27C64 |
| 19-U11 | e.g. 74HC574 |
| 19-U5 | e.g. 6264 |
| 19-U8 | e.g. 74HC139 |
| FIG. 19C | |
| 19-J4 | Fifteen Position Header for Keyboard Interface |
| 19-J7 | Three Position Header (See FIG. 19E) |
| 19-B1 | Piezo Transducer (Beeper) e.g. QMB111 |
| 19-U6, 19-U10 | e.g. 74HC573 |
| 19-J5 | Sixteen Position Header for LED Interface |
| 19-J6 | Sixteen Position Header |
| FIG. 19D | |
| 19-REG 1 | e.g. SA3052 |
| 19-L1 | e.g. fifty microhenries |
| C1-C19, C22 | e.g. 0.1 microfarad |
| C20 | e.g. 100 microfarads, 25 volts |
| C21 | e.g. 220 microfarads, 6.3 volts |
| FIG. 19E | |
| 19-DS1 | e.g. red and green (two-color) light emitting diode |

The circuit of FIGS. 19A-19F will be readily understood from the description given in relation to FIGS. 15A-15H.

Description of FIGS. 20 through 25

Figure 21:
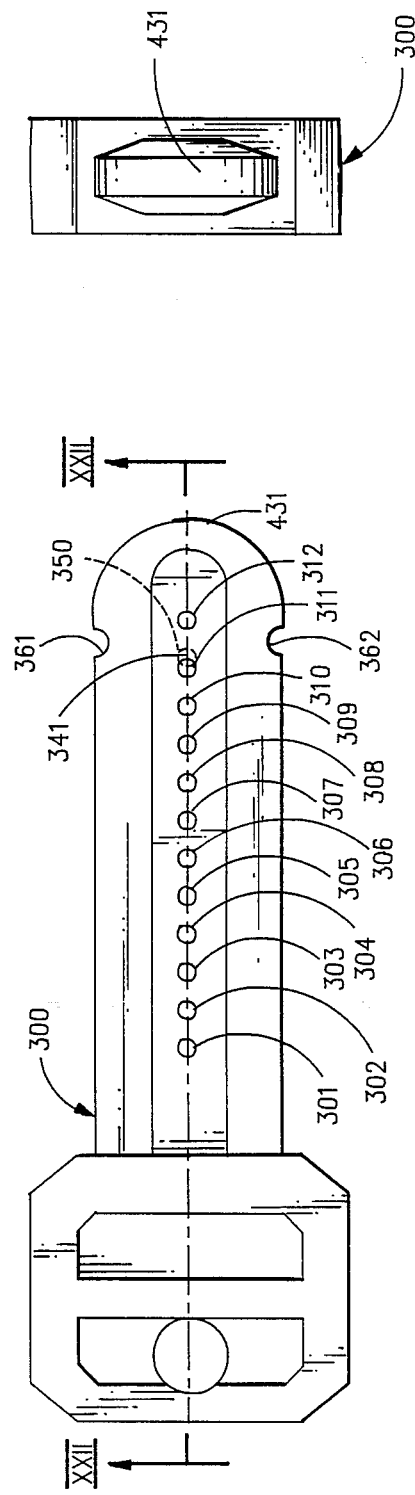
FIG. 21 is a somewhat diagrammatic side elevational view of an optical key for association with the scanner box of FIG. 14A.

FIG. 20 shows a series of infrared emitting diodes which may be utilized for sensing a hole pattern in a driver identification key such as shown in FIG. 21. The diodes may be mounted in two arrays 20-CR1 and 20-CR2, for example each corresponding to Siemens part number LD266. A sixteen position header 20-J1, FIG. 20, may mate with a corresponding header 19-J5, FIG. 19C. An arrangement similar to that shown in FIG. 20 may be utilized for coupling two arrays of infrared sensors, e.g. Siemans BPX86 phototransistor arrays, with the header 20-J6, FIG. 19C.

Figure 23:
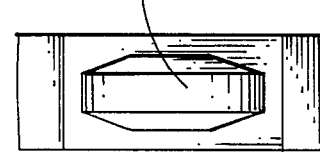
FIG. 23 is a somewhat diagrammatic end view of the key configuration of FIG. 21.
Figure 22:
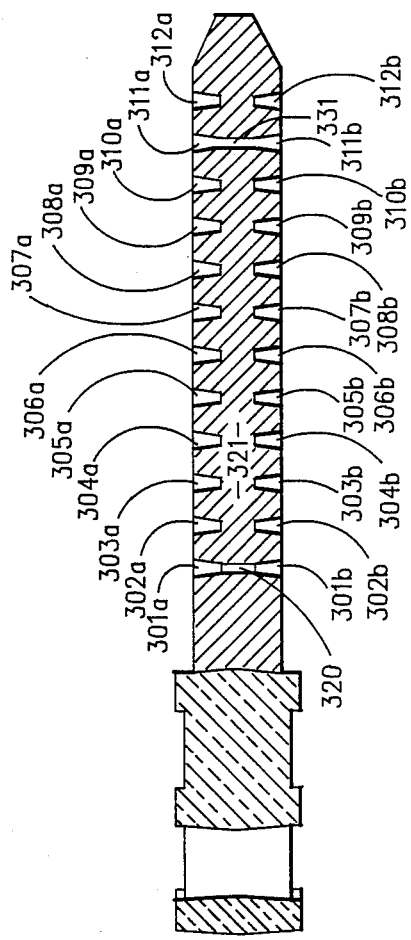
FIG. 22 is a somewhat diagrammatic horizontal sectional view taken generally along the line XXII—XXII of FIG. 21.

FIGS. 21, 22 and 23 show a preferred key configuration 300 for use in conjunction with the scanner boxes 14-28, 14-30, FIG. 14A, for identifying individual drivers. The key cooperates with the infrared emitter arrays 20-CR1 and 20-CR2, FIG. 20, to transmit a pattern of infrared beams unique to the particular key. Sensor arrays coupled with header 19-J6, FIG. 19C, are activated according to the particular transmitted identifying code and supply the identifying code to latches 19-U6 and 19-U10, FIG. 19C, for use in the system as previously described.

The key 300 as presently being produced in prototype quantities is made of molded black ABS plastic with a series of twelve code positions 301-312, FIG. 21. As initially formed, the code positions are defined by wells 301a-312a and 301b-312b, FIG. 22. To code a particular key blank, selected ones of the wells such as 301a, 301b are joined a by drilling through the interposed web 320 as indicated by dot-dash lines 321, FIG. 22. As presently used, wells 312a and 312b at the twelfth code position are never joined to form a complete hole, and the optical emitter and sensor aligned with code position 312 are used to sense whether or not a key has been inserted. Wells 311a and 311b are always joined as indicated by bore 331 to form a complete hole at eleventh code position 311 which serves to determine whether the key has been fully inserted. Where the code positions 301-310 have a uniform center to center spacing of 0.10 inch, position 311 may be spaced from position 310 by 0.08 inch, and may be spaced from position 312 by 0.120 inch, so that the optical emitter for position 311 has its beam axis 341 offset from the axis of position 311 by 0.02 inch. Where the key receptacle of FIGS. 24 and 25 has infrared beam transmissive apertures uniformly spaced at 0.10 inch centers, (each aperture having a diameter of 0.055 inch, and the wells tapering from 0.062 inch diameter to 0.060 inch diameter), the receptacle beam transmissive apertures may fully register within the cross section of the wells at positions 301-310 and 312, but the receptacle beam transmissive aperture for position 311 will define an effective beam position as indicated at 350, FIG. 21, whose center 341 is offset from the center of position 311 by 0.02 inch. A detent (shown in FIG. 24) may cooperate with notch 361 or 362 to tend to retain the key in fully inserted position.

Code positions 301-309 may be selectively provided with through-holes to define five hundred and twelve differently coded identification keys for a given system, while code position 310 may be utilized as a parity bit position. For example, the sum of the through-holes at any of positions 301-310 may be maintained as an odd number (odd parity) by the choice of a through-hole or not, at position 310.

In full scale production of the illustrated system it is intended to use a carbon dioxide laser in conjunction with an accurately positionable fixture to apply the respective different through-hole patterns to a set of blank keys. The blank keys can be produced by injection molding very economically. If desired, after the holes have been selectively formed to define the individual keys, the holes can be filled or covered with a clear or infrared-transmissive plastic.

FIG. 24 shows a cross section of a key receptacle formed of outer parts 401 and 402, and inner parts 403 and 404. The parts have adjoining elongated recesses 401a, 403a and 402a, 404a for accommodating circuit boards 406 and 407 carrying the optical arrays 408 and 409. FIG. 25 shows twelve apertures 403b which are aligned with twelve infrared emitters 410 of array 408. The parts 403 and 404 are provided with twelve sets of aligned apertures such as 403b, 404b, FIG. 24, which may transmit an optical beam of the desired cross section. The apertures 403b transmit the respective beams from the emitters 410 in slot 403a, to the key receiving chamber 411, and the apertures 404b pass the beams transmitted through the key to array 409 which contains sensor elements 412. The apertures 403b and 404b may have a diameter (e.g. 0.055 inch) about ten percent less than the minimum diameter (e.g. 0.060 inch) of the through holes such as 321 and 331, FIG. 22, in the key (a reduction in cross-sectional area of about twenty percent).

The part 404 with its array of photosensors 412 would appear as a mirror image of part 404 shown in FIG. 25 so that the twelve photosensors 412 would be aligned with respective ones of the twelve beam axes such as indicated at 414, FIG. 25. The position of beam axis 341, FIG. 21, has been specifically indicated in FIG. 25, to assist in correlating these figures.

Inner parts 403 and 404 have polygonal walled cavities 403c and 404c which cooperate to define the key receiving chamber 411 substantially conforming to the cross-sectional contour of the insertion end of key 300 as shown in FIG. 23.

The circuit boards 406 and 407 may have a width of about 0.80 inch corresponding to the widths of the enlarged portions of recesses 403a and 404a. The circuit boards were identical in the exemplary preferred embodiment which took advantage of the electrical pin-outs and physical symmetries of the LED and phototransistor devices 408 and 409. The array circuit boards 406 and 407 are each connected to the main circuit board (containing the circuitry of FIGS. 19A–19F) by sixteen conductor flat ribbon cables such as 414 which couple with printed circuit board stake headers 415 and 416, FIG. 24, via stake header receptacles such as 417.

As shown in FIG. 25, a key faceplate 420 may have an aperture 420a accommodating the key of FIGS. 21–23 and aligned with the key receiving chamber defined by cavities 403c, 404c, FIG. 24. The faceplate 420 fits into a square aperture 421a of a plate 421 which may form a part of a scanner box such as indicated at 14-28 and 14-30, FIG. 14A.

The mating parts 403 and 404 have cooperating semicylindrical grooves such as 403d, FIG. 25, which accommodate a detent plunger 430 having a rounded tip 430a which can be raised by the rounded end 431 of the key 300, FIG. 21, against the action of a beryllium copper leaf spring 432, FIG. 24, and then urge the key into the correct inserted position and hold it in such position.

Four screws such as 445, FIG. 25, hold the parts 401–404 in assembled relation, and four screws such as 446, FIG. 24, hold the key receptacle assembly and faceplate 420 in fixed relation to wall 421.

Figure 27:
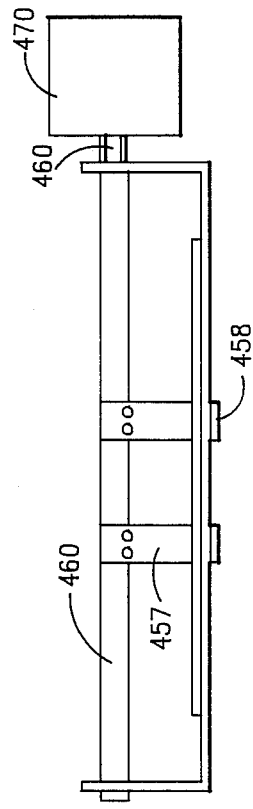
FIG. 27 is a diagrammatic top plan view of the cutter mechanism of FIG. 26.
Figure 26:
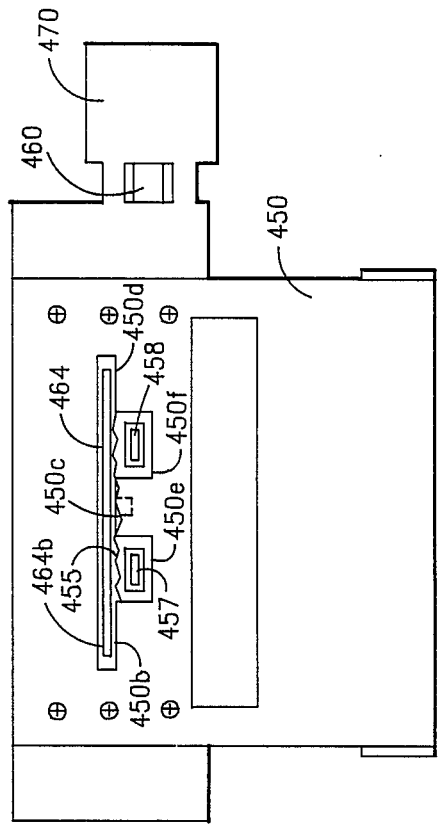
FIG. 26 is a diagrammatic front elevational view of a kitchen printer cutoff mechanism for utilization in a cook station such as shown in FIG. 2 and may serve as a remote data presentation means.
Figure 28:
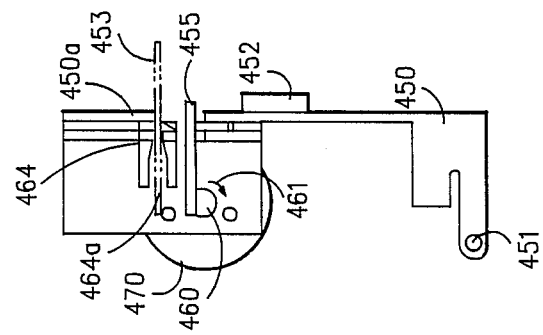
FIG. 28 is a diagrammatic left side elevational view of the cutter mechanism.

Description of FIGS. 26, 27 and 28

In a cook station such as shown in FIG. 2, the remote data presentation means 22 may alternatively take the form of a printer for producing a paper printout such as shown in FIG. 9. Such a printer is indicated at 14-64, FIG. 14B.

In FIGS. 26, 27 and 28, a solenoid actuated cutting mechanism is illustrated for association with a conventional print mechanism (e.g. a model DP-575L Citizen dot matrix printer) which provides a paper tape width of seventy millimeters and forty print columns per line. The cutter mechanism has been designed so as to operate effectively with a low current power supply such as shown in FIG. 29 et seq.

Figure 28A:
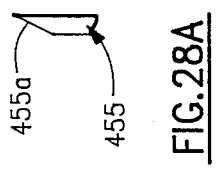
FIG. 28A shows a detail of the cutter blade in end elevation.

The cutter mechanism includes a cutter mounting plate 450 which has a paper feed slot 450a through which the paper is fed after being printed upon. The plate 450 is rotatable (clockwise as viewed in FIG. 28) about an axis 451 to provide access to the printer mechanism immediately to the rear thereof. A buffer pad 452 projects forwardly of plate 450 and may engage a removable cover to maintain the plate 450 in its upright position. The paper path is indicated with dot dash lines at 453 in FIG. 28. A knife blade 455 has sharp knife edges 455a, FIG. 28A, normally disposed below paper support edges 450b, 450c and 450d, but driven upwardly to cut the paper via a rotary shaft 460 having cutter lifting fingers 457 and 458 which lift the cutter blade 455 when the shaft 460 is driven rotationally in the direction of arrow 461, FIG. 28. A paper guide throat member 464 has a slot contour 464a for guiding the paper toward the position of knife blade 455. The throat member 464 has notches generally configuraing with notches 450e and 450f of plate 450, FIG. 26, to accommodate the vertical motion of cutter lifting fingers 457 and 458. By way of example the throat member 464 has a throat width of about 2.75 inches with rounded lateral boundaries as indicated in FIG. 26. As viewed in FIG. 28, the throat has a maximum height of 0.125 inch (normal to the plane of the paper), and has curved upper and lower walls (radius of curvature 0.0625 inch) coverging to a slot 464b with a height of 0.062 inch. The height of slot 450a of plate 450 is generally 0.093 inch except at notches 450e and 450f.

In a successfully operating cutter, the knife blade 455 was made from 0.015 inch stock, and had a length of 2.80 inches, where the slot 450a had a length of 2.90 inches. The outside pair of teeth had tips spaced inwardly 0.15 inch from the respective outer margins. The remaining four teeth were uniformly spaced from the outer teeth at 0.50 inch centers, so that all six teeth were uniformly spaced. The height of the teeth was 0.10 inch, and the teeth were ground at one side to form a sharp edge as indicated at 455a, FIG. 28A.

The rotary shaft 460 was driven by a rotary solenoid 470 by means of the circuit of FIG. 29A et seq. which will now be described. It is considered that a linear solenoid action could perhaps rotate the shaft 460 via a crank with even greater effectiveness in conjunction with the illustrated electric driving circuit.

Figure 29A:
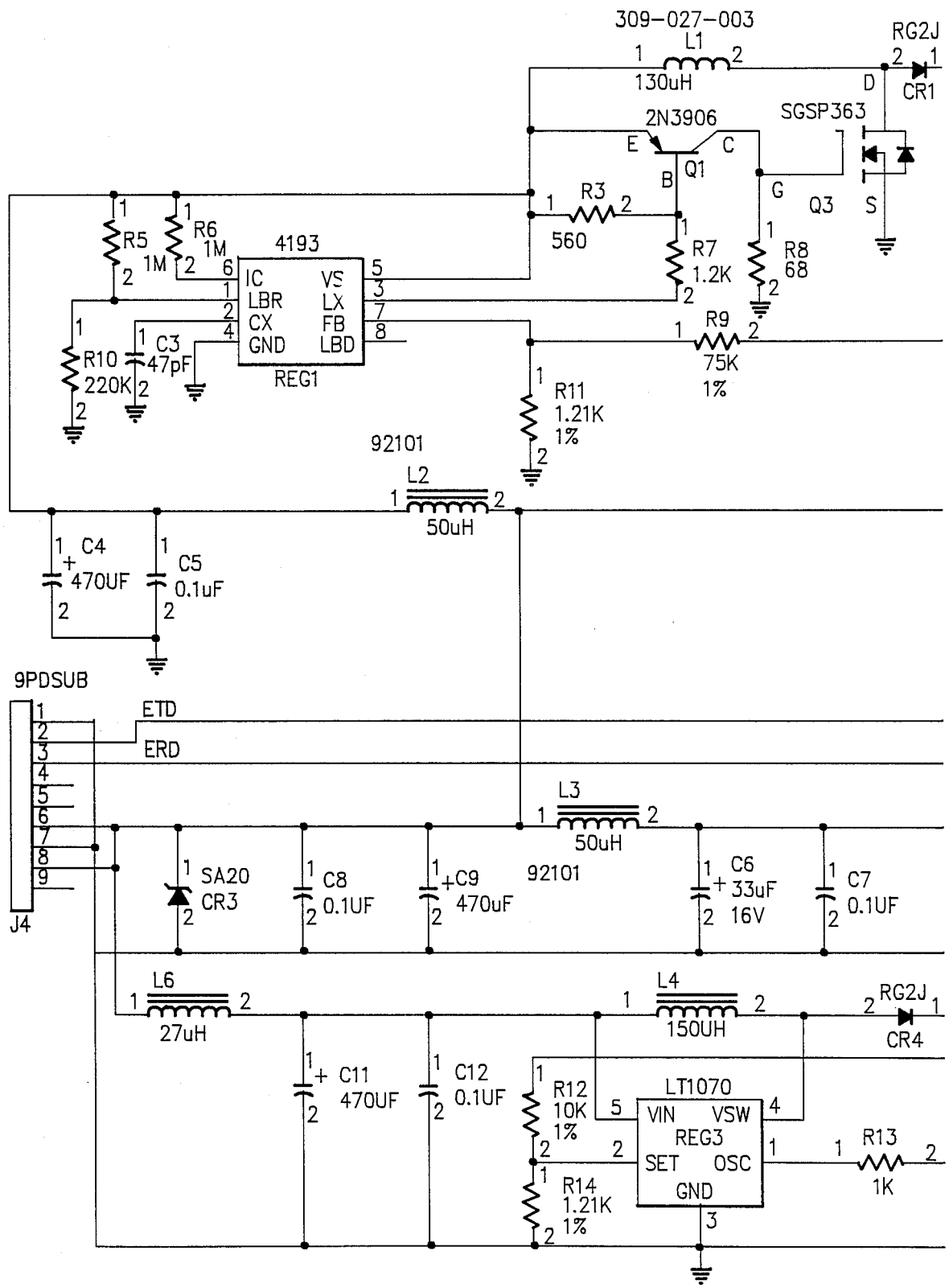
FIGS. 29A and 29B show power supply circuitry for the cutter mechanism of FIGS. 26, 27, 28 and 28A, and associated components, FIG. 29B being a continuation of FIG. 29A to the right.
Figure 29B:
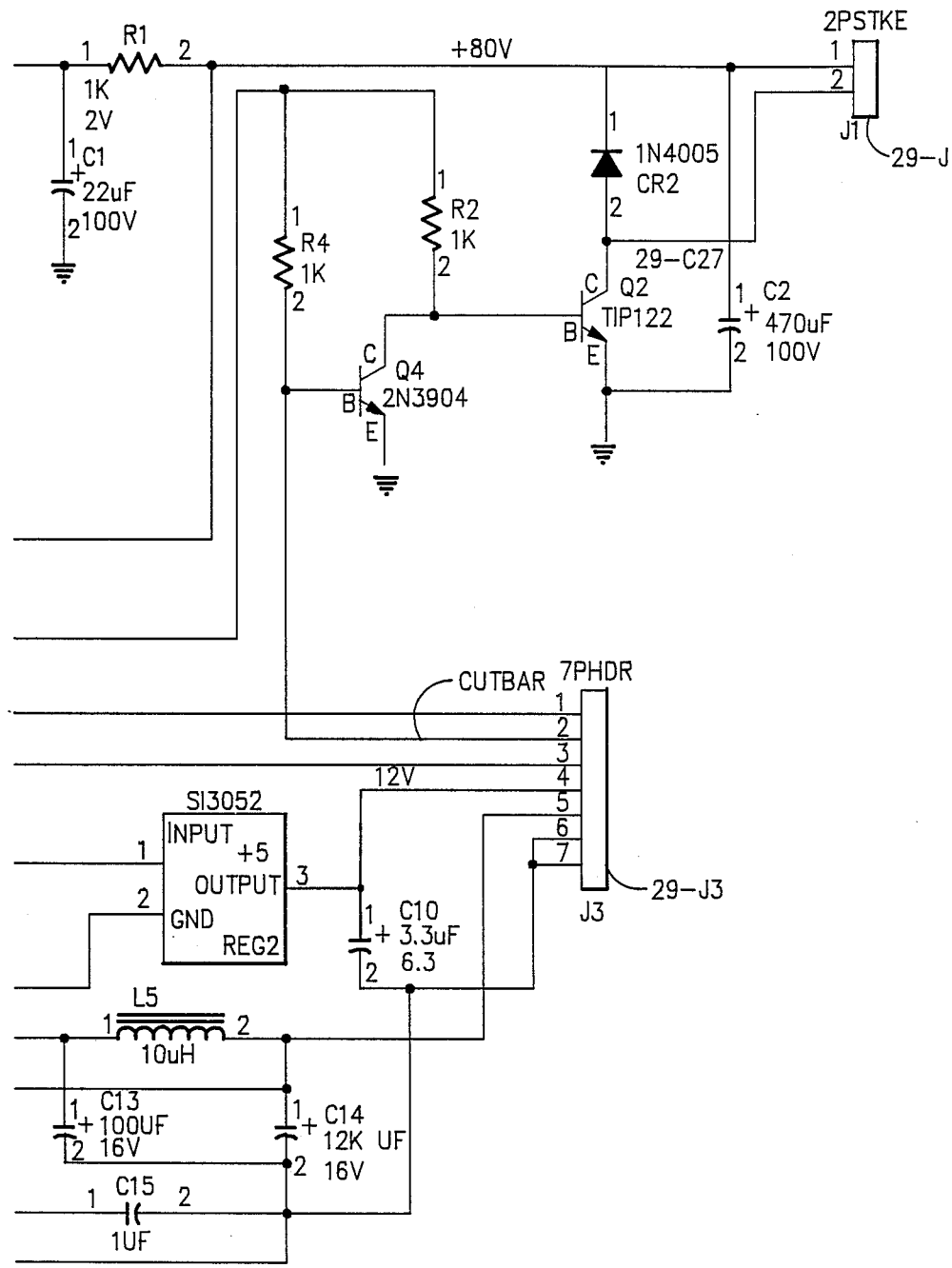

Description of FIGS. 29A and 29B

FIGS. 29A and 29B show an exemplary electric circuit which has been actually utilized with the cutter of FIGS. 26, 27, 28 and 28A to effect a cut in about ten milliseconds. This is considered to represent a ballistic type of cutting operation. The illustrated circuit supplies eighty volt power for driving the solenoid 470, FIG. 26, twelve volt power for the printer mechanism, and five volt power for the printer control module of FIG. 30A et seq. The following are the exemplary circuit parameters of the circuitry now in successful operation:

| Component Designation | Description |
| --- | --- |
| FIG. 29A | |
| 29-REG. 1 | Inverting Switching Regulator, e.g. 4193 |
| 29-REG. 3 | e.g. LT1070 |
| 29-J4 | Nine Pin D SUB Connector |

| Circuit Element | Exemplary Type or Value |
| --- | --- |
| C3 | 47 picofarads |
| C4 | 470 microfarads (25 volts) |
| C5, 7, 8, 12 | 0.1 microfarads |
| C6 | 33 microfarads (16 volts) |
| C9, 11 | 470 microfarads (25 volts) |
| CR1 | RG2J |
| CR3 | SA20 diode |
| CR4 | RG2J diode |
| L1 | 130 microhenries |
| L2, 3 | 50 microhenries |
| L4 | 150 microhenries |
| L6 | 27 microhenries |
| Q1 | 2N3906 |

| | |
|---|---|
| Q3 | SGSP363 |
| R3 | 560 ohms |
| R5, R6 | 1 megohm |
| R7 | 1.2 kilohms |
| R8 | 68 ohms |
| R9 | 75 kilohms (1%) |
| R10 | 220 kilohms |
| R11, 14 | 1.21 kilohms (1%) |
| R12 | 10 kilohms (1%) |

| Component Designation | Description |
|---|---|
| 29-J1 | Two Pin Stake Header |
| 29-REG2 | e.g. SI3052 |
| 28-J3 | Seven Position Header |

| Circuit Element | Exemplary Type or Value |
|---|---|
| R1 | one kilohm (two watts) |
| R2,4 | one kilohm, 1/4W, 5% |
| C1 | 22 microfarads (100 volts) |
| C2 | 470 microfarads (100 volts) |
| C10 | 3.3 microfarads (6.3 volts) |
| C13 | 100 microfarads (16 volts) |
| C14 | 12000 microfarads (16 volts) |
| C15 | 1 microfarad |
| L5 | 10 microhenries |
| CR2 | 1N4005 |
| Q2 | TIP122 |
| Q4 | 2N3904 |

The solenoid 470, FIG. 26, is driven from capacitor 29-C2 via connector 29-J1. In present service, the cutter is actuated every four seconds, but it is feasible to actuate at about two second intervals. At each actuation it is considered that capacitor 29-C2 is substantially fully discharged (down to a voltage below 9.6 volts), and that a subsequent substantially complete recharging would take in about 2½ seconds.

Description of FIGS. 30A through 30E

FIGS. 30A through 30E show an exemplary control circuit which is being used to control the cutter drive circuit of FIG. 29A and FIG. 29B. The CUTBAR output at line 480, FIG. 30C, connects with pin 2 of connector 29-J3, FIG. 29B, via connector 30-J4, FIG. 30D, to control actuation of the cutter drive solenoid 470, FIG. 27.

Figure 30A:
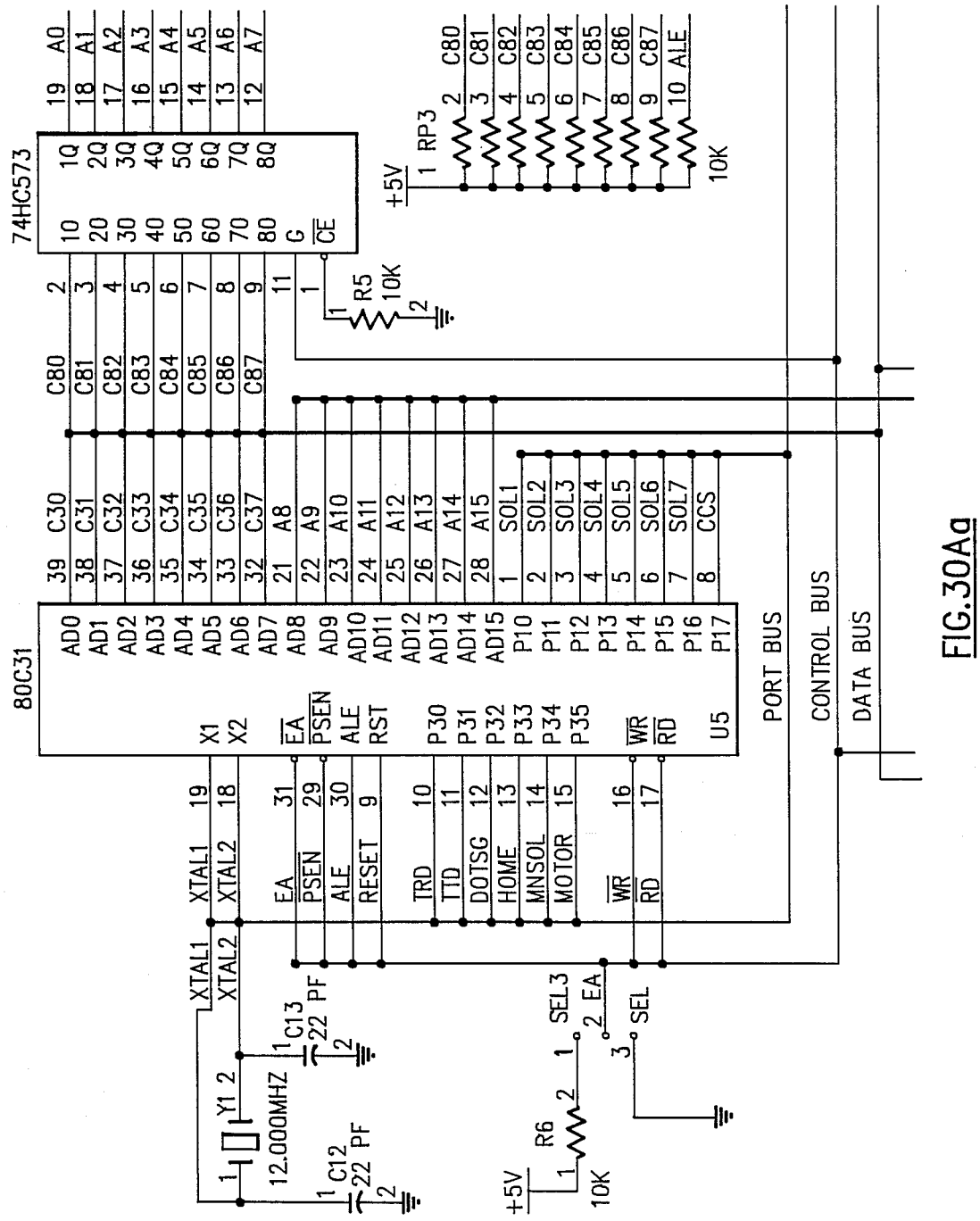
FIGS. 30A through 30D show a control circuit for the printer including the cutter mechanism of FIGS. 27 et seq. and which receives power from the power supply of FIGS. 29A and 29B, and supplies control signals to the cutter bar circuitry of FIGS. 29A and 29B, FIG. 30B being a continuation of FIG. 30A to the right, FIG. 30C being a continuation of FIG. 30B to the right, FIG. 30D being a continuation of FIG. 30C in a downward direction, FIG. 30E showing a capacitor associated with the plus five volt supply.
Figure 30B:
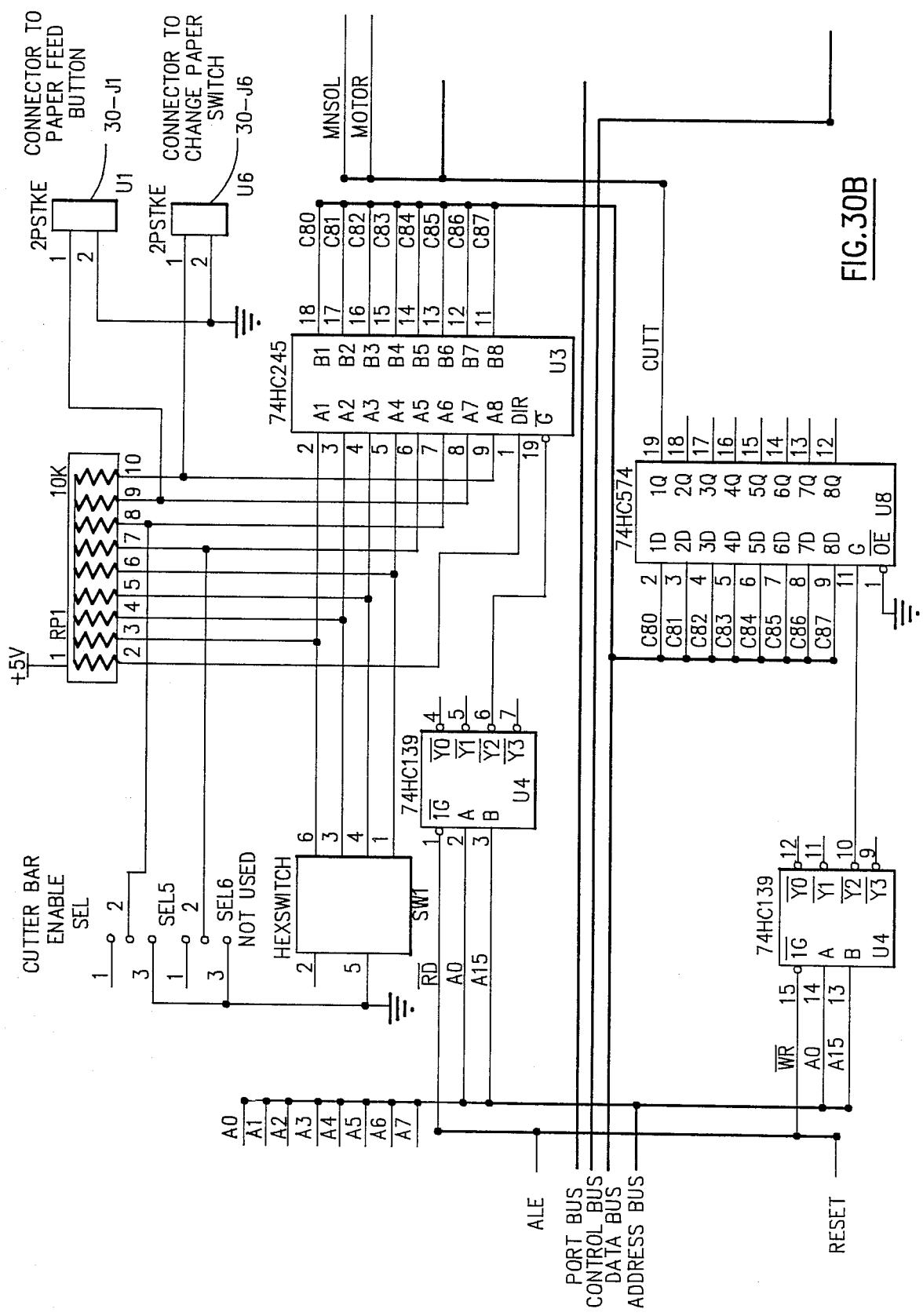

Connector 30-J1, FIG. 30B, receives a signal according to the condition of a paper feed button on the printer, while connector 30-J6, FIG. 30B, receives the signal from a change paper switch. Connector 30-J2, FIG. 30C, receives an eighteen pin connector for the flex cable from the printer. Connector 30-J4 mates with connector 29-J3, FIG. 29B, of the printer power supply and cutter control module.

Figure 30C:
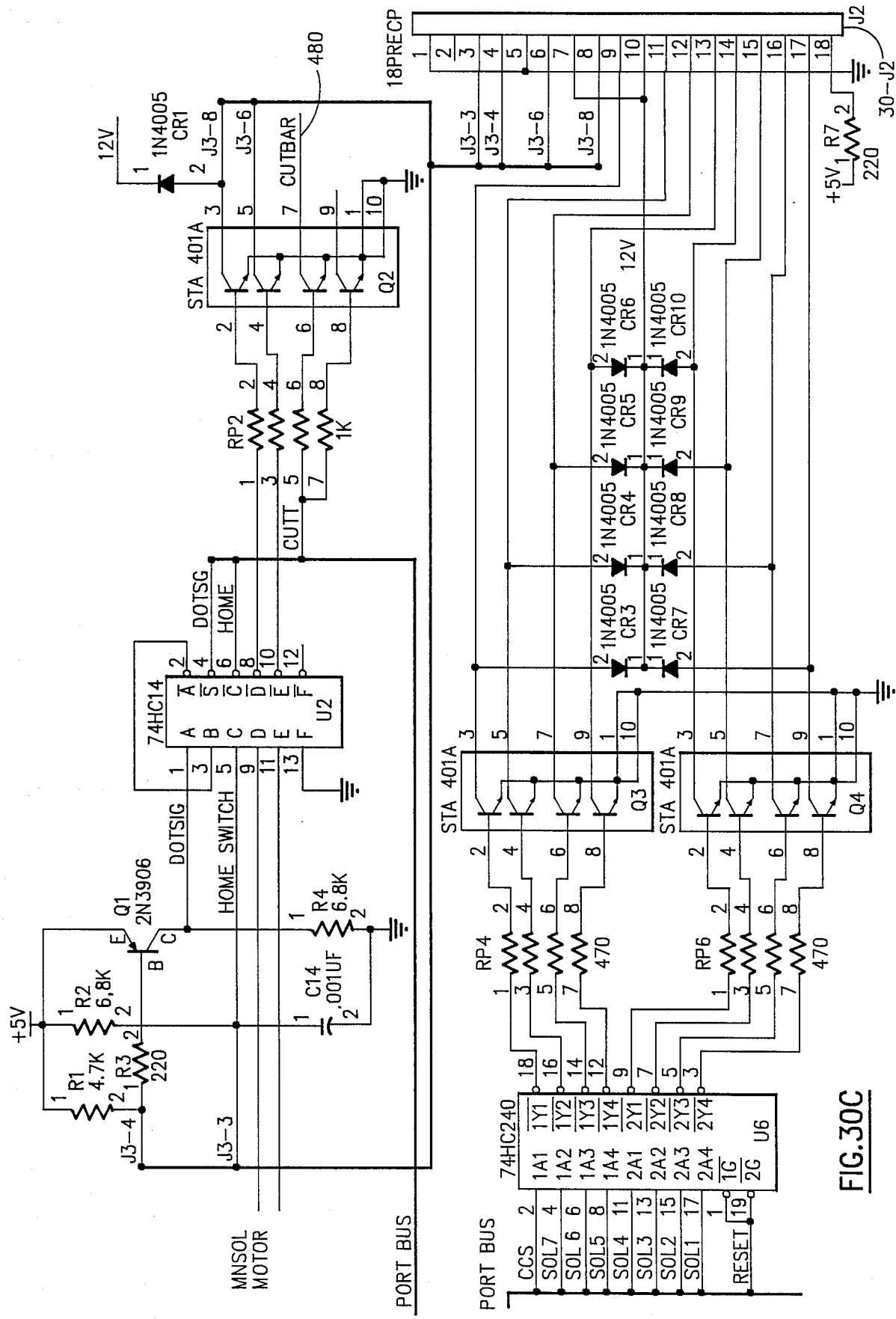
Figures 30D, 30E:
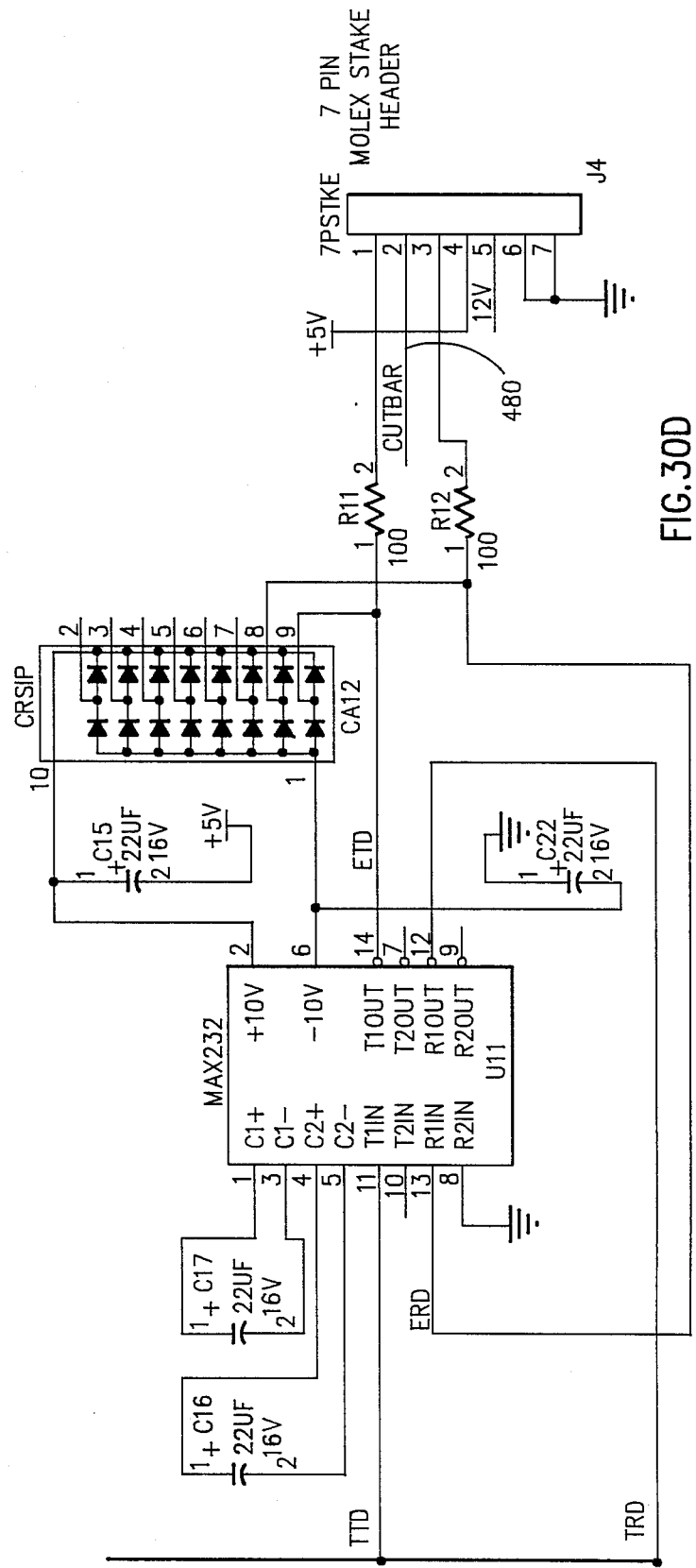

The following are exemplary parameters for FIGS. 30A-30E:

| Component Designation | Description |
|---|---|
| FIG. 30A | |
| 30-U5 | Microcomputer e.g. 80C31 |
| 30-U1 | Three-State Latch e.g. 74HC573 |
| 30-U10 | 8k × 8 EPROM e.g. 2764 |
| 30-U9 | 8k × 8 STATIC RAM e.g. 6264 |
| 30-U7 | e.g. DS1231 |
| 30-Y1 | Crystal (e.g. 12.000 MHZ) |
| FIG. 30B | |
| 30-J1 | Connector to Paper Feed Button, e.g. two position stake header |
| 30-J6 | Connector to Change Paper Switch, e.g. two position stake |
| 30-U3 | Octal Bus Transceiver e.g. 74HC245 |
| 30-U4A, U4B | Two to Four Bit Decoder e.g. 74HC139 |
| 30-U8 | D-Type Flip Flop Positive Edge Triggered Three State, e.g. 74HC574 |
| 30-SW1 | Hex Switch |
| FIG. 30C | |
| 30-U2 | Hex Schmitt Trigger e.g. 74HC14 |
| 30-U6 | Tristate Inverting Octal Buffer e.g. 74HC240 |
| 30-J2 | Eighteen Pin Connector for Flex Cable from Printer Module |
| 30-Q2, Q3, Q4 | NPN Transistor Array, e.g. STA401A |
| FIG. 30D | |
| 30-U11 | RS-232 Interface, e.g. MAX232 |
| 30-J4 | Seven Pin Connector, e.g. Molex stake header |

Figure 32:
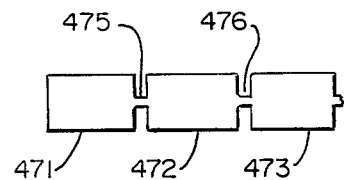
FIG. 32 is a diagrammatic plan view illustrating a portion of a paper web being fed from the cutoff mechanism of FIG. 26 when the cutter bar is modified to have increased length and a central notch.

Description of FIG. 32

In another version of cutoff mechanism, a commercially available cutter blade was notched as indicated at 455A, FIG. 26, to produce successive make slips such as 471, 472, 473, FIG. 32, which are joined by integral bridging material 475, 476, which links the strips together until manually severed. With the paper strip exactly centered, a blade 455 of lesser length than the width of the paper strip would leave bridging parts at each margin of the strip. It is considered, however, that it is preferable to make blade 455 of somewhat greater length that the paper width so as to sever the paper strip at both margins thereof in spite of variations in the position of the paper strip, and to provide the notch 455A centrally of the blade so a to leave only a single bridging part (such as 457 and 476) between successive printed parts (such as 471–473). In this way, the successive make slips are reliably held by the printer feed mechanism against falling in an uncontrolled fashion, the slips being readily manually severed from each other whenever convenient.

Symbolic Program Listings

Exemplary symbolic program listings are included as an Appendix hereto, and are identified as follows:

Appendix A - SPEECH TALKER (six pages)

This program may reside in the PROM storage 16-U6, FIG. 16C, and controls the speech generator circuitry of FIGS. 16A-16H and 17A-17D.

Appendix B - SPEECH EDITOR (six pages)

This control program may be stored at 18-U12, FIG. 18B, for controlling the speech editing circuitry.

Appendix C - PHRED. C (fourteen pages)

This is the phrase editor main menu program for the host processor (which may be an IBM PC system or a system compatible therewith). Refer to the description of FIGS. 18A-18I.

Appendix D - DOMFILE.C (four pages)

This program is used in collecting speech messages to be butted together (to save memory space), and to form a library defining each message's absolute starting address and length. See the description of FIGS. 16A-16H and 17A-17D.

```
;           SPEECH TALKER
;           6-26-86
;******************************************************
;     P1.1      DSR     OUTPUT
;     P1.2      DTR     INPUT
;     P1.3      WDOG
;     P3.2      DATA AVAILABLE OR REQUIRED
;     P1.0      A16     0=WRITE TO HIGH ADDRESS LATCH
;                       1=SPEECH
;******************************************************
VER     EQU     '1'
PCON    EQU     87H
DATA    EQU     P3.2
OV      EQU     PSW.2
WDOG    EQU     .P1.3
A16     EQU     P1.0
        ORG     30H
MSGARA  DS      20
;******************************************************
        ORG     0
        LJMP    BEGN
        LJMP    CONT
        NOP
        NOP
        NOP
        NOP
        NOP
        LJMP    CONT
        NOP
        NOP
        NOP
        NOP
        NOP
        LJMP    CONT
        NOP
        NOP
        NOP
        NOP
        NOP
        LJMP    CONT
```

```
        NOP
        NOP
        NOP
        NOP
        NOP
        LJMP    CONT
        NOP
        NOP
        NOP
        NOP
        NOP
        LJMP    CONT
        NOP
CONT    EQU     $
        NOP
        NOP
        RETI
        NOP
BEGN    EQU     $
        MOV     A,#0AAH
        MOVX    @DPTR,A
;
;
        CALL    INTCOM
;
WTCOM0  EQU     $
        MOV     R2,#0
        MOV     R3,#0
        MOV     R4,#2
WTCOM2  EQU     $
        DJNZ    R2,WTCOM4
        DJNZ    R3,WTCOM4
        DJNZ    R4,WTCOM4
        LCALL   WRTXON
        MOV     R2,#0
        MOV     R3,#0
        MOV     R4,#2
WTCOM4  EQU     $
        MOV     SP,#7
        CPL     WDOG
        CALL    TSTCOMM
        JNC     WTCOM2
        CALL    RDCHAR
        JC      WTCOM0
        CJNE    A,#'S',RDCOM1
        JMP     SPKCOMD
;
RDCOM1  EQU     $
        CJNE    A,#'V',WTCOM0
        JMP     VERCOMD
;************************************************
INTCOM  EQU     $
        MOV     SCON,#52H
        MOV     PCON,#80H
        MOV     TMOD,#20H
        MOV     TCON,#0C0H
        MOV     TH1,#243        ;4800 BAUD
        SETB    TI
        RET
;************************************************
TSTCOMM EQU     $
        JNB     RI,TSTCOM1
        CALL    RDCHAR
        CJNE    A,#':',TSTCOM1
        SETB    C
        RET
TSTCOM1 EQU     $
        CLR     C
        RET
WAIT    MOV     R7,#0
        MOV     R6,#0
```

```
WAIT1   DJNZ    R7,WAIT1
        DJNZ    R6,WAIT1
        RET
;************************************************
RDCHAR  EQU     $
        MOV     R5,#8
        MOV     R7,#0
        MOV     R6,#0
RDCHAR1 EQU     $
        CPL     WDOG
        JB      RI,RDCHAR2
        DJNZ    R6,RDCHAR1      ;1 MS
        DJNZ    R7,RDCHAR1      ;256 MS
        DJNZ    R5,RDCHAR1      ;2 SECS
        SETB    C
        RET
RDCHAR2 EQU     $
        CLR     RI
        MOV     A,SBUF
        ANL     A,#7FH
        CLR     C
        RET
;************************************************
WRTCHR  EQU     $
        CPL     WDOG
        JNB     TI,WRTCHR
        CLR     TI
        MOV     SBUF,A
        RET
;************************************************
SPKCOMD EQU     $
        MOV     R1,#MSGARA
        MOV     R2,#33
        MOV     R3,#0
SPKCMD1 EQU     $
        CALL    GETTWO
        JC      SPKCMD0         ; ERROR
        MOV     @R1,A
        INC     R1
        INC     R3
        DJNZ    R2,SPKCMD1
        JMP     SPKCMDX
SPKCMD0 EQU     $
        CJNE    A,#13,SPKCMDX
        MOV     A,R3
        JZ      SPKCMDY         ;NO CHARS RECEIVED
        MOV     R7,A            ;CHARACTER COUNT
        CALL    WRTXOFF         ;TELL NETWORK CNTLR WE'RE BUSY
        MOV     R1,#MSGARA      ;POINTER TO LIST OF PHRASES TO SAY
SPKCMD2 EQU     $
        MOV     A,@R1           ;GRAB PHRASE
        MOV     B,#5
        MUL     AB
        JB      OV,SPKCMD3
        MOV     B,#0
SPKCMD3 EQU     $
        MOV     DPL,A
        MOV     DPH,B
        INC     DPTR
        INC     DPTR            ;GET PAST VERSION NUMBER
        CLR     A16
        CLR     A
        MOVX    @R0,A
        SETB    A16
        MOVX    A,@DPTR
        MOV     R0,A            ;HI BYTE OF ADDR
        INC     DPTR
        MOVX    A,@DPTR
        MOV     R4,A            ;MID BYTE OF ADDR
        INC     DPTR
        MOVX    A,@DPTR
        MOV     R5,A            ;LO BYTE OF ADDR
```

```
        INC     DPTR
        MOVX    A,@DPTR
        MOV     R2,A            ;HI BYTE OF SIZE
        INC     DPTR
        MOVX    A,@DPTR
        MOV     R3,A            ;LO BYTE OF SIZE
        MOV     DPH,R4          ;ADDR
        MOV     DPL,R5          ;ADDR
        CALL    SPKCMDA
        INC     R1
        DJNZ    R7,SPKCMD2
SPKCMDY EQU     $
        CALL    WRTXON
SPKCMDX EQU     $
        JMP     WTCOM0
;************************
SPKCMDA EQU     $
        MOV     A,R2
        ORL     A,R3
        JZ      SPKCMDD
SPKCMDB EQU     $
        CLR     A16
        MOV     A,R0
        MOVX    @R0,A
        SETB    A16
        MOVX    A,@DPTR
        CALL    OUTSPCH
        INC     DPTR
        MOV     A,DPH
        ORL     A,DPL
        JNZ     SPKCMDC
        INC     R0
SPKCMDC EQU     $
        DEC     R3
        CJNE    R3,#0FFH,SPKCMDE
        DEC     R2
        JMP     SPKCMDB
SPKCMDE
        CJNE    R3,#0,SPKCMDB
        CJNE    R2,#0,SPKCMDB
SPKCMDD CALL    SILENCE
        RET
;****************************************************
VERCOMD EQU     $
        CALL    RDCHAR
        JC      VERCMDX
        CJNE    A,#13,VERCMDX
        MOV     A,#':'
        CALL    WRTCHR
        MOV     A,#'V'
        CALL    WRTCHR
        MOV     A,#VER
        CALL    WRTCHR
        CLR     A16
        CLR     A
        MOVX    @R0,A
        SETB    A16
        MOV     DPTR,#0
        MOVX    A,@DPTR
        CALL    WRTCHR
        INC     DPTR
        MOVX    A,@DPTR
        CALL    WRTCHR
        MOV     A,#13
        CALL    WRTCHR
VERCMDX EQU     $
        JMP     WTCOM0
;****************************************************
SILENCE EQU     $
        MOV     A,#0AAH
        CALL    OUTSPCH
        RET
;****************************************************
```

```
OUTSPCH EQU    S
     CPL    WDOG
     SETB   A16
     JNB    DATA,S
     JB     DATA,S
     MOVX   @DPTR,A
     RET
;**********************************************************
WRTXON EQU    S
     MOV    A,#17
     CALL   WRTCHR
     RET
;**********************************************************
WRTXOFF EQU   S
     MOV    A,#19
     CALL   WRTCHR
     RET
;**********************************************************
GETTWO EQU    S
     CALL   RDCHAR
     JC     GETTWOY
     CALL   HEXCONV
     JC     GETTWOX
     SWAP   A
     MOV    R0,A
     CALL   RDCHAR
     JC     GETTWOY
     CALL   HEXCONV
     JC     GETTWOY
     ORL    A,R0
     CLR    C
     RET
GETTWOY EQU   S
     CLR    A
GETTWOX EQU   S
     SETB   C
     RET
;**********************************************************
HEXCONV EQU   S
     MOV    R6,A
     CLR    C
     SUBB   A,#'0'
     JC     HEXCX
     MOV    A,R6
     SUBB   A,#3AH
     JC     HEXNUM
     MOV    A,R6
     SUBB   A,#'A'
     JC     HEXCX
     MOV    A,R6
     SUBB   A,#'G'
     JC     HEXALPH
HEXCX EQU    S
     SETB   C
     MOV    A,R6
     RET
HEXNUM EQU   S
     MOV    A,R6
     ANL    A,#0FH
     CLR    C
     RET
HEXALPH EQU   S
     MOV    A,R6
     CLR    C
     SUBB   A,#'A'-10
     CLR    C
     RET
;**********************************************************
     END
```

```
;           speech editor
;           6-26-86
;***********************************************************
;   E000H           SPEECH CHANNEL
;   P1.0        DSR     OUTPUT
;   P1.1        DTR     INPUT
;   P1.2        E/D     0=PLAY,1=RECORD
;   P3.2            DATA AVAILABLE OR REQUIRED
;***********************************************************
VER     EQU     '1'
PCON    EQU     87H
RECORD  EQU     P1.2
DATA    EQU     P3.2
        ORG     30H
MSGARA  DS      20
;***********************************************************
        ORG     0
        MOV     DPTR,#0E000H
        MOV     A,#0AAH
        MOVX    @DPTR,A
        CLR     P1.2
;
;
        CALL    INTCOM
;
WTCOMM  EQU     $
        CALL    TSTCOMM
        JNC     WTCOMM
        MOV     R0,#MSGARA
        CALL    RDCHAR
        JC      WTCOMM
        CJNE    A,#'S',RDCOM1
        JMP     SPKCOMD
;
RDCOM1  EQU     $
        CJNE    A,#'W',RDCOM2
        JMP     WRTCOMD
;
RDCOM2  EQU     $
        CJNE    A,#'L',RDCOM3
        JMP     LODCOMD
;
RDCOM3  EQU     $
        CJNE    A,#'R',RDCOM4
        JMP     RDCOMD
;
RDCOM4  EQU     $
        CJNE    A,#'V',WTCOMM
        JMP     VERCOMD
;***********************************************************
INTCOM  EQU     $
        MOV     SCON,#52H
        MOV     PCON,#80H
        MOV     TMOD,#20H
        MOV     TCON,#0C0H
        MOV     TH1,#243    ;4800 BAUD
        SETB    TI
        RET
;***********************************************************
TSTCOMM EQU     $
        JNB     RI,TSTCOM1
        CALL    RDCHAR
        CJNE    A,#':',TSTCOM1
        SETB    C
        RET
TSTCOM1 EQU     $
        CLR     C
        RET
WAIT    MOV     R7,#0
        MOV     R6,#0
WAIT1   DJNZ    R7,WAIT1
        DJNZ    R6,WAIT1
        RET
;***********************************************************
```

```
RDCHAR  EQU     $
        MOV     R5,#8
        MOV     R7,#0
        MOV     R6,#0
RDCHAR1 EQU     $
        JB      RI,RDCHAR2
        DJNZ    R6,RDCHAR1      ;1 MS
        DJNZ    R7,RDCHAR1      ;256 MS
        DJNZ    R5,RDCHAR1      ;2 SECS
        SETB    C
        RET
RDCHAR2 EQU     $
        CLR     RI
        MOV     A,SBUF
        ANL     A,#7FH
        CLR     C
        RET
;***********************************************
WRTCHR  EQU     $
        JNB     TI,$
        CLR     TI
        MOV     SBUF,A
        RET
;***********************************************
SPKCOMD EQU     $
        CALL    GETFOUR
        JC      SPKCMDX
        MOV     DPH,R2
        MOV     DPL,R3
        CALL    GETFOUR
        JC      SPKCMDX
        CALL    RDCHAR
        JC      SPKCMDX
        CJNE    A,#13,SPKCMDX
        MOV     A,R2
        ORL     A,R3
        JZ      SPKCMDY
        INC     R2
        CLR     RECORD
SPKCMD1 EQU     $
        MOVX    A,@DPTR
        CALL    OUTSPCH
        INC     DPTR
        DJNZ    R3,SPKCMD1
        DJNZ    R2,SPKCMD1
        CALL    SILENCE
SPKCMDY EQU     $
        CALL    WRTOK
SPKCMDX EQU     $
        JMP     WTCOMM
;***********************************************
WRTCOMD EQU     $
        CALL    GETFOUR
        JC      WRTCMDX
        MOV     DPH,R2
        MOV     DPL,R3
WRTCMD1 EQU     $
        CALL    GETTWO
        JC      WRTCMDY
        MOVX    @DPTR,A
        INC     DPTR
        JMP     WRTCMD1
WRTCMDY EQU     $
        CJNE    A,#13,WRTCMDX
        CALL    WRTOK
WRTCMDX JMP     WTCOMM
;***********************************************
LODCOMD EQU     $
        CALL    GETFOUR
        JC      LODCMDX
        MOV     DPH,R2
        MOV     DPL,R3
        CALL    GETFOUR
```

```
        JC      LODCMDX
        CALL    RDCHAR
        JC      LODCMDX
        CJNE    A,#13,LODCMDX
        MOV     A,R2
        ORL     A,R3
        JZ      LODCMDY
        INC     R2
        SETB    RECORD
LODCMD1 EQU     $
        CALL    INSPCH
        MOVX    @DPTR,A
        INC     DPTR
        DJNZ    R3,LODCMD1
        DJNZ    R2,LODCMD1
        CALL    SILENCE
LODCMDY EQU     $
        CALL    WRTOK
LODCMDX EQU     $
        JMP     WTCOMM
;****************************************************
RDCOMD  EQU     $
        CALL    GETFOUR
        JC      RDCMDX
        MOV     DPH,R2
        MOV     DPL,R3
        CALL    GETFOUR
        JC      RDCMDX
        CALL    RDCHAR
        JC      RDCMDX
        CJNE    A,#13,RDCMDX
        MOV     A,#':'
        CALL    WRTCHR
        MOV     A,R2
        ORL     A,R3
        JZ      RDCMDY
        INC     R2
RDCMD1  EQU     $
        MOVX    A,@DPTR
        CALL    WRTTWO
        INC     DPTR
        DJNZ    R3,RDCMD1
        DJNZ    R2,RDCMD1
RDCMDY  EQU     $
        MOV     A,#13
        CALL    WRTCHR
RDCMDX  EQU     $
        JMP     WTCOMM
;****************************************************
VERCOMD EQU     $
        CALL    RDCHAR
        JC      VERCMDX
        CJNE    A,#13,VERCMDX
        MOV     A,#':'
        CALL    WRTCHR
        MOV     A,#'V'
        CALL    WRTCHR
        MOV     A,#VER
        CALL    WRTCHR
        MOV     A,#13
        CALL    WRTCHR
VERCMDX EQU     $
        JMP     WTCOMM
;****************************************************
SILENCE EQU     $
        CLR     RECORD
        MOV     A,#0AAH
        CALL    OUTSPCH
        RET
;****************************************************
OUTSPCH EQU     $
        JNB     DATA,$
        PUSH    DPL
```

```
        PUSH    DPH
        MOV     DPTR,#0E000H
        JB      DATA,S
        MOVX    @DPTR,A
        POP     DPH
        POP     DPL
        RET
;****************************************************
INSPCH  EQU     S
        JNB     DATA,S
        PUSH    DPL
        PUSH    DPH
        MOV     DPTR,#0E000H
        JB      DATA,S
        MOVX    A,@DPTR
        POP     DPH
        POP     DPL
        RET
;****************************************************
WRTOK   EQU     S
        MOV     A,#':'
        CALL    WRTCHR
        MOV     A,#'O'
        CALL    WRTCHR
        MOV     A,#'K'
        CALL    WRTCHR
        MOV     A,#13
        CALL    WRTCHR
        RET
;****************************************************
GETTWO  EQU     S
        CALL    RDCHAR
        JC      GETTWOY
        CALL    HEXCONV
        JC      GETTWOX
        SWAP    A
        MOV     R0,A
        CALL    RDCHAR
        JC      GETTWOY
        CALL    HEXCONV
        JC      GETTWOY
        ORL     A,R0
        CLR     C
        RET
GETTWOY EQU     S
        CLR     A
GETTWOX EQU     S
        SETB    C
        RET
;****************************************************
GETFOUR EQU     S
        CALL    GETTWO
        JC      GETFRX
        MOV     R2,A
        CALL    GETTWO
        MOV     R3,A
GETFRX  RET
;****************************************************
HEXCONV EQU     S
        MOV     R7,A
        CLR     C
        SUBB    A,#'0'
        JC      HEXCX
        MOV     A,R7
        SUBB    A,#3AH
        JC      HEXNUM
        MOV     A,R7
        SUBB    A,#'A'
        JC      HEXCX
        MOV     A,R7
        SUBB    A,#'G'
        JC      HEXALPH
```

```
HEXCX   EQU   $
        SETB  C
        MOV   A,R7
        RET
HEXNUM  EQU   $
        MOV   A,R7
        ANL   A,#0FH
        CLR   C
        RET
HEXALPH EQU   $
        MOV   A,R7
        CLR   C
        SUBB  A,#'A'-10
        CLR   C
        RET
;************************************************
WRTTWO  EQU   $
        MOV   R7,A
        SWAP  A
        ANL   A,#0FH
        CALL  HEXASC
        CALL  WRTCHR
        MOV   A,R7
        ANL   A,#0FH
        CALL  HEXASC
        CALL  WRTCHR
        RET
;************************************************
HEXASC  EQU   $
        INC   A
        MOVC  A,@A+PC
        RET
        DB    "0123456789ABCDEF"
        END
```

```
/************************************************
* Program: PHRED.C                              *
* Purpose: Phrase Editor main menu              *
* Version: 1,  07/02/86, Kristi Feltz           *
*************************************************/ include <nstdio.h>
include <screen.h>
#include <time.h>

/*++++++++++++++++++++++++++++++++++++++++++++++++
+                 Constants                     +
++++++++++++++++++++++++++++++++++++++++++++++++*/
#define BAUD_300    2
#define BAUD_600    3
#define BAUD_1200   4
#define BAUD_2400   5
#define BAUD_4800   6
#define BAUD_9600   7

/*++++++++++++++++++++++++++++++++++++++++++++++++
+              Global Variables                 +
++++++++++++++++++++++++++++++++++++++++++++++++*/
int      version;
unsigned int   paddr,plen,
               raddr,rlen,
               wraddr,wrlen,
               rdaddr,rdlen;
char     unichar;
```

```
/******************************************************************
 *                    Select menu option                           *
 ******************************************************************/
mainmenu()
{
        int        break_sw;
        char       c;
        int        save_sec;
        struct tm  *tmptr;
        char       init;
        int        hour;

opncom();
        version = rdversion();
        paddr = raddr = rdaddr = wraddr = 0;
        plen = rlen = rdlen = 32767;
        while (version == 0)
        {
                comerr();
                version = rdversion();
        } maindisplay();
        break_sw = FALSE;
        save_sec = 0;

for (;;) {
        tmptr = localtime(NULL);
        if (tmptr->tm_sec != save_sec)
        {
                hour = tmptr->tm_hour;
                init = 'a';
                if (hour > 11)
                {
                        hour -= 12;
                        init = 'p';
                }
                if (hour == 0) hour = 12;
                printf ("%c[%d;%d;%dm",ESC,NORMAL,BBLUE,FCYAN);
                printf ("\033[2;55f");
                printf ("%2d/%02d/%02d    %2d:%02d:%02d %c.m.",tmptr->tm_mon+1,tmptr->tm_md
                        hour,tmptr->tm_min,tmptr->tm_sec,init);
                save_sec = tmptr->tm_sec;
                printf ("\033[17;45f");
        } if (key_scan() != EOF) {
                c = key_getc() & 0xff;
                c = toupper(c);
                switch (c) { case 'A': /* record      */
                                        record();
                                        maindisplay();
                                        break;

case 'B': /* play back   */
                                        play();
                                        maindisplay();
                                        break;

case 'C': /* read into file */
                                        rdphred();
                                        maindisplay();
                                        break;

case 'D': /*write from file*/
                                        wrtphred();
                                        maindisplay();
                                        break;

case 'E': /* list files  */
                                        direct();
                                        maindisplay();
                                        break;
```

```
                case 'F': /* check link  . */
                    version = rdversion();
                    while (version == 0)
                    {
                        comerr();
                        version = rdversion();
                    }
                    goodisplay();
                    maindisplay();
                    break;
                case 'Q': /* quit         */
                    break_sw = TRUE;
                    break;

default :
                    printf ("%c",BEEP);
                    break;
                }
            }
        if (break_sw) break;
        }
}

/*---------------------------Display Menu---------------------------*/
maindisplay()
{
    printf ("%c[=3h",ESC);
    printf ("%c[%d;%d;%dm",ESC,NORMAL,BBLUE,FCYAN);
    printf ("%c[2J",ESC);

printf ("\033[2;5f");
    printf ("VERSION %2d",version);
    printf ("%c[%d;%d;%d;%dm",ESC,NORMAL,BBLUE,BOLD,FCYAN);
    printf ("\033[3;30f");
    printf ("PHRED (PHRASE EDITOR)");
    printf ("\033[4;24f");
    printf ("Copyright 1986 Norand Corporation");
    printf ("\033[7;35f");
    printf ("MAIN MENU");
    printf ("%c[%d;%d;%d;%dm",ESC,NORMAL,BBLUE,BOLD,FWHITE);
    printf ("\033[9;26f");
    printf ("A. RECORD A PHRASE");
    printf ("\033[10;26f");
    printf ("B. PLAY BACK A PHRASE");
    printf ("\033[11;26f");
    printf ("C. READ DIGITIZED PHRASE FROM PHRED ONTO DISK");
    printf ("\033[12;26f");
    printf ("D. WRITE DIGITIZED PHRASES FROM DISK TO PHRED");
    printf ("\033[13;26f");
    printf ("E. LIST PHRASES CURRENTLY ON DISK");
    printf ("\033[14;26f");
    printf ("F. CHECK LINK WITH PHRED");
    printf ("\033[15;26f");
    printf ("Q. QUIT");
    printf ("%c[%d;%d;%d;%dm",ESC,NORMAL,BBLUE,BOLD,FCYAN);
    printf ("\033[17;35f");
    printf ("SELECTION?");
}

/*---------------------------Display Error---------------------------*/
comerr()
{
    char    c;

printf ("%c[=3h",ESC);
```

```c
        printf ("%c[%d;%d;%d;%dm",ESC,NORMAL,BBLUE,BOLD,FCYAN);
        printf ("%c[2J",ESC);
        printf ("\033[4;30f");
        printf ("PHRED (PHRASE EDITOR)");
        printf ("\033[3;24f");
        printf ("Copyright 1986 Norand Corporation");
        printf ("%c",BEEP);
        printf ("%c[%d;%d;%d;%dm",ESC,NORMAL,BBLUE,BOLD,FRED);
        printf ("\033[10;13f");
        printf ("OOPS! PHRED DIDN'T RESPOND TO THE LAST COMMAND ISSUED");
        printf ("\033[12;10f");
        printf ("MAKE SURE PHRED IS PLUGGED IN AND PROPERLY CONNECTED TO PC");
        printf ("\033[13;18f");
        printf ("THEN PRESS ANY KEY TO RETURN TO THE MAIN MENU");
        while (key_scan() == EOF);
        c = key_getc() & 0xff;
        if (c == '\\')
                exit(1);
}

/*----------------------------Display Ok----------------------------*/
goodisplay()
{
        char    c;

printf ("%c[=3h",ESC);
        printf ("%c[%d;%d;%d;%dm",ESC,NORMAL,BBLUE,BOLD,FCYAN);
        printf ("%c[2J",ESC);
        printf ("\033[4;30f");
        printf ("PHRED (PHRASE EDITOR)");
        printf ("\033[5;24f");
        printf ("Copyright 1986 Norand Corporation");
        printf ("%c[%d;%d;%d;%dm",ESC,NORMAL,BBLUE,BOLD,FWHITE);
        printf ("\033[10;15f");
        printf ("THE LINK BETWEEN PHRED AND THE PC IS WORKING FINE.");
        printf ("\033[12;20f");
        printf ("PRESS ANY KEY TO RETURN TO THE MAIN MENU");
        while (key_scan() == EOF);
        c = key_getc() & 0xff;
        if (c == '\\')
                exit(1);
}

/*************************************************************
*                       M*A*I*N                              *
*************************************************************/
main()
{
        mainmenu();
}

/*************************************************************
*                       RECORD                               *
*********************************    ***********************/
record()
{
        int             max;
        struct tm       *tmptr;
        int             elapsed;
        int             save_sec;
        char            c;

printf ("%c[=3h",ESC);
        printf ("%c[%d;%d;%d;%dm",ESC,NORMAL,BBLUE,BOLD,FCYAN);
        printf ("%c[2J",ESC);
```

```
printf ("\033[2;30f");
printf ("PHRED (PHRASE EDITOR)");
printf ("\033[3;24f");
printf ("Copyright 1986 Norand Corporation");
printf ("\033[5;33f");
printf ("RECORD A PHRASE");
printf ("%c[%d;%d;%d;%dm",ESC,NORMAL,BBLUE,BOLD,FGREEN);
printf ("\033[8;12f");
printf ("ENTER BEGINNING RAM ADDRESS (0-32767, DEFAULT %5d): ",raddr);
raddr = numedit(8,66,32767,raddr);
if (unichar == '\\') return;
max = 32767 - raddr;
if (rlen > max) rlen = max;
printf ("\033[10;12f");
printf ("ENTER LENGTH IN BYTES (0-%5d, DEFAULT %5d): ",max,rlen);
rlen = numedit(10,60,max,rlen);
if (unichar == '\\') return;
printf ("%c[%d;%d;%d;%dm",ESC,NORMAL,BBLUE,BOLD,FWHITE);
printf ("\033[12;7f");
printf ("MAKE SURE MICROPHONE IS ON AND PRESS ANY KEY TO BEGIN RECORDING");
while (key_scan() == EOF);
c = key_getc() & 0xff;
printf ("\033[12;7f");
printf ("                                         ");
load(raddr,rlen);
tmptr = localtime(NULL);
save_sec = tmptr->tm_sec;
elapsed = 0;
while ((ok() == FALSE) && (elapsed < 10))
{
        tmptr = localtime(NULL);
        if (tmptr->tm_sec != save_sec)
        {
                elapsed += 1;
                printf ("\033[12;31f");
                printf ("%c[%d;%d;%d;%dm",ESC,NORMAL,BBLUE,BOLD,FWHITE);
                printf ("%2d SECONDS ELAPSED",elapsed);
                save_sec = tmptr->tm_sec;
        }
}
if (elapsed == 10)
{
        version = rdversion();
        while (version == 0)
        {
                comerr();
                version = rdversion();
        }
        return;
} printf ("%c[%d;%d;%dm",ESC,NORMAL,BBLUE,FCYAN);
        printf ("\033[14;20f");
        printf ("PRESS ANY KEY TO RETURN TO THE MAIN MENU");
        while (key_scan() == EOF);
        c = key_getc() & 0xff;
}

/***********************************************************************
*                       PLAY                              *
***********************************************************************/
play()
{
        int             max;
        struct tm       *tmptr;
        int             elapsed;
        int             save_sec;
        unsigned int    c;
```

```
c = ' ';
while ((c == 59) || (c == ' '))
{
    if (c == ' ')
    {
        printf ("%c[=3h",ESC);
        printf ("%c[%d;%d;%d;%dm",ESC,NORMAL,BBLUE,BOLD,FCYAN);
        printf ("%c[2J",ESC);
        printf ("\033[2;30f");
        printf ("PHRED (PHRASE EDITOR)");
        printf ("\033[3;24f");
        printf ("Copyright 1986 Norand Corporation");
        printf ("\033[5;32f");
        printf ("PLAY BACK A PHRASE");
        printf ("%c[%d;%d;%d;%dm",ESC,NORMAL,BBLUE,BOLD,FGREEN);
        printf ("\033[8;12f");
        printf ("ENTER BEGINNING RAM ADDRESS (0-32767, DEFAULT %5d): ",paddr);
        paddr = numedit(8,66,32767,paddr);
        if (unichar == '\\') return;
        max = 32767 - paddr;
        if (plen > max) plen = max;
        printf ("\033[10;12f");
        printf ("ENTER LENGTH IN BYTES (0-%5d, DEFAULT %5d): ",max,plen);
        plen = numedit(10,60,max,plen);
        if (unichar == '\\') return;
        printf ("%c[%d;%d;%d;%dm",ESC,NORMAL,BBLUE,BOLD,FWHITE);
        printf ("\033[12;13f");
        printf ("PUT ON HEADPHONES AND PRESS ANY KEY TO BEGIN PLAY BACK");
        while (key_scan() == EOF);
        c = key_getc() & 0xff;
        printf ("\033[12;13f");
        printf ("                                                      ");
    }
    speak(paddr,plen);
    elapsed = 0;
    tmptr = localtime(NULL);
    save_sec = tmptr->tm_sec;
    while ((ok() == 0) && (elapsed < 10))
    {
        tmptr = localtime(NULL);
        if (tmptr->tm_sec != save_sec)
        {
            elapsed += 1;
            printf ("%c[%d;%d;%d;%dm",ESC,NORMAL,BBLUE,BOLD,FWHITE);
            printf ("\033[12;31f");
            printf ("%2d SECONDS ELAPSED",elapsed);
            save_sec = tmptr->tm_sec;
        }
    }
    if (elapsed == 10)
    {
        version = rdversion();
        while (version == 0)
        {
            comerr();
            version = rdversion();
        }
        return;
    }
    printf ("%c[%d;%d;%dm",ESC,NORMAL,BBLUE,FCYAN);
    printf ("\033[25;1f");
    printf ("PRESS <F1> TO REPLAY");
    printf ("\033[25;25f");
    printf ("PRESS <Esc> TO QUIT");
    printf ("\033[25;50f");
    printf ("PRESS <SPC> TO PLAY ANOTHER");
    c = 0;
    while ((c != 59) && (c != 27) && (c != ' '))
    {
        while (key_scan() == EOF);
        c = key_getc();
```

```c
            if ((c & 0xff) != 0)
                c &= 0xff;
            else c = c >> 8;
        }
    }
}

/*************************************************************
 *                          READ                              *
 *************************************************************/
rdphred()
{
    int         max;
    struct tm   *tmptr;
    int         elapsed;
    int         save_sec;
    char        c;
    char        filenm[15];
    int         status;

printf ("%c[=3h",ESC);
    printf ("%c[%d;%d;%d;%dm",ESC,NORMAL,BBLUE,BOLD,FCYAN);
    printf ("%c[2J",ESC);
    printf ("\033[2;30f");
    printf ("PHRED (PHRASE EDITOR)");
    printf ("\033[3;24f");
    printf ("Copyright 1986 Norand Corporation");
    printf ("\033[5;24f");
    printf ("READ A PHRASE FROM PHRED ONTO DISK");
    printf ("%c[%d;%d;%d;%dm",ESC,NORMAL,BBLUE,BOLD,FGREEN);
    printf ("\033[8;12f");
    printf ("ENTER BEGINNING RAM ADDRESS (0-32767, DEFAULT %5d): ",paddr);
    paddr = numedit(8,66,32767,paddr);
    if (unichar == '\\') return;
    max = 32767 - paddr;
    if (plen > max) plen = max;
    printf ("\033[10;12f");
    printf ("ENTER LENGTH IN BYTES (0-%5d, DEFAULT %5d): ",max,plen);
    plen = numedit(10,60,max,plen);
    if (unichar == '\\') return;
    unichar = CARRIAGE_RETURN;
    while (unichar == CARRIAGE_RETURN)
    {
        printf ("\033[12;57f");
        printf ("          ");
        printf ("\033[12;12f");
        printf ("ENTER NAME OF PHRASE (MAXIMUM 8 CHARACTERS): ");
        txtedit(12,57,filenm);
    }
    if (unichar == '\\') return;
    printf ("%c[%d;%d;%d;%dm",ESC,NORMAL,BBLUE,BOLD,FWHITE);
    printf ("\033[12;13f");
    ramread(paddr,plen);
    status = getdata(filenm);
    if (status == 1)
    {
        printf ("%c",BEEP);
        printf ("%c[%d;%d;%d;%dm",ESC,NORMAL,BBLUE,BOLD,FRED);
        printf ("\033[14;15f");
        printf ("OOPS! THAT PHRASE NAME DIDN'T WORK.");
    }
    else if (status == 2)
    {
        version = rdversion();
        while (version == 0)
        {
            comerr();
            version = rdversion();
        }
        return;
```

```c
        }
        printf ("%c[%d;%dm",ESC,NORMAL,BBLUE,FCYAN);
        printf ("\033[16;20f");
        printf ("PRESS ANY KEY TO RETURN TO THE MAIN MENU");
        while (key_scan() == EOF);
        c = key_getc() & 0xff;
}

/**************************************************************
*                       WRITE                                 *
**************************************************************/
wrtphred()
{
        int         max;
        struct tm   *tmptr;
        int         elapsed;
        int         save_sec;
        char        c;
        char        filenm[10][15];
        int         status;
        int         indx;
        int         indx1;
        int         count;

printf ("%c[=3h",ESC);
        printf ("%c[%d;%d;%dm",ESC,NORMAL,BBLUE,BOLD,FCYAN);
        printf ("%c[2J",ESC);
        printf ("\033[2;30f");
        printf ("PHRED (PHRASE EDITOR)");
        printf ("\033[3;24f");
        printf ("Copyright 1986 Norand Corporation");
        printf ("\033[5;24f");
        printf ("WRITE PHRASES FROM DISK TO PHRED");
        printf ("%c[%d;%d;%dm",ESC,NORMAL,BBLUE,BOLD,FGREEN);
        printf ("\033[8;12f");
        printf ("ENTER BEGINNING RAM ADDRESS (0-32767, DEFAULT %5d): ",wraddr);
        wraddr = numedit(8,66,32767,wraddr);
        if (unichar == '\\') return;
        indx = 0;
        while ((indx<10) && (unichar != CARRIAGE_RETURN) && (unichar != '\\'))
        {
                printf ("\033[%d;12f",indx+10);
                printf ("ENTER NAME OF PHRASE %d (MAXIMUM 8 CHARACTERS): ",indx+1);
                txtedit(indx+10,59,&filenm[indx][0]);
                if (unichar == ' ') indx++;
        }
        if (unichar == '\\') return;
        printf ("%c[%d;%d;%dm",ESC,NORMAL,BBLUE,BOLD,FWHITE);
        count = 0;
        for (indx1=0; indx1<indx; indx1++)
        {
                status = ramwrt(wraddr,&filenm[indx1][0],count);
                if (status == FALSE)
                {
                        printf ("%c",BEEP);
                        printf ("%c[%d;%d;%dm",ESC,NORMAL,BBLUE,BOLD,FRED);
                        printf ("\033[12;15f");
                        printf ("OOPS! PHRASE %d ISN'T AVAILABLE ON DISK.",indx1);
                        indx1 = indx;
                }
                else
                {
                        wraddr += status;
                        count += status;
                        if (wraddr >= 32767)
                        {
                                wraddr = 0;
                                indx1 = indx;
                        }
```

```c
        }
    }
    printf ("%c[%d;%d;%dm",ESC,NORMAL,BBLUE,FCYAN);
    printf ("\033[24;20f");
    printf ("PRESS ANY KEY TO RETURN TO THE MAIN MENU");
    while (key_scan() == EOF);
    c = key_getc() & 0xff;
}

/****************************************************************
 *                      DIRECTORY                                *
 ****************************************************************/
direct()
{
    extern char     *filedir();
    char            *first;
    char            *next;
    char            *fl;
    char            filespec[10];
    int             mode;
    char            c;
    int             row;
    int             col;
    int             cnt;
    int             indx;

printf ("%c[=3h",ESC);
    printf ("%c[%d;%d;%d;%dm",ESC,NORMAL,BBLUE,BOLD,FCYAN);
    printf ("%c[2J",ESC);
    printf ("\033[2;30f");
    printf ("PHRED (PHRASE EDITOR)");
    printf ("\033[3;24f");
    printf ("Copyright 1986 Norand Corporation");
    printf ("\033[5;28f");
    printf ("PHRASES AVAILABLE ON DISK ");
    printf ("%c[%d;%d;%d;%dm",ESC,NORMAL,BBLUE,BOLD,FWHITE);
    col = 0;
    row = 7;
    printf ("\033[%d;1f",row);

mode = 0;
    strcpy(filespec,"*.PHS");
    first = filedir(filespec,mode);
    next = first;
    while (*next != NULL)
    {
        fl = next;
        cnt = 0;
        while (*fl != '.')
        {
            printf ("%c",*fl);
            fl++;
            cnt++;
        }
        for (indx=cnt; indx<8; indx++)
        {
            printf (" ");
        }
        next += strlen(next) + 1;
        col += 1;
        if (col == 9)
        {
            row++;
            if (row > 24) row = 7;
            printf ("\033[%d;1f",row);
            col = 0;
        }
        else
            printf (" ");
    }
}
```

```
        printf ("%c[%d;%dm",ESC,NORMAL,BBLUE,FCYAN);
        printf ("\033[25;20f");
        printf ("PRESS ANY KEY TO RETURN TO THE MAIN MENU");
        while (key_scan() == EOF);
        c = key_getc() & 0xff;
        free(first);
}

/**************************************************************
*              EDIT NUMERIC FIELD                             *
**************************************************************/
numedit(row,col1,max,def)
        int     row;
        int     col1;
        unsigned int    max;
        unsigned int    def;
{
        char            c;
        char            input[9];
        int             inptr;
        char            done;
        unsigned int    num;
        int             indx;
        int             col;

col = col1;
        inptr = 0;
        done = FALSE;

while (!done)
        {
                if (key_scan() != EOF) {
                        c = key_getc() & 0xff;
                        if (isdigit(c))
                        {
                                if (inptr > 4)
                                {
                                        inptr = 4;
                                        col--;
                                        printf ("\033[%d;%df",row,col);
                                }
                                printf("\033[%d;%df",row,col);
                                printf("%c",c);
                                col++;
                                input[inptr++] = c;
                        }
                        else switch (c) {
                                case BACKSPACE:
                                        if (inptr == 0)
                                                printf("%c",BEEP);
                                        else
                                        {
                                                inptr-= 1;
                                                col -=1;
                                                printf("\033[%d;%df",row,col);
                                                printf(" ");
                                                printf("\033[%d;%df",row,col);
                                        }
                                        break;

case CARRIAGE_RETURN:
                                        if (inptr == 0)
                                        {
                                                printf("\033[%d;%df",row,col);
                                                printf("%d",def);
                                                num = def;
                                        }
                                        else
                                        {
```

```
                                num = 0;
                                for (indx=0; indx<inptr; indx++)
                                {
                                        num *= 10;
                                        num += input[indx]-'0';
                                }
                        }
                        if (num > max)
                        {
                                printf("\033[%d;%df",row,col1);
                                printf("              ");
                                printf("\033[%d;%df",row,col1);
                                printf("%c",BEEP);
                                col = col1;
                                inptr = 0;
                        }
                        else
                                done = TRUE;
                        break;

case '\\':
                        unichar = '\\';
                        return(def);

default:
                        printf("%c",BEEP);
                        break;
                }
        }
        unichar = ' ';
        return(num);
}

/*****************************************************************
 *                     EDIT TEXT FIELD                            *
 *****************************************************************/
txtedit(row,col1,input)
        int     row;
        int     col1;
        char    input[];
{
        char            c;
        int             inptr;
        char            done;
        int             indx;
        int             col;

col = col1;
        inptr = 0;
        done = FALSE;

while (!done)
        {
                if (key_scan() != EOF) {
                        c = key_getc() & 0xff;
                        c = toupper(c);
                        if ((isalnum(c)) || ( strchr("<>()[]@#$%^&!-_'\|",c) != NULL))
                        {
                                if (inptr > 7)
                                {
                                        inptr = 7;
                                        col--;
                                        printf ("\033[%d;%df",row,col);
                                }
                                printf("\033[%d;%df",row,col);
                                printf("%c",c);
                                col++;
                                input[inptr++] = c;
```

```
                }
                else switch (c) {
                    case BACKSPACE:
                        if (inptr == 0)
                        {
                            printf("%c",BEEP);
                        }
                        else
                        {
                            inptr-= 1;
                            col -=1;
                            printf("\033[%d;%df",row,col);
                            printf(" ");
                            printf("\033[%d;%df",row,col);
                        }
                        break;

case CARRIAGE_RETURN:
                        if (inptr==0)
                        {
                            unichar = CARRIAGE_RETURN;
                            return;
                        }
                        else
                            done = TRUE;
                        break;

case '\\':
                        unichar = '\\';
                        return;

default:
                        printf("%c",BEEP);
                        break;
                }
            }
    }
    strcpy(&input[inptr],".PHS");
    input[inptr+4] = '\0';
    unichar = ' ';
}

/*******************************************************************
 * Program: DOMFILE.C                                               *
 * Purpose: Create Data File for       voice generator              *
 * Author : 07/25/86, Kristi Feltz                                  *
 *******************************************************************/ include <nstdio.h>
include <time.h>
#include <screen.h>

/*++++++++++++++++++++++++++++++++++++++++++++++++++++++++++++++++
 +                      Constants                        +
 ++++++++++++++++++++++++++++++++++++++++++++++++++++++++++++++++*/

/*++++++++++++++++++++++++++++++++++++++++++++++++++++++++++++++++
 +                      Data Structures                  +
 ++++++++++++++++++++++++++++++++++++++++++++++++++++++++++++++++*/
struct fbuf {
    unsigned char   st_mode;
    int             s_ino;
    int             st_dev;
    int             st_rdev;
    int             st_nlink;
    unsigned char   st_uid;
    unsigned char   st_gid;
    long            st_size;
    long            st_atime;
    long            st_mtime;
    long            st_ctime;
};
```

```c
/*++++++++++++++++++++++++++++++++++++++++++++++++++++++++++++++++++++
+                    Global variables                   +
++++++++++++++++++++++++++++++++++++++++++++++++++++++++++++++++++++*/
unsigned char   name[50][15];
long            begn[50];
long            size[50];
int             totalnames;

/***********************************************************************
*                      M * A * I * N                                   *
***********************************************************************/
main()
{
    printf ("%c[=3h",ESC);
    printf ("%c[%d;%d;%d;%dm",ESC,NORMAL,BBLUE,BOLD,FYELLOW);
    printf ("%c[2J",ESC);

printf ("\033[4;23f");
    printf ("CREATE SPEECH GENERATOR DATA FILE");
    printf ("\033[6;27f");
    printf ("1. READ PHRASE FILE NAMES");
    getnames();
    printf ("\033[7;27f");
    printf ("2. GET PHRASE FILE LENGTHS");
    chkfiles();
    printf ("\033[8;27f");
    printf ("3. WRITE PHRASES TO DATA FILE");
    makefile();
    printf ("\033[10;29f");
    printf ("SUCCESSFULLY COMPLETED");
}

/***********************************************************************
*             Read names of Phrase files                               *
***********************************************************************/
getnames()
{
    unsigned char   buf[5];
    int             indx;
    int             indx1;
    FILE            *namfile;
    int             result;
    unsigned char   spc;
    int             dx;

namfile = fopen("DOMWORDS.DAT","r");
    if (!namfile)
        abort ("ERROR IN OPENING DOMWORDS.DAT\n");

indx = 0;
    result = fread(buf,3,1,namfile);
    while (result)
    {
        buf[2] = '\0';
        for (indx1=0; indx1<10; indx1++)
            name[indx][indx1] = '\0';
        result = fread(&name[indx][0],9,1,namfile);
        dx = strlen(&name[indx][0]);
        strcpy(&name[indx][dx-1],".PHS");
        if (!result)
            abort ("ERROR IN READING FILE NAME %d\n",indx);
        indx++;
        result = fread(buf,3,1,namfile);
    }
    totalnames = indx;
    fclose(namfile);
}
```

```
/*******************************************************************
 *              Get length and status of files                     *
 *******************************************************************/
chkfiles()
{
    int         indx;
    struct fbuf buf;
    long        start;
    int         result;

start = (totalnames*5) + 3;
    for (indx=0; indx<totalnames; indx++)
    {
        begn[indx] = start;
        result = stat(&name[indx][0],&buf);
        if (result != 0)
            size[indx] = 0;
        else
            size[indx] = buf.st_size / 2;
        start += size[indx];
    }
}

/*******************************************************************
 *                    Create the data file                         *
 *******************************************************************/
makefile()
{
    unsigned char   buffer[512];
    unsigned char   chr;
    int             num_wr;
    int             num_rd;
    int             indx;
    int             indx1;
    int             indx2;
    FILE            *dtafile;
    FILE            *tmpfile;
    long            current;

dtafile = fopen("DOMSPEAK.DAT","wb");
    if (!dtafile)
        abort ("ERROR IN CREATING SPEECH DATA FILE\n");
    indx = 0;
    buffer[indx++] = 0;
    buffer[indx++] = 0;                    /* ver # */
    buffer[indx++] = totalnames - 1;       /* max phrase # */
    current = 3;
    for (indx1=0; indx1<totalnames; indx1++)
    {
        buffer[indx++] = begn[indx1]/65536L;
        buffer[indx++] = ((begn[indx1] - (long)(buffer[indx-1] * 65536L)) / 256L);
        buffer[indx++] = begn[indx1] % 256L;
        buffer[indx++] = size[indx1] / 256;
        buffer[indx++] = size[indx1] % 256;
        current += 5;
    }
    num_wr = fwrite(buffer,indx,1,dtafile);
    if (num_wr != 1)
        abort ("ERROR IN INITIALIZING INDEX ON SPEECH DATA FILE\n");
    for (indx1=0; indx1<totalnames; indx1++)
    {
        printf("\n%-12.12s %6lx %6lx %4lx",name[indx1],current,begn[indx1],size[indx1]);
        if (size[indx1] != 0)
        {
            tmpfile = fopen(name[indx1],"r");
            fseek(dtafile,current,0);
            for (indx2=0; indx2<size[indx1]; indx2++)
```

```
        {
            num_rd = fscanf(tmpfile,"%02x",chr);
            num_wr = fwrite(chr,1,1,dtafile);
            current++;
        }
        fclose(tmpfile);
        num_wr = fwrite('\0',1,1,dtafile);
    }
}
fclose(dtafile);
printf("\n%-12.12s  %6lx  ","  ",current);
}
```

The following shows an exemplary program sequence for entering an order, checking for orders which have not been checked out for an excessive time, and if necessary delivering a speech message e.g., at the make station 14-12, FIG. 14B.

(1) Answer telephone to receive incoming telephone order.

(2) Enter phone number of customer by means of the microterminal (FIGS. 10, 11 and 12 or FIG. 31).

(3) Master processor (e.g. 290, FIG. 14A) sends the customer record to the microterminal for display, or a new record is generated by means of the microterminal.

(4) Record order for pizza (e.g. with information such as represented in FIG. 8).

(5) Enter "end order" by depressing this key of the microterminal, FIG. 31.

(5A) Microterminal time stamps the order based on the reading of its real time clock.

(5B) Microterminal causes a bar coded box label (eg. FIG. 8) to be printed as indicated at 274, FIG. 14B.

(5C) Microterminal sends the order (with its time stamp) to the master processor 290, FIG. 14A.

(5D) Master processor stores order number and time on a pending list file, and stores order information in an order file.

(6) Master processor sends the order to make station (e.g. 14-12, FIG. 14B) and causes the printer (e.g. 14-64) to print a make ticket (as show in FIG. 9).

(7) Master processor interrupts other processing steps each time its real time clock registers a change in its minute reading.

(7A) During each such interrupt, the master processor computes "late time" by subtracting a given number of minutes from the current real time clock reading. For example, if it is desired to check out orders at the driver checkout station (e.g. 14-11, FIG. 14A) within nineteen minutes of receipt and the current time is 1740 hours (5:40 p.m.), the value 19 is subtracted to obtain a late time of 1711 hours.

(7B) The pending order list is then scanned for orders with time stamps equal to or less than the computed "late time", e.g. 1711 hours.

(7C) If a late order is found, the corresponding message for the speech generator module(s) (e.g. 14-60, FIG. 14B, and 14-56, FIG. 14A) is added to a que of such messages. (For example, the order number and time are supplied so that the message "Warning! Order Number 2072 has been in the store twenty minutes." may be generated as specifically explained hereafter.)

(7C1) At the "slave" pizza make-line processor e.g. within voice module 14-60, FIG. 14B, the phrase "Warning! Order number" is first placed in the que for overlong order messages. A recursive routine is then followed to que each digit of the order number.

(7C2) Next the phrase "has been in the store" is placed in the que.

(7C3) Then a time interval T is calculated based on the present real time reading and the selected elapsed time goal. If T is greater than 999, then T equals 999.

Example I—Computing and Announcing Elapsed Time (7C4) As a specific example, for an order received at 1700 hours (5:00 p.m.), at a current time of 1900 hours, T would equal 120 minutes. (Seventeen hours could be converted to minutes, e.g. 1020 minutes, and 1900 hours could be converted to 1140 minutes.)

(7C4A) Calculate the hundreds digit of T (e.g. one) and subtract the product of the hundreds digit and one hundred minutes from T, (e.g. leaving 20 minutes).

(7C4B) If the T value is greater than nineteen, then calculate the tens digit of the remaining T value (e.g. tens digit equals two), and subtract product of the tens digit and ten minutes, (e.g. 20 minutes) from the remaining T value, (e.g. to obtain zero minutes)

(7C4C) If the hundreds digit is non-zero, then que the hundreds digit (e.g. one)

(7C4D) If the tens digit is non-zero, then que the tens digit (e.g. two tens, announced as twenty).

(7C4E) If the remaining T value from (7C4B), (e.g. zero), is non-zero then que such remaining T value.

(7C4F) Que phrase "... minutes." or "minutes out the door".

Example II—Computing and Announcing Elapsed Time (7C4) As another specific example of more realistic magnitude, for an order received at 17:00, at a current time of 17:23, T would equal 23 minutes.

(7C4A) Calculate the hundreds digit of T (zero) and subtract the product of it and one hundred minutes (zero minutes) from T, leaving 23 minutes.

(7C4B) If the value of T is greater than nineteen, then calculate the tens digit of T (two), and subtract the product of it and ten minutes (20 minutes) from T, leaving three minutes.

(7C4C) Because the hundreds digit is zero skip this step.

(7C4D) Because the tens digit is non-zero, que it (two tens, announced as twenty).

(7C4E) Because the ones digit is non-zero, que it (three).

(7C4F) Que phrase "minutes . . . " or "minutes out the door". Further examples of directories of speech synthesizer elements at respective (relative) directory location numbers are as follows:

Example A—Make Station Speech Synthesizer Elements

| Directory Number | Word or Phrase |
| --- | --- |
| 00 | <Between sentence pause> |
| 01 | Zero |
| 02 | One |
| 03 | Two |
| 04 | Three |
| 05 | Four |
| 06 | Five |
| 07 | Six |
| 08 | Seven |
| 09 | Eight |
| 0A | Nine |
| 0B | Ten |
| 0C | Eleven |
| 0D | Twelve |
| 0E | Thirteen |
| 0F | Fourteen |
| 10 | Fifteen |
| 11 | Sixteen |
| 12 | Seventeen |
| 13 | Eighteen |
| 14 | Nineteen |
| 15 | Twenty |
| 16 | Thirty |
| 17 | Forty |
| 18 | Fifty |
| 19 | Sixty |
| 1A | Seventy |
| 1B | Eighty |
| 1C | Ninety |
| 1D | Hundred |
| 1E | Warning! Order number |
| 1F | has been in the store |
| 20 | minutes. |
| 21 | Current rate is |
| 22 | percent of last week, and |
| 23 | percent of all-time high. |
| 24 | Average time is |
| 25 | minutes out the door. |

Example B—Dispatch Station Speech Synthesizer Elements

| Directory Number | Word or Phrase |
| --- | --- |
| 00 | <Between sentence pause> |
| 01 | Zero |
| 02 | One |
| 03 | Two |
| 04 | Three |
| 05 | Four |
| 06 | Five |
| 07 | Six |
| 08 | Seven |
| 09 | Eight |
| 0A | Nine |
| 0B | Ten |
| 0C | Eleven |
| 0D | Twelve |
| 0E | Thirteen |
| 0F | Fourteen |
| 10 | Fifteen |
| 11 | Sixteen |
| 12 | Seventeen |
| 13 | Eighteen |
| 14 | Nineteen |

-continued

| Directory Number | Word or Phrase |
| --- | --- |
| 15 | Twenty |
| 16 | Thirty |
| 17 | Forty |
| 18 | Fifty |
| 19 | Sixty |
| 1A | Seventy |
| 1B | Eighty |
| 1C | Ninety |
| 1D | of |
| 1E | This order is cash only. |
| 1F | pizza's. |
| 20 | Driver, please make a drop. |
| 21 | minutes out the door. |
| 22 | This order contains beverage. |
| 23 | Invalid order number. |
|  | This pizza is ignored. |

Preferred Modifications To The Speech Generator Circuit of FIGS. 16A–16H

It would be desirable to replace the existing reset circuit components (CR1, R14, R15, and C39) with an integrated circuit such as the Dallas Semiconductor DS1232 (FIG. 16C). The DS1232 also contains a "eatchdog" function that would permit the removal of CR2, as well as delay hardware (all of U5, part of U1 and U16) (FIG. 16B).

It may be possible to reduce the crystal frequency and simultaneously eliminate one of the divider chips (U8 or U9) while using the watchdog function of the DS1232.

It will be apparent that many modifications and variations may be effected without departing from the scope of the teachings and concepts of the present disclosure.

We claim as our invention:

1. In an order processing system, data entry means for entering data pertaining to an order,
    processing means having real time clock means, and coupled with said data entry means for storing data pertaining to an order and an associated reading of the real time clock means, and
    speech generator means controlled by said processing means and operable for supplying a voice message if an order has not been processed within a selected time interval.

2. In a method for processing orders for delivery,
    (a) establishing customr files with respective customer addresses associated with respective customer telephone numbers;
    (b) registering a telephone number for each telephone order;
    (c) scanning the customer files for an address previously associated with a given telephone number;
    (d) registering information concerning incoming telephone orders;
    (e) associating an order number with each telephone order;
    (f) printing out for each order a label with a machine readable order number and a customer address;
    (g) affixing the label with the order;
    (h) assigning an order for delivery; and
    (i) contemporaneously with such assigning of an order for delivery reading the order number to identify such order as being assigned for delivery.

3. In a method according to claim 2, contemporaneously with assigning of an order for delivery, scanning a coded identification means identifying a particular individual assigned to deliver the order.

4. In a method according to claim 2, contemporaneously with registering information concerning incoming telephone orders, assigning a time of receipt for each order, and prior to the reading of the order number to identify a given order as having been assigned for delivery, determining whether a time greater than a selected time interval has elapsed subsequent to receipt of the order, and as to an order with has exceeded the selected time interval, periodically synthesizing a voice message advising of the elapsed time since such order was received.

5. In a method according to claim 2, contemporaneously with the associating of an order number with each telephone order, as to telephone orders involving a cash transaction, registering the amount of cash to be received upon delivery and associating such amount of cash with the order number for such telephone order, and contemporaneously with the assignment of an order for delivery, scanning a coded identification means identifying the particular individual assigned to deliver the order, and associating the amount of cash to be received upon delivery with the identity of the individual delivery person, and accumulating the amounts of cash to be collected by each respective individual delivery person during delivery of orders over a given time period.

6. In a method according of claim 5, contemporaneously with the scanning of the coded identification means of a particular delivery person, determining whether the particular delivery person has accumulated an excessive amount of cash, and as to such delivery person who is found to have accumulated an excessive amount of cash, synthesizing a voice message advising such delivery person to deposit a portion of the cash collected.

7. In a telephone order processing system for processing orders for home delivery,
  (a) telephone order entry means for entering telephone order information pursuant to respective telephone orders;
  (b) data processing means coupled with said telephone order entry means for storing said telephone order information and for associating respective order identification codes with the respective telephone orders, and operable to associate a personal identification code for identifying an individual order delivery person with each telephone order;
  (c) printer means for printing machine readable indicia representing respective order identification codes, and human readable data on respective labels which are to be attached to respective orders;
  (d) control means controlling said printer means for causing said printer means to print respective machine readable indicia representing respective order identification codes, and human readable data pertaining to the respective telephone orders on respective labels;
  (e) delivery check-out means comprising identification means coupled with said data processing means and operable for reading said machine readable indicia and for sensing the personal identification code of the delivery person assigned to deliver an order, wherein said data processing means assigns a delivery person to an order by associating the read indicia and sensed personal idenification code; and
  (f) data transmission means coupling said identification means with said data processing means for the transmission of data to said data processing means as to the order identification code, and as to the personal identification code of the delivery person assigned to deliver the order having such order identification code.

8. In a telephone order processing system according to claim 7, said priner means comprising bar code printer means for printing machine readable indicia in the form of bar codes representing respective order identification codes, and for printing human readable data, and each label having an adhesively backed label portion and a strippable backing layer removable therefrom to permit the label portion to be affixed to an order packaging means.

9. In a telephone order processing system according to claim 7, said telephone order entry means registering delivery location information comprised of customer address representing the destination for home delivery of a telephone order, said control means being operable to cause said printer means to print said delivery location information comprised of customer address on a label, for assisting in delivery of a telephone order.

10. In a telephone order processing system according to claim 7, said telephone order entry means registering telephone number and delivery location information with respect to incoming telephone orders, said data processing means being coupled with said telephone order entry means for storing said telephone number and delivery location information, and said control means being coupled with said data processing means and controlling said printer means for causing said printer means to print the telephone number and delivery location information for respective telephone orders on respective labels.

11. In a telephone order processing system according to claim 7, said order entry means registering delivery location information with respect to incoming telephone orders, said data processing means associating a respective time of day with each telephone order, and said control means being coupled with said data processing means and causing said printer means to print the respective delivery location information and the respective time of day of each telephone order on a respective label.

12. In a telephone order processing system according to claim 7, said telephone order entry means registering, for respective telephone orders, respective telephone numbers and respective telephone order data, said data processing means storing, for each telephone number as registered at the telephone order entry means, the respective related telephone order data, and said control means controlling said data processing means to supply to said telephone order entry means said stored telephone order data when the respective related telephone number is again registered at the telephone order entry means.

13. In a telephone order processing system according to claim 7, said telephone order entry means having display means for displaying delivery location information and being operable to register respective telephone numbers with respect to respective incoming telephone orders, and said data processing means being operable to store respective delivery location information in association with respective telephone numbers, and being responsive to a telephone number of a known customer registered at the telephone order entry means to cause said display means to display delivery location information previously associated with such telephone number of the known customer.

14. In a telephone order processing system according to claim 7, said telephone order entry means registering, for respective telephone orders, respective telephone numbers and respective delivery location information, said data processing means storing, for each telephone number as registered at the telephone order entry means, the respective related delivery location information, and said control means being coupled with said data processing means and being responsive to a telephone umber of a known customer submitting a telephone order to cause said printer means to print said delivery location information on the label for such telephone order.

15. In a telephone order processing system according to claim 7, voice annunciator means coupled with said data processing means for presenting voice messages at a station remote from said telephone order entry means, said data processing means associating a time reading with each telephone order, and said control means being coupled with said data processing means and activating the voice annunciator means to supply a voice message if data as to an order identification code has not been received at the data processing means within a selected time interval.

16. In a telephone order processing system according to claim 7, voice annunciator means coupled with said data processing means for presenting voice messages at a station remote from said telephone order entry means, said data processing means associating a time reading with each telephone order, said printer means printing machine readable indicia in the form of bar codes on the labels for representing the respective order identification codes, said identification means comprising bar code label reader means coupled with said data processing means for scanning the bar code of a label when the associated order is ready for delivery, and said control means being coupled with said data processing means and activating the voice annunciator means to supply a voice message if an order is not ready for delivery within a selected time interval.

17. In a telephone order processing system according to claim 7, said identification means comprising a coded key responsive means for generating code signals representative of respective distinctive keys carried by respected individual order delivery persons.

18. In a telephone order processing system according to claim 7, said identification means comprising a reader for reading the machine readable indicia representing respective order identification codes on the labels attached to the respective orders.

19. In a telephone order processing system according to claim 7, said identification means comprising a coded key responsive means for generating code signals representative of respective distinctive keys carried by respective individual order delivery persons and comprising a reader for reading the machine readable indicia representing respective order identification codes on the labels applied to the respective orders.

20. In a telephone order processing system according to claim 7, said data processing means recording data representing the time of receipt of the respective telephone orders, and said control means being coupled with said data processing means and being operable for providing a warning message if said identification means has not read the machine readable indicia representing a respective order identification code within a selected time interval.

21. In a telephone order processing system according to claim 7, said data processing means recording data representing the time of receipt of a telephone order, said control means being coupled with said data processing means for providing a warning message if said identification means has not read machine readable indicia representing a respective order identification code within a selected time interval, and voice synthesis means coupled with said data processing means and controlled by said control means for audibly delivering the warning message.

22. In a telephone order processing system according to claim 7, said data processing means having data storage means for storing customer telephone numbers and customer location data, said telephone order entry means being coupled with said data processing means and being operable for registering a customer telephone number, and said control means controlling said data processing means for causing output of the stored customer location data in response to registration of a related customer telephone number at the telephone order entry means.

23. In a telephone order processing system according to claim 7, said data processing means having data storage means for storing customer telephone numbers and customer location data comprising customer address data and geographical data other than customer address data for assisting in delivery of an order to the customer, said telephone order entry means being coupled with said data processing means and being operable for registering a customer telephone number, and said control means controlling said data processing means for causing output of the stored customer location data in response to registration of a related customer telephone number at the telephone order entry means.

24. In a telephone order processing system according to claim 7, said data processing means having data storage means for storing customer telephone numbers and customer location data, said telephone order entry means being operable for registering a customer telephone number with respect to an incoming telephone order, and said control means controlling said data processing means for causing output of the stored customer location data to said printer means in response to registration of a related customer telephone number at the telephone order entry means so as to provide a label for each telephone order including the machine readable indicia representing the respective order identification code, and the customer location data.

25. In a telephone order processing system according to claim 24, said identification means comprising a reader for reading the machine readable indicia representing a respective order identification code on the label, and supplying a specific order identification code to said data processing means in accordance therewith.

26. In a telephone order processing system according to claim 7, said delivery check-out means having annunicator means coupled with said data processing means and operable for delivering a message for an individual delivery person, and said control means being coupled with said data processing means and controlling said annunciator means for effecting delivery of a message directed to an individual delivery person at the time said identification means senses the personal identification code of such delivery person.

27. In a telephone order processing system according to claim 7, said data processing means including data storage means for storing the cash amounts to be received upon delivery of the respective telephone orders and storing data representing the respective personal identification codes of the respective delivery persons, and voice synthesizer means coupled with said data processing means and controlled by said control means for advising the individual delivery person concerning the amount of cash he should have accumulated on his person at the time said identification means senses the personal identification code of such delivery person.

28. In a telephone order processing system according to claim 7, voice synthesizer means coupled with said data processing means and controlled by said control means for advising the individual delivery person concerning a matter related to the stored telephone order information when said identification means reads the machine readable indicia for such telephone order.

29. In a telephone order processing system according to claim 7, said data processing means associating a time of receipt with each respective telephone order, and voice synthesis means coupled with said data processing means and controlled by said control means for effecting delivery of different voice messages according to the elapsed time since receipt of a given telephone order.

30. In an order processing data system,
    (a) data processing means for recording data pertaining to an order to be delivered to a customer, and operable to associate a personal identification code for an individual order delivery person with an order identification code;
    (b) delivery check-out means comprising identification means for generating signals representing a specific personal identification code, and for generating signals according to a specific order identification code applied to a respective order received at the delivery check-out means, wherein said data processing means assigns a delivery person to an order by associating the personal identification code and the order identification code, data transmission means coupling the identification means with the data processing means; and
    (c) control means controlling said data processing means to generate a listing of orders delivered by each individual order delivery person.

31. In an order processing data system according to claim 30, said identification means comprising a coded key responsive means for generating code signals representative of respective distinctive keys carried by respective individual order delivery persons.

32. In an order processing data system according to claim 30 said identification means comprising a reader for reading the order identification code applied to respective orders.

33. In an order processing data system according to claim 30, said identification means comprising a coded key responsive means for generating code signals representative of respective distinctive keys carried by respective individual order delivery persons, and comprising a reader for reading respective order identification codes applied to respective orders.

34. In an order processing data system according to claim 30, said data processing means recording data representing the time of receipt of an order, and control means controlling said data processing means for providing a warning message if said identification means has not generated signals representing a specific order identification code within a selected time interval.

35. In an order processing data system according to claim 30, said data processing means recording data representing the time of receipt of each order, voice synthesis means coupled with data processing means for audibly delivering warning messages, and control means coupled with said data processing means and controlling said voice synthesis means for providing a warning message if said identification means has not generated signals representing a specific order identification code within a selected time interval.

36. In an order processing data system according to claim 30, said processing means having data storage means for storing respective customer telephone numbers and respective related customer location data, order entry means coupled with said data processing means and operable for registering a customer telephone, and said control means controlling said data processing means for causing output of the stored customer location data in response to registration of a related customer telephone number at the order entry means.

37. In an order processing data system according to claim 30, said data processing means having data storage means for storing customer telephone numbers and customer location data comprising geographical data other than customer address data for assisting in delivery of an order to a customer, order entry means coupled with data processing means for registering a customer telephone number, and said control means controlling said data processing means for causing output of the stored customer location data comprising such geographical data in response to registration of a related customer telephone number at the order entry means.

38. In an order processing data system according to claim 30, label printer means for printing a label with a machine readable order identification number for each respective order, said data processing means having data storage means for storing customer telephone numbers and customer location data, order entry means coupled with said data processing means and operable for registering a customer telephone number with respect to an incoming telephone order, and said control means controlling said data processing means for causing output of the stored customer location data to said label printer means in response to registration of a related customer telephone number at the order entry means.

39. In an order processing data system according to claim 38, said identification means comprising a reader for reading the order identification number on the label, said reader being coupled with said data processing for supplying a specific order identification code to said data processing means.

40. In an order processing data system for processing orders for home delivery by a number of different delivery persons,
    (a) data processing means including data storage means for storing respective order identification codes representing the identity of respective individual orders and the cash amounts to be received upon delivery of respective individual orders;
    (b) a delivery check-out station having delivery check-out means coupled with said data processing means and operable for generating signals representing respective order identification codes in accordance with respective individual orders, and operable for generating signals representing respective personal identification codes of respective different delivery persons, wherein said data processing means assigns a delivery person to an order by associating the personal identification codes and the order identification codes;

(c) data transmission means coupling the delivery check-out means with said data processing means for transmitting to the data processing means information corresponding to said signals generated by said delivery check-out means; and (d) control means controlling said data processing means so as to associate the cash amounts to be received for delivery of respective orders with respective individual delivery persons assigned to deliver the respective orders.

41. In an order processing data system according to claim 40, annunciator means at the delivery check-out station and coupled with said data processing means for delivering messages at the delivery check-out station, and said control means controlling said annunciator means for effecting delivery of a message directed to an individual delivery person at the time said delivery check-out means generates signals representing the specific person identification code for such individual person.

42. In an order processing data system according to claim 41, said annunciator means comprising voice synthesizer means for advising the individual delivery person at the delivery check-out station concerning the amount of cash he should have accumulated on his person.

43. In an order processing data system according to claim 40, said data processing means storing information concerning matters to be attended to by a delivery person in connection with respective orders, and said annunciator means comprising voice synthesizer means controlled by said control means for advising the individual delivery person at the delivery check-out station concerning a matter to be attended to in connection with the current order assigned to such individual delivery person.

44. In an order processing data system according to claim 40, said delivery check-out means comprising a coded key responsive means for generating code signals representative of respective distinctive keys carried by respective individual order delivery persons.

45. In an order processing data system according to claim 40, means for applying to respective orders machine readable indicia representing respective individual order identification codes, and said delivery check-out means comprising a reader for reading the indicia applied to the respective orders for generating the respective individual order identification codes.

46. In an order processing data system according to claim 40, label means applied to respective orders at the delivery check-out station having machine readable indicia applied thereto representing respective individual order identification codes, said delivery check-out means comprising a coded key responsive means for generating code signals representative of respective distinctive keys carried by respective individual order delivery persons and comprising a reader for reading the indicia applied to the label means of the respective orders for generating respective individual order identification codes.

47. In an order processing data system according to claim 40, said data processing means recording data representing time of receipt of an order, and said control means controlling said data processing means for providing a warning message if the delivery check-out means has not generated signals representing the respective order identification codes within a selected time interval after receipt of the respective orders.

48. In an order processing data system according to claim 40, said data processing means recording data representing the time of receipt of an order, voice synthesis means coupled with said data processing means for audibly delivering warning messages, and control means coupled with said data processing means and controlling said voice synthesis means for providing a warning message if the delivery check-out means has not generated signals representing a respective order identification code within a respective selected time interval.

49. In an order processing data system according to claim 40, said data processing means recording data representing the time of receipt of an order, voice synthesis means controlled by said data processing means for effecting delivery of different voice messages, and said control means controlling said voice synthesis means for effecting delivery of different voice messages according to the elapsed time from receipt of respective orders.

50. In an order processing data system for processing orders for the home delivery of food items,
(a) order entry means for entering particulars of an order including customer identification means, and time of order;
(b) order processing station means for preparation of food items for home delivery, said order processing station means comprising annunciator means for presenting a message concerning an order;
(c) signaling means for signaling when an order has been completed for delivery;
(d) data processing means coupled with said order entry means, said annunciator means and said signaling means; and
(e) control means coupled with said data processing means and controlling said annunciator means such that a warning message is delivered if the signaling means has failed to signal completion of a given order within a selected time interval.

51. In an order processing data system according to claim 50, means for applying order identification indicia to each order when ready for delivery, said signaling means comprising a reader for reading the order identification indicia means for signaling when an order has been completed for delivery.

52. In an order processing data system according to claim 50, said annunciator means comprising voice synthesis means controllable for supplying different voice messages, and said control means controlling said voice synthesis means for effecting delivery of different voice messages according to elapsed time since the time of an order as entered by the order entry means.

* * * * *